United States Patent
Taguchi et al.

(10) Patent No.: US 7,273,519 B2
(45) Date of Patent: *Sep. 25, 2007

(54) INK SET AND INKJET RECORDING METHOD

(75) Inventors: Toshiki Taguchi, Shizuoka (JP); Manabu Ogawa, Shizuoka (JP)

(73) Assignee: Fujifilm Corporation, Tokyo (JP)

( * ) Notice: Subject to any disclaimer, the term of this patent is extended or adjusted under 35 U.S.C. 154(b) by 138 days.

This patent is subject to a terminal disclaimer.

(21) Appl. No.: 10/808,464

(22) Filed: Mar. 25, 2004

(65) Prior Publication Data

US 2004/0187736 A1    Sep. 30, 2004

(30) Foreign Application Priority Data

Mar. 27, 2003 (JP) ............................ P.2003-088356
Mar. 9, 2004 (JP) ............................ P.2004-065660

(51) Int. Cl.
*C09D 11/00* (2006.01)
*C09D 11/02* (2006.01)

(52) U.S. Cl. .............................. 106/31.46; 106/31.47; 106/31.48; 106/31.49; 106/31.5

(58) Field of Classification Search ............. 106/31.27, 106/31.46, 31.47, 31.48, 31.49, 31.5
See application file for complete search history.

(56) References Cited

U.S. PATENT DOCUMENTS

| | | | |
|---|---|---|---|
| 6,939,399 B2 * | 9/2005 | Yabuki ..................... | 106/31.27 |
| 7,037,365 B2 * | 5/2006 | Taguchi et al. .......... | 106/31.46 |
| 2004/0024085 A1 * | 2/2004 | Ishizuka et al. ............ | 523/160 |
| 2004/0089200 A1 * | 5/2004 | Fujiwara et al. ......... | 106/31.48 |
| 2004/0099181 A1 * | 5/2004 | Tateishi et al. .......... | 106/31.47 |
| 2004/0187733 A1 * | 9/2004 | Ogawa et al. ........... | 106/31.13 |
| 2004/0194660 A1 * | 10/2004 | Taguchi et al. .......... | 106/31.43 |
| 2004/0200385 A1 * | 10/2004 | Taguchi et al. .......... | 106/31.43 |
| 2004/0246321 A1 * | 12/2004 | Takashima et al. ......... | 347/100 |
| 2005/0001890 A1 * | 1/2005 | Taguchi et al. ............. | 347/100 |

FOREIGN PATENT DOCUMENTS

| | | |
|---|---|---|
| EP | 1 340 796 A1 | 9/2003 |
| EP | 1 350 819 A1 | 10/2003 |
| EP | 1 352 754 A2 | 10/2003 |
| JP | 2002-371214 A | 12/2002 |
| JP | 2003-3086 A | 1/2003 |
| JP | 2003-3099 A | 1/2003 |
| JP | 2003-3109 A | 1/2003 |
| JP | 2003-231849 A | 8/2003 |
| JP | 2003-231893 A | 8/2003 |
| JP | 2004-26907 A | 1/2004 |
| JP | 2004-35713 A | 2/2004 |
| WO | WO 03/062324 A1 | 7/2003 |

OTHER PUBLICATIONS

European Search Report dated Jul. 8, 2004.

* cited by examiner

*Primary Examiner*—Helene Klemanski
(74) *Attorney, Agent, or Firm*—Sughrue Mion, PLLC

(57) ABSTRACT

An ink set where constituent inks all are an ink containing at least one dye having an oxidation potential more positive than 1.0 V (vs SCE), particularly where the ratio k1/k2 of the fading rate constant (k1) of an image drawn by using the ink alone to the fading rate constant (k2) of a mixed color image drawn by using all constituent inks constituting the ink set in equivalent amounts with the same density measurement light as in the measurement of k1 is 0.7 to 1.3 in all inks. According the present invention, an inkjet ink set capable of giving an image having good image quality and excellent image fastness regardless of the color of image, such as aging stability, light fastness and water resistance, and an inkjet image recording method using the ink set are provided.

10 Claims, No Drawings

INK SET AND INKJET RECORDING METHOD

FIELD OF THE INVENTION

The present invention relates to an ink set, which can provide an image having high quality and excellent storage durability, and also relates to an inkjet recording method using the ink set.

BACKGROUND OF THE INVENTION

Accompanying recent popularization of computers, an inkjet printer is widely used for printing letters or an image on paper, film, cloth or the like not only at offices but also at homes.

The inkjet recording method includes a system of jetting out a liquid droplet by applying a pressure from a piezoelectric element, a system of jetting out a liquid droplet by generating a bubble in the ink under heat, a system of using an ultrasonic wave, and a system of jetting out a liquid droplet by suction using an electrostatic force. The ink used for such inkjet recording includes an aqueous ink, an oily ink and a solid (fusion-type) ink. Among these inks, an aqueous ink is predominating in view of production, handleability, odor, safety and the like.

The dye used in such an ink for inkjet recording is required to have high solubility in a solvent, enable high-density recording, provide good color hue, exhibit excellent fastness to light, heat, air, water and chemicals, ensure good fixing property to an image-receiving material and less bleeding, give an ink having excellent storability, have high purity and no toxicity, and be available at a low cost. However, it is very difficult to find out a dye satisfying these requirements in a high level. Various dyes and pigments for inkjet recording have been already proposed and actually used, however, a dye satisfying all requirements is not yet found out at present. Conventionally well-known dyes and pigments having a color index (C.I.) number can hardly satisfy both color hue and fastness required of the ink for inkjet recording.

The present inventors have continued studies on the inkjet ink using a dye so as to solve the above-described problems. Particularly, the aqueous inkjet ink is water-soluble and therefore, often suffers from low image durability. As for the ink suitable for aqueous inkjet recording, a heterocyclic group-containing azo dye having a specific structure is disclosed in JP-A-2002-371214 (the term "JP-A" as used herein means an "unexamined published Japanese patent application") and a phthalocyanine dye having a specific structure is disclosed in JP-A-2003-3086, JP-A-2003-3099 and JP-A-2003-3109. From the standpoint of satisfying both color hue and fastness, these techniques have succeeded in providing an improvement. However, the inkjet recorded image is used in various indoor or outdoor environments and sometimes causes a phenomenon (so-called discoloration) that the fastness changes depending on the color tone of the image obtained. Particularly, in an image drawn by using two or more inks, even when the dye itself is fast, a fastness changing phenomenon occurs due to interaction resulting from mixing of dyes. In order to prevent occurrence of such a defect, more improvement is demanded.

SUMMARY OF THE INVENTION

Accordingly, an object of the present invention is to provide an ink set capable of giving an image having good image quality and excellent image fastness regardless of the color of image, such as aging stability, light fastness and water resistance, and provide an inkjet image recording method using the ink set.

As a result of various investigations on the ink set as to attain the above-described object, the present inventors have found that the image fastness is dependent not only on the fastness of dye but also on the combination of inks constituting the ink set. By continuing studies based on this finding, the present invention has been accomplished.

(1) An ink set comprising inks each obtained by containing at least one dye in an aqueous medium, wherein said constituent inks all are an ink containing at least one dye having an oxidation potential more positive than 1.0 V (vs SCE).

(2) The ink set as described in (1) above, wherein said ink is an ink obtained by dissolving or dispersing at least one dye in an aqueous medium.

(3) The ink set as described in (1) above, wherein the ratio k1/k2 of the accelerated fading rate constant (k1) of an image drawn by using said constituent ink alone to the accelerated fading rate constant (k2) of a mixed color image drawn by using all constituent inks constituting said ink set in equivalent amounts with the same density measurement light as in the measurement of said k1 is 0.7 to 1.3 in all constituent inks constituting the ink set.

(4) The ink set as described in (1) above, wherein the dye is a dye having al least one heterocyclic group.

(5) The ink set as described in (1) above, wherein the dye is a dye having al least one bond selected from —SO— or —SO$_2$-.

(6) The ink set as described in (1) above, wherein the dye is a phthalocyanine dye or an azo dye.

(7) The ink set as described in (1) to (6) above, wherein the ink set is used for an inkjet (8) An inkjet recording method, comprising recording an image by using the ink described in (7) above.

DETAILED DESCRIPTION OF THE INVENTION

The embodiment of the present invention is specifically described below. In the present invention, the dye capable of dissolving in an ink medium and the pigment capable of dispersing in an ink medium both are collectively called a dye (namely, a dye in a broad sense) when no question arises in the contents.

The present invention is described in detail below.

(Oxidation Potential Requirement)

The present invention is characterized in that the constituent inks of the ink set all contain at least one dye having an oxidation potential more positive than 1.0 V (vs SCE). The oxidation potential is preferably more positive than 1.10 V (vs SCE), more preferably more positive than 1.15 V (vs SCE). By containing a dye having such an oxidation potential, irrespective of a monochromatic image or an image formed by mixing of dyes in a plurality of inks, the image drawn is reduced in the discoloration or color fading in aging and improved in the image fastness such as aging stability, light fastness and water resistance. In this case, even when each constituent ink contains two or more dyes and a dye not satisfying the above-described oxidation potential requirement is present in the ink, the effect of the present invention is scarcely affected by this dye and sufficiently exerted. The mechanism thereof is not known, but this is considered to result because at least one dye having an oxidation potential more positive than 1.0 contained in the ink is dominating in the contribution. However, in each constituent ink, the dye having an oxidation potential more positive than 1.0 V preferably occupies 50 wt % or more in the entire dyes contained in the ink.

For measuring the oxidation potential, various measuring methods using an aqueous solution or water mixed solvent system having dissolved therein such as cyclic voltammetry method (CV), rotating ring-disk electrode method and comb electrode method can be used. The measurement of oxidation potential is specifically described below. A test sample is dissolved to a concentration of $1 \times 10^{-6}$ to $1 \times 10^{-2}$ mol·dm$^{-3}$ in a solvent such as dimethylformamide or acetonitrile containing a supporting electrolyte such as sodium perchlorate or tetrapropylammonium perchlorate and the oxidation potential is measured as a value to SCE (saturated calomel electrode) by using the above-described method. The supporting electrolyte and solvent used can be appropriately selected according to the oxidation potential or solubility of test sample. The supporting electrolyte and solvent which can be used are described in Akira Fujishima et al., *Denkikagaku Sokutei Ho* (*Electrochemical Measuring Method*), pp. 101-118, Gihodo Shuppan Sha (1984).

The oxidation potential value sometimes deviates on the order of tens of millivolt due to the effect of liquid junction potential, liquid resistance of sample solution, or the like, however, the reproducibility of measured potential value can be guaranteed by the calibration using a standard sample (for example, hydroquinone) and the same measured value can be obtained by any of those potential measuring methods.

In the present invention, the oxidation potential of the dye used in the present invention is univocally defined as a value measured in N,N-dimethylformamide (concentration of compound: $1 \times 10^{-3}$ mol·dm$^{-3}$) containing 0.1 mol·dm$^{-3}$ of tetrapropylammonium perchlorate as the supporting electrolyte according to SCE (saturated calomel electrode) standard. However, as long as the calibration by a standard sample is performed, the measuring method is not limited thereto. In the case of a water-soluble dye, the dye is sometimes hardly dissolved directly in N,N-dimethylformamide. In such a case, the oxidation potential is measured after dissolving the dye by using water in a small amount as much as possible and then diluting it with N,N-dimethylformamide to have a water content of 2% or less.

(Oxidation Rate Requirement)

In addition to that the constituent inks of the ink set each has an oxidation potential more positive than 1.0 V, when the ink set is prepared such that the ratio k1/k2 of the fading rate constant (k1) of an image drawn by using each constituent ink alone to the fading rate constant (k2) of a mixed color image drawn by using all constituent inks constituting the ink set in equivalent amounts with the same density measurement light as in the measurement of k1 is 0.7 to 1.3, preferably 0.8 to 1.2, the obtained image is found to be more enhanced in the fastness.

The fading rate constants (k1) and (k2) are determined as follows. An image drawn on a reflective medium by using an ink obtained by dissolving and/or dispersing the dye in an aqueous medium is measured on the reflection density through a Status A filter and one point where the measured reflection density value with the filter light is from 0.90 to 1.10 is defined as the initial density of this ink. This printed matter is enforcedly discolored by using an ozone fading tester capable of always generating 5 ppm of ozone and assuming that the fading follows the primary chemical kinetics, the enforced fading rate constant (k1) is determined according to the relational formula of "$0.8=\exp(-k1 \cdot t)$" from the time period (t) until the reflection density decreases to 80% of the initial density.

A mixed color image drawn by using all constituent inks constituting the ink set in equivalent amounts is measured in the same manner and the fading rate constant (k2) of the mixed color image with the same density measurement light as in the measurement of k1 is obtained.

When the inks measured are cyan ink, magenta ink, yellow ink and black ink, the obtained fading rate constants (k1) are denoted as k1c, k1m, k1y, k1bk, respectively, and the fading rate constant ratios (k1/k2) are denoted as (k1/k2)c, (k1/k2)m, (k1/k2)y and (k1/k2)bk, respectively.

In the case of determining the k1/k2 ratio of black ink, namely, (k1/k2)bk, a Status A green filter is used as the density measurement light. The black ink is in itself visually gray (neutral color) but (k1/k2)bk determined using a Status A green filter is substantially the same as that obtained by measuring the density with visually neutral light.

(Constitution of Ink Set)

The ink set of the present invention can take a known arbitrary constitution. For drawing a full color image, a set of three color inks of cyan ink, magenta ink and yellow ink is necessary and for obtaining a high-quality image with non-loosening black in the shadow part, a four-color constitution of cyan ink, magenta ink, yellow ink and black ink is preferred. Furthermore, for drawing an image expressive in the gradation, an ink set having a constitution of, for example, cyan ink, magenta ink, yellow ink, light cyan ink, light magenta ink, dark yellow ink and black ink is preferred. The dye satisfying the above-described potential requirement contained in each constituent ink, preferably the dye satisfying the above-described potential requirement and fading rate constant ratio, which is applied to the present invention, is selected from the compounds in the following structure group.

Further, among such dyes, one having at least one heterocyclic group, in particular, an azo dye having a heterocyclic group, and one having at least one —SO— or —SO$_2$- bond, in particular, an azo dye or a phthalocyanine dye having one of the above-mentioned bonds is effective for the objects of the invention.

<Black Ink>

The black dye as a coloring agent for use in the present invention is preferably a dye having λmax in the region from 500 to 700 nm and having a half-value width of 100 nm or more (preferably from 120 to 250 nm, more preferably from 120 to 200 nm) in the absorption spectrum of a dilute solution standardized to an absorbance of 1.0. Examples of this preferred dye include a dye represented by formula (1).

The dye represented by formula (1) and having an ozone fading rate constant of $5.0 \times 10^{-2}$ [hour$^{-1}$] or less is called "Dye b" in the present invention. Also, the azo dye, which is a compound represented by formula (1), having λmax in the region from 500 to 700 nm and having a half-value width of 100 nm or more in the absorption spectrum of a dilute solution standardized to an absorbance of 1.0 is called "Dye a". The dye included in these Dyes a and b are called Black Dye (ab).

The compound represented by formula (1) is described below.

Formula (1):

$$A-N=N-B-N=N-C$$

wherein A, B and C each independently represents an aromatic group which may be substituted or a heterocyclic group which may be substituted (A and C are a monovalent group and B is a divalent group), provided that at least one of A, B and C is a heterocyclic group which may be substituted.

The azo dye (Dye a) represented by formula (1) is preferably a dye represented by the following formula (2):

Formula (2):

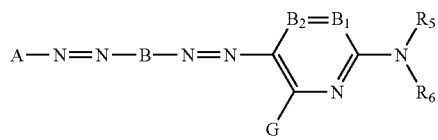

wherein A and B have the same meanings as in formula (1), $B_1$ and $B_2$ each represents $=CR_1-$ or $-CR_2=$ or either one of $B_1$ and $B_2$ represents a nitrogen atom and the other represents $=CR_1-$ or $-CR_2=$, G, $R_1$ and $R_2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an alkylamino group, an arylamino group and a heterocyclic amino group), an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and each group may be further substituted, $R_5$ and $R_6$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and each group may further have a substituent, provided that $R_5$ and $R_6$ are not a hydrogen atom at the same time, and $R_1$ and $R_5$, or $R_5$ and $R_6$ may combine to form a 5- or 6-membered ring.

The azo dye represented by formula (2) is more preferably a dye represented by the following formula (3):

Formula (3):

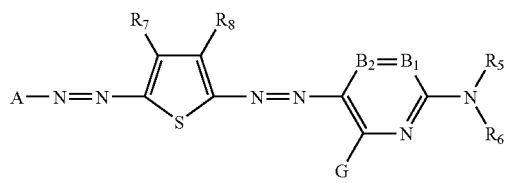

wherein $R_7$ and $R_8$ each has the same meaning as $R_1$ in formula (2).

The halogen atom includes a fluorine atom, a chlorine atom and a bromine atom. The aliphatic group means an alkyl group, a substituted alkyl group, an alkenyl group, a substituted alkenyl group, an alkynyl group, a substituted alkynyl group, an aralkyl group and a substituted aralkyl group. The aliphatic group may be branched or may form a ring. The number of carbon atoms in the aliphatic group is preferably from 1 to 20, more preferably from 1 to 16. The aryl moiety in the aralkyl group and the substituted aralkyl group is preferably phenyl or naphthyl, more preferably phenyl. Examples of the aliphatic group include a methyl group, an ethyl group, a butyl group, an isopropyl group, a tert-butyl group, a hydroxyethyl group, a methoxyethyl group, a cyanoethyl group, a trifluoromethyl group, a 3-sulfopropyl group, a 4-sulfobutyl group, a cyclohexyl group, a benzyl group, a 2-phenethyl group, a vinyl group and an allyl group.

The monovalent aromatic group means an aryl group and a substituted aryl group. The aryl group is preferably a phenyl group or a naphthyl group, more preferably a phenyl group. The number of carbon atoms in the monovalent aromatic group is preferably from 6 to 20, more preferably from 6 to 16. Examples of the monovalent aromatic group include a phenyl group, a p-tolyl group, a p-methoxyphenyl group, an o-chlorophenyl group and an m-(3-sulfopropylamino)phenyl group. The divalent aromatic group is a divalent form of these monovalent aromatic groups and examples thereof include a phenylene group, a p-tolylene group, a p-methoxyphenylene group, an o-chlorophenylene group, an m-(3-sulfopropylamino)phenylene group and a naphthylene group.

The heterocyclic group includes a heterocyclic group having a substituent and an unsubstituted heterocyclic group. The heterocyclic ring may be condensed with an aliphatic ring, an aromatic ring or another heterocyclic ring. The heterocyclic group is preferably a 5- or 6-membered heterocyclic group. Examples of the heteroatom in the heterocyclic ring include N, O and S. Examples of the substituent include an aliphatic group, a halogen atom, an alkylsulfonyl group, an arylsulfonyl group, an acyl group, an acylamino group, a sulfamoyl group, a carbamoyl group and an ionic hydrophilic group. Examples of the heterocyclic ring used in the monovalent or divalent heterocyclic group include a pyridine ring, a thiophene ring, a thiazole ring, a benzothiazole ring, a benzoxazole ring and a furan ring.

The carbamoyl group includes a carbamoyl group having a substituent and an unsubstituted carbamoyl group. Examples of the substituent include an alkyl group. Examples of the carbamoyl group include a methylcarbamoyl group and a dimethylcarbamoyl group.

The alkoxycarbonyl group includes an alkoxycarbonyl group having a substituent and an unsubstituted alkoxycarbonyl group. The alkoxycarbonyl group is preferably an alkoxycarbonyl group having from 2 to 20 carbon atoms. Examples of the substituent include an ionic hydrophilic group. Examples of the alkoxycarbonyl group include a methoxycarbonyl group and an ethoxycarbonyl group.

The aryloxycarbonyl group includes an aryloxycarbonyl group having a substituent and an unsubstituted aryloxycarbonyl group. The aryloxycarbonyl group is preferably an aryloxycarbonyl group having from 7 to 20 carbon atoms. Examples of the substituent include an ionic hydrophilic group. Examples of the aryloxycarbonyl group include a phenoxycarbonyl group.

The heterocyclic oxycarbonyl group includes a heterocyclic oxycarbonyl group having a substituent and an unsubstituted heterocyclic oxycarbonyl group. The heterocyclic oxycarbonyl group is preferably a heterocyclic oxycarbonyl group having from 2 to 20 carbon atoms. Examples of the substituent include an ionic hydrophilic group. Examples of the heterocyclic oxycarbonyl group include a 2-pyridyloxycarbonyl group.

The acyl group includes an acyl group having a substituent and an unsubstituted acyl group. The acyl group is preferably an acyl group having from 1 to 20 carbon atoms. Examples of the substituent include an ionic hydrophilic group. Examples of the acyl group include an acetyl group and a benzoyl group.

The alkoxy group includes an alkoxy group having a substituent and an unsubstituted alkoxy group. The alkoxy group is preferably an alkoxy group having from 1 to 20 carbon atoms. Examples of the substituent include an alkoxy group, a hydroxyl group and an ionic hydrophilic group. Examples of the alkoxy group include a methoxy group, an ethoxy group, an isopropoxy group, a methoxy-ethoxy group, a hydroxyethoxy group and a 3-carboxypropoxy group.

The aryloxy group includes an aryloxy group having a substituent and an unsubstituted aryloxy group. The aryloxy group is preferably an aryloxy group having from 6 to 20 carbon atoms. Examples of the substituent include an alkoxy group and an ionic hydrophilic group. Examples of the aryloxy group include a phenoxy group, a p-methoxyphenoxy group and an o-methoxyphenoxy group.

The heterocyclic oxy group includes a heterocyclic oxy group having a substituent and an unsubstituted heterocyclic oxy group. The heterocyclic oxy group is preferably a heterocyclic oxy group having from 2 to 20 carbon atoms. Examples of the substituent include an alkyl group, an alkoxy group and an ionic hydrophilic group. Examples of the heterocyclic oxy group include a 3-pyridyloxy group and a 3-thienyloxy group.

The silyloxy group is preferably a silyloxy group substituted by an aliphatic or aromatic group having from 1 to 20 carbon atoms. Examples of the silyloxy group include a trimethylsilyloxy group and a diphenylmethylsilyloxy group.

The acyloxy group includes an acyloxy group having a substituent and an unsubstituted acyloxy group. The acyloxy group is preferably an acyloxy group having from 1 to 20 carbon atoms. Examples of the substituent include an ionic hydrophilic group. Examples of the acyloxy group include an acetoxy group and a benzoyloxy group.

The carbamoyloxy group includes a carbamoyloxy group having a substituent and an unsubstituted carbamoyloxy group. Examples of the substituent include an alkyl group. Examples of the carbamoyloxy group include an N-methylcarbamoyloxy group.

The alkoxycarbonyloxy group includes an alkoxy-carbonyloxy group having a substituent and an unsubstituted alkoxycarbonyloxy group. The alkoxycarbonyloxy group is preferably an alkoxycarbonyloxy group having from 2 to 20 carbon atoms. Examples of the alkoxycarbonyloxy group include a methoxycarbonyloxy group and an isopropoxycarbonyloxy group.

The aryloxycarbonyloxy group includes an aryloxy-carbonyloxy group having a substituent and an unsubstituted aryloxycarbonyloxy group. The aryloxycarbonyloxy group is preferably an aryloxycarbonyloxy group having from 7 to 20 carbon atoms. Examples of the aryloxycarbonyloxy group include a phenoxycarbonyloxy group.

The amino group includes an amino group substituted by an alkyl group, an aryl group or a heterocyclic group, and the alkyl group, the aryl group and the heterocyclic group each may further have a substituent. The alkylamino group is preferably an alkylamino group having from 1 to 20 carbon atoms. Examples of the substituent include an ionic hydrophilic group. Examples of the alkylamino group include a methylamino group and a diethylamino group.

The arylamino group includes an arylamino group having a substituent and an unsubstituted arylamino group. The arylamino group is preferably an arylamino group having from 6 to 20 carbon atoms. Examples of the substituent include a halogen atom and an ionic hydrophilic group. Examples of the arylamino group include an anilino group and a 2-chlorophenylamino group.

The heterocyclic amino group includes a heterocyclic amino group having a substituent and an unsubstituted heterocyclic amino group. The heterocyclic amino group is preferably a heterocyclic amino group having from 2 to 20 carbon atoms. Examples of the substituent include an alkyl group, a halogen atom and an ionic hydrophilic group.

The acylamino group includes an acylamino group having a substituent and an unsubstituted acylamino group. The acylamino group is preferably an acylamino group having from 2 to 20 carbon atoms. Examples of the substituent include an ionic hydrophilic group. Examples of the acylamino group include an acetylamino group, a propionylamino group, a benzoylamino group, an N-phenylacetylamino group and a 3,5-disulfobenzoylamino group.

The ureido group includes a ureido group having a substituent and an unsubstituted ureido group. The ureido group is preferably a ureido group having from 1 to 20 carbon atoms. Examples of the substituent include an alkyl group and an aryl group. Examples of the ureido group include a 3-methylureido group, a 3,3-dimethylureido group and a 3-phenylureido group.

The sulfamoylamino group includes a sulfamoylamino group having a substituent and an unsubstituted sulfamoylamino group. Examples of the substituent include an alkyl group. Examples of the sulfamoylamino group include an N,N-dipropylsulfamoylamino group.

The alkoxycarbonylamino group includes an alkoxycarbonylamino group having a substituent and an unsubstituted alkoxycarbonylamino group. The alkoxycarbonylamino group is preferably an alkoxycarbonylamino group having from 2 to 20 carbon atoms. Examples of the substituent include an ionic hydrophilic group. Examples of the alkoxycarbonylamino group include an ethoxycarbonylamino group.

The aryloxycarbonylamino group includes an aryloxycarbonylamino group having a substituent and an unsubstituted aryloxycarbonylamino group. The aryloxycarbonylamino group is preferably an aryloxycarbonylamino group having from 7 to 20 carbon atoms. Examples of the substituent include an ionic hydrophilic group. Examples of the aryloxycarbonylamino group include a phenoxycarbonylamino group.

The alkylsulfonylamino group includes an alkylsulfonylamino group having a substituent and an unsubstituted alkylsulfonylamino group, and the arylsulfonylamino group includes an arylsulfonylamino group having a substituent and an unsubstituted arylsulfonylamino group. The sulfonylamino group is preferably a sulfonyl-amino group having from 1 to 20 carbon atoms. Examples of the substituent include an ionic hydrophilic group. Examples of these sulfonylamino groups include a methylsufonylamino group, an N-phenyl-methylsulfonylamino group, a phenylsulfonylamino group and a 3-carboxyphenylsulfonylamino group.

The heterocyclic sulfonylamino group includes a heterocyclic sulfonylamino group having a substituent and an unsubstituted heterocyclic sulfonylamino group. The heterocyclic sulfonylamino group is preferably a heterocyclic sulfonylamino group having from 1 to 12 carbon atoms. Examples of the substituent include an ionic hydrophilic group. Examples of the heterocyclic sulfonylamino group include a 2-thiophenesulfonylamino group and a 3-pyridinesulfonylamino group.

The heterocyclic sulfonyl group includes a heterocyclic sulfonyl group having a substituent and an unsubstituted heterocyclic sulfonyl group. The heterocyclic sulfonyl group is preferably a heterocyclic sulfonyl group having from 1 to 20 carbon atoms. Examples of the substituent include an ionic hydrophilic group. Examples of the heterocyclic sulfonyl group include a 2-thiophenesulfonyl group and a 3-pyridinesulfonyl group.

The heterocyclic sulfinyl group includes a heterocyclic sulfinyl group having a substituent and an unsubstituted heterocyclic sulfinyl group. The heterocyclic sulfinyl group is preferably a heterocyclic sulfinyl group having from 1 to 20 carbon atoms. Examples of the substituent include an ionic hydrophilic group. Examples of the heterocyclic sulfinyl group include a 4-pyridinesulfinyl group.

The alkylthio group includes include an alkylthio group having a substituent and an unsubstituted alkylthio group, the arylthio group includes an arylthio group having a substituent and an unsubstituted arylthio group, and the heterocyclic thio group includes a heterocyclic thio group having a substituent and an unsubstituted heterocyclic thio group. The alkylthio group, the arylthio group and the heterocyclic thio group are preferably an alkylthio group having from 1 to 20 carbon atoms, an arylthio group having from 1 to 20 carbon atoms and a heterocyclic thio group having from 1 to 20 carbon atoms, respectively. Examples of the substituent include an ionic hydrophilic group. Examples of the alkylthio group, arylthio group and heterocyclic thio group include a methylthio group, a phenylthio group and a 2-pyridylthio group.

The alkylsulfonyl group includes an alkylsulfonyl group having a substituent and an unsubstituted alkylsulfonyl group, and the arylsulfonyl group includes an arylsulfonyl group having a substituent and an unsubstituted arylsulfonyl group. Examples of the alkylsulfonyl group and arylsulfonyl group include a methylsulfonyl group and a phenylsulfonyl group.

The alkylsulfinyl group includes an alkylsulfinyl group having a substituent and an unsubstituted alkylsulfinyl group, and the arylsulfinyl group includes an arylsulfinyl group having a substituent and an unsubstituted arylsulfinyl group. Examples of the alkylsulfinyl group and arylsulfinyl group include a methylsulfinyl group and a phenylsulfinyl group.

The sulfamoyl group includes a sulfamoyl group having a substituent and an unsubstituted sulfamoyl group. Examples of the substituent include an alkyl group. Examples of the sulfamoyl group include a dimethylsulfamoyl group and a di-(2-hydroxyethyl)sulfamoyl group.

Formulae (1), (2) and (3) are described below.

In the following, those described above for each group or substituent also apply.

In formula (1), A, B and C each independently represents an aromatic group (A and C are a monovalent aromatic group such as aryl group, and B is a divalent aromatic group such as arylene group) which may be substituted or a heterocyclic group (A and C are a monovalent heterocyclic group and B is a divalent heterocyclic group) which may be substituted. Examples of the aromatic ring include a benzene ring and a naphthalene ring. Examples of the heteroatom in the heterocyclic ring include N, O and S. The heterocyclic ring may be condensed with an aliphatic ring, an aromatic ring or another heterocyclic ring.

The substituent may be an arylazo group or a heterocyclic azo group.

At least two of A, B and C are preferably a heterocyclic ring.

The heterocyclic group represented by C is preferably an aromatic nitrogen-containing 6-membered heterocyclic group represented by the following formula (4). When C is an aromatic nitrogen-containing 6-membered heterocyclic group represented by formula (4), formula (1) corresponds to formula (2).

Formula (4):

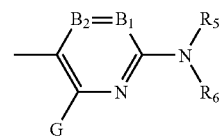

In formula (4), $B_1$ and $B_2$ each represents =$CR_1$- or —$CR_2$= or either one of $B_1$ and $B_2$ represents a nitrogen atom and the other represents =$CR_1$- or —$CR_2$=. $B_1$ and $B_2$ each is preferably =$CR_1$- or —$CR_2$=.

$R_5$ and $R_6$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and each group may further have a substituent. The substituent represented by $R_5$ and $R_6$ is preferably a hydrogen atom, an aliphatic group, an aromatic group, a heterocyclic group, an acyl group, an alkylsulfonyl group or an arylsulfonyl group, more preferably a hydrogen atom, an aromatic group, a heterocyclic group, an acyl group, an alkylsulfonyl group or an arylsulfonyl group, and most preferably a hydrogen atom, an aryl group or a heterocyclic group, and each group may further have a substituent. However, $R_5$ and $R_6$ are not a hydrogen atom at the same time.

G, $R_1$ and $R_2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an alkyl amino group, an arylamino group and a heterocyclic amino group), an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group or a sulfamoyl group, and each group may be further substituted.

The substituent represented by G is preferably a hydrogen atom, a halogen atom, an aliphatic group, an aromatic group, a hydroxyl group, an alkoxy group, an aryloxy group, an acyloxy group, a heterocyclic oxy group, an amino group (including an alkylamino group, an arylamino group and a heterocyclic amino group), an acylamino group, a ureido group, a sulfamoylamino group, an alkoxycarbonylamino group, an aryloxycarbonylamino group, an alkylthio group, an arylthio group or a heterocyclic thio group, more preferably a hydrogen atom, a halogen atom, an alkyl group, a hydroxy group, an alkoxy group, an aryloxy group, an acyloxy group, an amino group (including an alkylamino group, an arylamino group and a heterocyclic amino group) or an acylamino group, and most preferably a hydrogen atom, an anilino group or an acylamino group, and each group may further have a substituent.

The substituents represented by $R_1$ and $R_2$ each is preferably a hydrogen atom, an alkyl group, a halogen atom, an alkoxycarbonyl group, a carboxyl group, a carbamoyl group, a hydroxy group, an alkoxy group or a cyano group, and each group may further have a substituent.

$R_1$ and $R_5$, or $R_5$ and $R_6$ may combine to form a 5- or 6-membered ring.

When the substituents represented by A, $R_1$, $R_2$, $R_5$, $R_6$ and G each further has a substituent, examples of the substituent include the substituents described above for G, $R_1$ and $R_2$. Also, an ionic hydrophilic group is preferably further present as a substituent on any one position of A, $R_1$, $R_2$, $R_5$, $R_6$ and G.

Examples of the ionic hydrophilic group as a substituent include a sulfo group, a carboxyl group, a phosphono group and a quaternary ammonium group. Among these ionic hydrophilic groups, preferred are a carboxyl group, a phosphono group and a sulfo group, more preferred are a carboxyl group and a sulfo group. The carboxyl group, the phosphono group and the sulfo group each may be in a salt state and examples of the counter ion for forming the salt include ammonium ion, alkali metal ions (e.g., lithium ion, sodium ion, potassium ion) and organic cations (e.g., tetramethylammonium ion, tetramethylguanidium ion, tetramethylphosphonium).

When B has a ring structure, preferred examples of the heterocyclic ring include a thiophene ring, a thiazole ring, an imidazole ring, a benzothiazole ring and a thienothiazole ring. Each heterocyclic group may further have a substituent. Among these heterocyclic rings, a thiophene ring, a thiazole ring, an imidazole ring, a benzothiazole ring and a thienothiazole ring represented by the following formulae (a) to (e) are preferred. When B is a thiophene ring represented by formula (a) and C is a structure represented by formula (4), formula (1) where n=1 corresponds to formula (3).

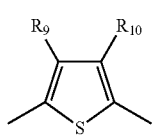
(a)

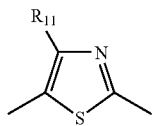
(b)

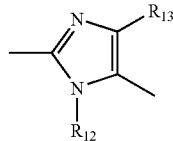
(c)

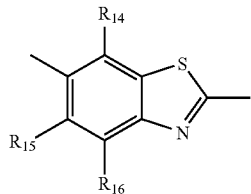
(d)

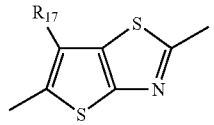
(e)

wherein $R_9$ to $R_{17}$ each represents a substituent having the same meaning as G, $R_1$ and $R_2$ in formula (2).

In the present invention, particularly preferred is a structure represented by the following formula (5):

Formula (5):

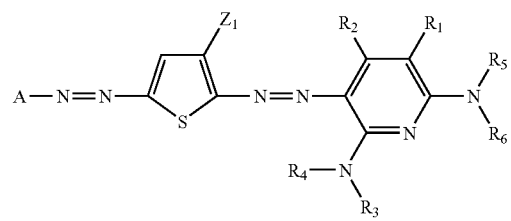

In formula (5), $Z_1$ represents an electron-withdrawing group having a Hammett's substituent constant σp value of 0.20 or more. $Z_1$ is preferably an electron-withdrawing group having a σp value of 0.30 or more, more preferably 0.45 or more, still more preferably 0.60 to more, but the σp value preferably does not exceed 1.0. Specific referred examples of this substituent include electron-withdrawing substituents described later. Among those, preferred are an acyl group having from 2 to 20 carbon atoms, an alkyloxycarbonyl group having from 2 to 20 carbon atoms, a nitro group, a cyano group, an alkylsulfonyl group having from 1 to 20 carbon atoms, an arylsulfonyl group having from 6 to 20 carbon atoms, a carbamoyl group having from 1 to 20 carbon atoms and a halogenated alkyl group having from 1 to 20 carbon atoms, more preferred are a cyano group, an alkylsulfonyl group having from 1 to 20 carbon atoms and an arylsulfonyl group having from 6 to 20 carbon atoms, and most preferred is a cyano group.

R₁, R₂, R₅ and R₆ have the same meanings as in formula (2). R₃ and R₄ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, preferably a hydrogen atom, an aromatic group, a heterocyclic group, an acyl group, an alkylsulfonyl group or an arylsulfonyl group, more preferably a hydrogen atom, an aromatic group or a heterocyclic group.

The groups described in regard to formula (5) each may further have a substituent. When these groups each further has a substituent, examples of the substituent include the substituents described in regard to formula (2), the groups described as examples for G, R₁ and R₂, and ionic hydrophilic groups.

Here, the Hammett's substituent constant $\sigma_p$ value used in the present invention is described. The Hammett's rule is an empirical rule advocated by L. P. Hammett in 1935 so as to quantitatively discuss the effect of substituent on the reaction or equilibrium of benzene derivatives and its propriety is widely admitted at present. The substituent constant determined by the Hammett's rule includes a σp value and a σm value and these values can be found in a large number of general publications but these are described in detail, for example, in J. A. Dean (compiler), *Lange's Handbook of Chemistry*, 12th ed., McGraw-Hill (1979), and *Kagakuno Ryoiki* (*Chemistry Region*), special number, No. 122, pp. 96-103, Nankodo (1979). In the present invention, each substituent is limited or described by using the Hammett's substituent constant $\sigma_p$ but this does not mean that the substituent is limited only to those having a known value which can be found in the above-described publications. Needless to say, the substituent includes substituents of which $\sigma_p$ value is not known in publications but when measured based on the Hammett's rule, falls within the range specified. Furthermore, although formulae (1) and (2) of the present invention include those which are not a benzene derivative, the $\sigma_p$ value is used as a measure for showing the electron effect of the substituent irrespective of the substitution site. In the present invention, the $\sigma_p$ value is used in this meaning.

Examples of the electron-withdrawing group having a Hammett's substituent constant $\sigma_p$ value of 0.60 or more include a cyano group, a nitro group, an alkylsulfonyl group (e.g., methylsulfonyl) and an arylsulfonyl group (e.g., benzenesulfonyl).

Examples of the electron-withdrawing group having a Hammett's $\sigma_p$ value of 0.45 or more include, in addition to those described above, an acyl group (e.g., acetyl), an alkoxycarbonyl group (e.g., dodecyloxycarbonyl), an aryloxycarbonyl group (e.g., m-chlorophenoxycarbonyl), an alkylsulfinyl group (e.g., n-propylsulfinyl), an arylsulfinyl group (e.g., phenylsulfinyl), a sulfamoyl group (e.g., N-ethylsulfamoyl, N,N-dimethylsulfamoyl) and a halogenated alkyl group (e.g., trifluoromethyl).

Examples of the electron-withdrawing group having a Hammett's substituent constant $\sigma_p$ value of 0.30 or more include, in addition to those described above, an acyloxy group (e.g., acetoxy), a carbamoyl group (e.g., N-ethylcarbamoyl, N,N-dibutylcarbamoyl), a halogenated alkoxy group (e.g., trifluoromethyloxy), a halogenated aryloxy group (e.g., pentafluorophenyloxy), a sulfonyloxy group (e.g., methylsulfonyloxy), a halogenated alkylthio group (e.g., difluoromethylthio), an aryl group substituted by two or more electron-withdrawing groups having a $\sigma_p$ value of 0.15 or more (e.g., 2,4-dinitrophenyl, pentachlorophenyl) and a heterocyclic ring (e.g., 2-benzoxazolyl, 2-benzothiazolyl, 1-phenyl-2-benzimidazolyl).

Specific examples of the electron-withdrawing group having a $\sigma_p$ value of 0.20 or more include, in addition to those described above, a halogen atom.

The preferred combination of substituents in the azo dye represented by formula (3) is described below. R₅ and R₆ each is preferably a hydrogen atom, an alkyl group, an aryl group, a heterocyclic group, a sulfonyl group or an acyl group, more preferably a hydrogen atom, an aryl group, a heterocyclic group or a sulfonyl group, and most preferably a hydrogen atom, an aryl group or a heterocyclic group. However, R₅ and R₆ are not a hydrogen atom at the same time.

G is preferably a hydrogen atom, a halogen atom, an alkyl group, a hydroxyl group, an amino group or an acylamino group, more preferably a hydrogen atom, a halogen atom, an amino group or an acylamino group, and most preferably a hydrogen atom, an amino group or an acylamino group.

A is preferably a pyrazole ring, an imidazole ring, an isothiazole ring, a thiadiazole ring or a benzothiazole ring, more preferably a pyrazole ring or an isothiazole ring, and most preferably a pyrazole ring.

B₁ and B₂ each is =CR₁- or —CR₂=, and R₁ and R₂ each is preferably a hydrogen atom, an alkyl group, a halogen atom, a cyano group, a carbamoyl group, a carboxyl group, a hydroxyl group, an alkoxy group or an alkoxycarbonyl group, more preferably a hydrogen atom, an alkyl group, a carboxyl group, a cyano group or a carbamoyl group.

As for the preferred combination of substituents in the azo dye, a compound where at least one of various substituents is the preferred group is preferred, a compound where a larger number of various substituents are the preferred groups is more preferred, and a compound where all substituents are the preferred groups is most preferred.

Specific examples of the azo dye are set forth below, however, the azo dye for use in the present invention is not limited to those set forth below. The carboxyl group, the phosphono group and the sulfo group each may be in a salt state and examples of the counter ion for forming the salt include ammonium ion, alkali metal ions (e.g., lithium ion, sodium ion, potassium ion) and organic cations (e.g., tetramethylammonium ion, tetramethylguanidium ion, tetramethylphosphonium).

TABLE 1
A—N=N—B—N=N—C
| | A | B | C |
|---|---|---|---|
| (ba-1) | 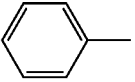 | 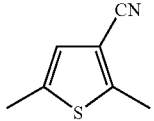 | 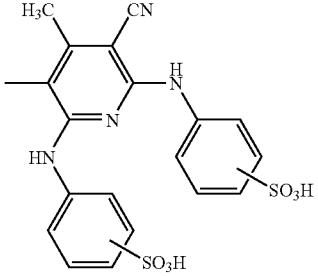 |
| (ba-2) | 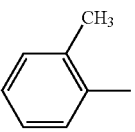 | 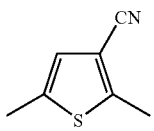 | 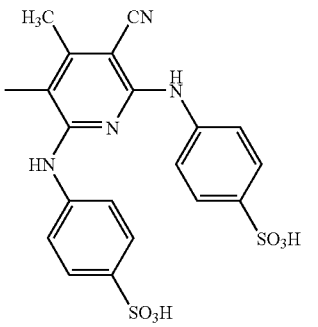 |
| (ba-3) | 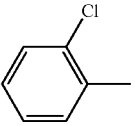 | 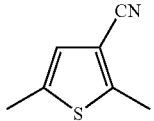 | 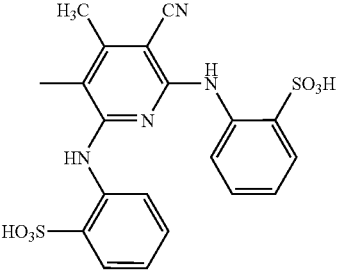 |
| (ba-4) | 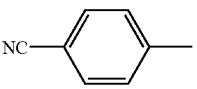 | 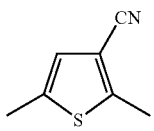 | 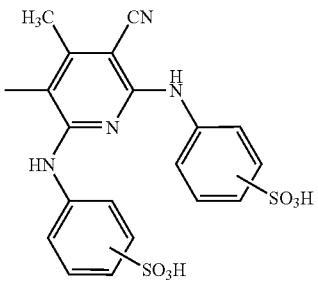 |
| (ba-5) | 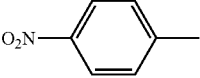 | 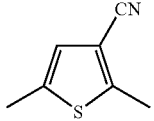 | 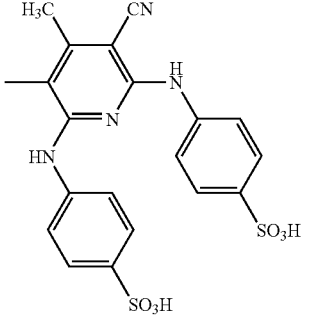 |

TABLE 1-continued
| | A | B | C |
|---|---|---|---|
| (ba-6) | 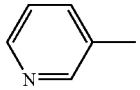 | 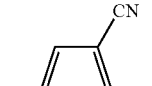 | 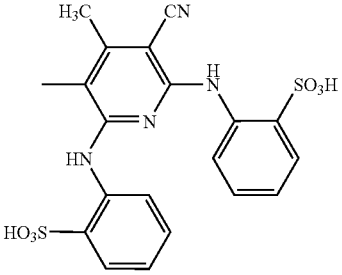 |
TABLE 2
| | A | B | C |
|---|---|---|---|
| (bb-1) | 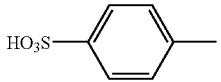 | 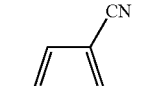 | 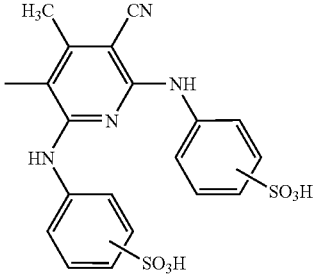 |
| (bb-2) | 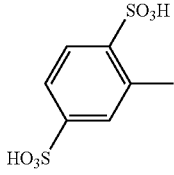 | 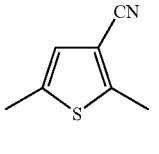 | 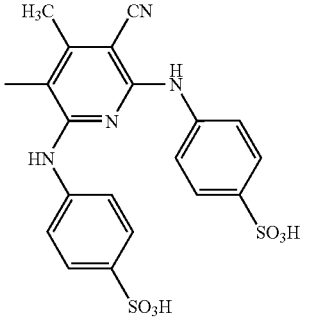 |
| (bb-3) | 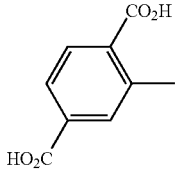 | 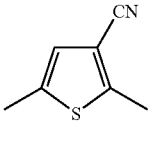 | 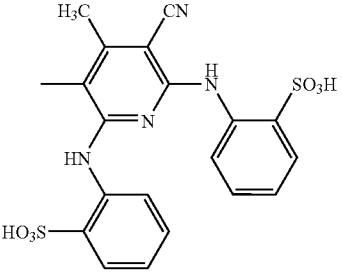 |

TABLE 2-continued

| | A—N=N—B—N=N—C | | |
|---|---|---|---|
| | A | B | C |
| (bb-4) | 3,5-dicarboxy-methylbenzene (HO₂C, HO₂C, CH₃ substituents) | 2,5-dimethyl-3-cyanothiophene | 3-cyano-4-methyl-5-methyl-2,6-bis[(4-sulfophenyl)amino]pyridine |
| (bb-5) | 4-methyl-1-naphthalenesulfonic acid | 2,5-dimethyl-3-cyanothiophene | 3-cyano-4-methyl-5-methyl-2,6-bis[(4-sulfophenyl)amino]pyridine |
| (bb-6) | 6-methyl-1-naphthalenesulfonic acid | 2,5-dimethyl-3-cyanothiophene | 3-cyano-4-methyl-5-methyl-2,6-bis[(2-sulfophenyl)amino]pyridine |
| (bb-7) | 3,7-disulfo-6-methylnaphthalene | 2,5-dimethyl-3-cyanothiophene | 3-cyano-4-methyl-5-methyl-2,6-bis[(sulfophenyl)amino]pyridine |

TABLE 3

A—N=N—B—N=N—C

| A | B | C |
|---|---|---|
| (bc-1) structure: 2-methylthio-5-methyl-1,3,4-thiadiazole | 2,5-dimethyl-4-methyl-3-cyanothiophene | 4-methyl-3-methyl-pyridine with two NH-phenyl-SO$_3$H substituents |
| (bc-2) 2-methylthiazole | 2,5-dimethyl-4-phenyl-3-(CO$_2$CH$_3$)thiophene | pyridine with CH$_3$, CO$_2$NH$_2$, and two NH-C$_6$H$_4$-SO$_3$H groups |
| (bc-3) 2-methylbenzothiazole | 2,5-dimethyl-4-phenyl-3-cyanothiophene | pyridine with CH$_3$, CN, and two NH-C$_6$H$_4$-CO$_2$H groups |
| (bc-4) 3-methylphenylphosphonic acid (H$_2$O$_3$P-) | 2,5-dimethyl-4-methyl-3-(CO$_2$CH$_3$)thiophene | pyridine with CH$_3$ and two NH-C$_6$H$_4$-CO$_2$H groups |

TABLE 3-continued
A—N=N—B—N=N—C
| | A | B | C |
|---|---|---|---|
| (bc-5) | 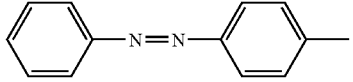 | 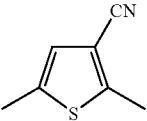 | 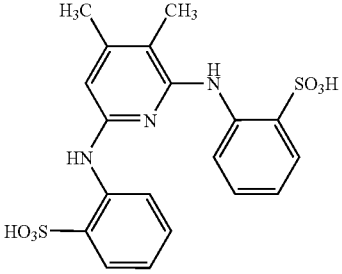 |
TABLE 4
A—N=N—B—N=N—C
| | A | B | C |
|---|---|---|---|
| (bd-1) | 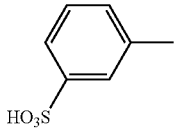 | 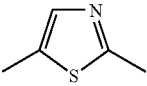 | 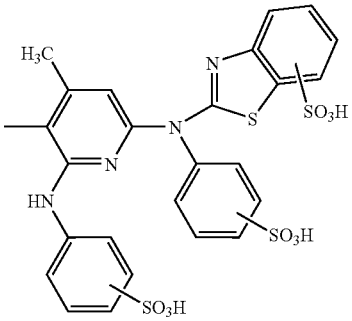 |
| (bd-2) | 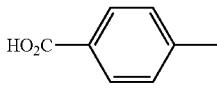 | 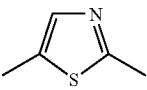 | 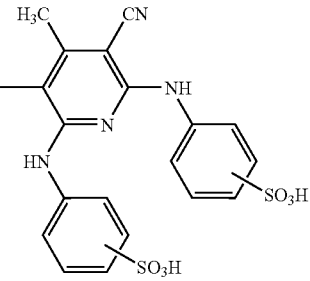 |
| (bd-3) | 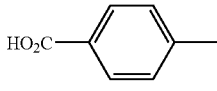 | 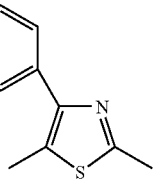 | 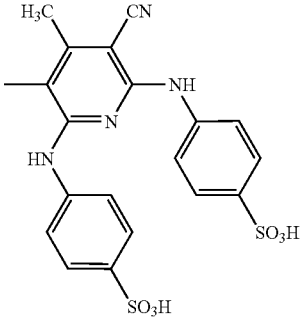 |

TABLE 4-continued

A—N=N—B—N=N—C

| | A | B | C |
|---|---|---|---|
| (bd-4) | HO₃S–⟨phenyl⟩– | 2,5-dimethyl-thiazol-4-yl (thiophene-substituted) | 4-methyl-3-methyl-5-cyano-pyridine with NH-(2-sulfophenyl) and NH-(2-sulfophenyl) |
| (bd-5) | HO₂C–⟨phenyl⟩– | 1-methyl-5-methyl-4-cyano-imidazol-2-yl | 4-methyl-3-methyl-5-cyano-pyridine with NH-(sulfophenyl) groups |
| (bd-6) | HO₃S–⟨phenyl⟩– | 1-ethyl-5-methyl-4-cyano-imidazol-2-yl | 4-methyl-3-methyl-5-cyano-pyridine with NH-(4-sulfophenyl) groups |

TABLE 5

A—N=N—B—N=N—C

| | A | B | C |
|---|---|---|---|
| (be-1) | HO₃S–⟨phenyl⟩– | 2,6-dimethyl-benzothiazol-yl | 4-methyl-3-methyl-5-cyano-pyridine with NH-(sulfophenyl) groups |

TABLE 5-continued
A—N=N—B—N=N—C
| | A | B | C |
|---|---|---|---|
| (be-2) | 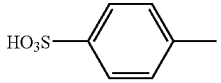 | 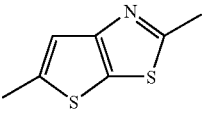 | 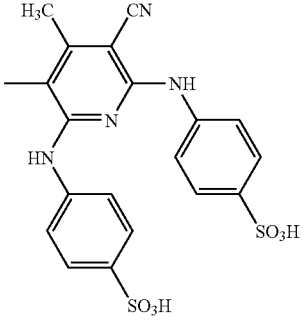 |
TABLE 6
A—N=N—B—N=N—C
| | A | B | C |
|---|---|---|---|
| (bf-1) | 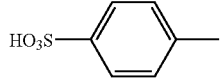 | 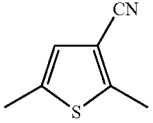 | 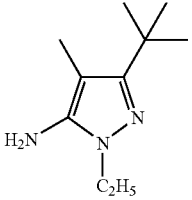 |
| (bf-2) | 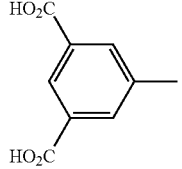 | 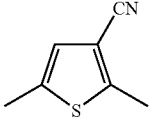 | 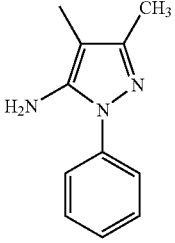 |
| (bf-3) | 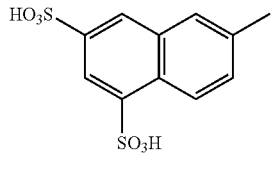 | 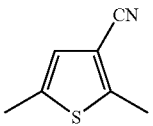 | 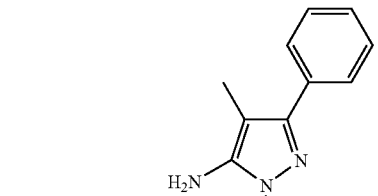 |

TABLE 6-continued

A—N=N—B—N=N—C

| A | B | C |
|---|---|---|

(bf-4)

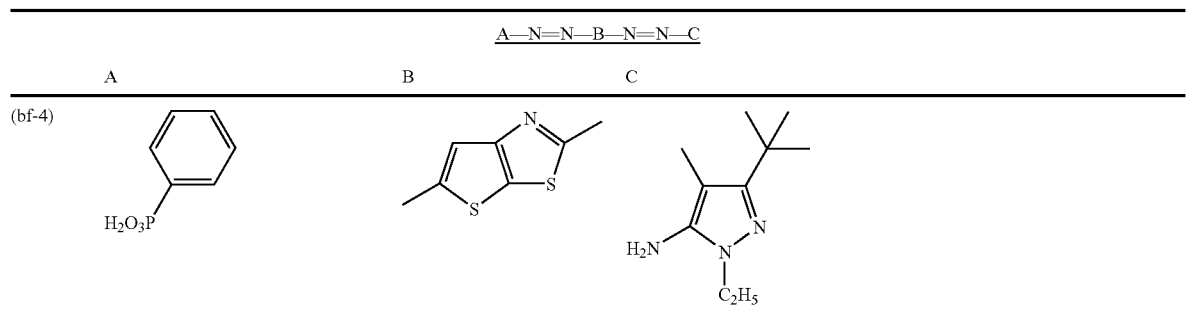

The dyes (Dye a) represented by formulae (1), (2), (3) and (5) can be synthesized by a coupling reaction of a diazo component and a coupler. As the main synthesis method, the method described in Japanese Patent Application No. 2002-113460 can be used.

For the dye having λmax in the region from 350 to 500 nm, a yellow dye or pigment described later is preferably used.

The black ink composition of the present invention contains the "black dye (ab)" [Dye b described in (a) of 1) above and Dye a represented by formula (1)] preferably in an amount of 0.2 to 20 wt %, more preferably from 0.5 to 15 wt %.

The black ink composition of the present invention is characterized in that the ink composition is obtained by dissolving and/or dispersing at least one black dye (ab) in an aqueous medium.

The black dye (ab) (preferably Dye a) of the present invention is substantially soluble or dispersible in water. In particular, the ink composition containing the black dye of the present invention is preferably a solution-type ink composition using a water-soluble dye. More specifically, the solubility of the dye in water at 20° C. is preferably 2 wt % or more, more preferably 5 wt % or more. Also, the dyes for use in the present invention preferably have a solubility of 2 wt % or more in water at 20° C.

In the case of using two or more ink compositions in combination, one dye may be contained alone or a mixture of dyes may be contained in the ink composition. In the case of a mixture of dyes, the ink composition of the present invention preferably contains at least 10 wt % or more of the black dye (ab) of the present invention.

In the case of producing two or more ink compositions, one ink may be produced as a light-type ink and another may be produced as a thick ink. In the present invention, these inks can be separately produced or ink compositions having almost the same concentration can also be produced.

Examples of the dye which can be used other than the black dye (ab) include dyes known in this field, such as triarylmethane dye, anthraquinone dye, anthrapyridone dye, azomethine dye, azo dye, cyanine dye, merocyanine dye and oxonol dye, and these dyes can be used individually or in combination (preferably in combination of giving a black dye). Among these, azo dyes are preferred. Also, a black pigment can be used in combination. Preferred examples thereof include carbon black.

<Magenta Ink>

The coloring agent in the magenta ink for use in the present invention is an azo dye where a heterocyclic group is directly bonded to the azo group, preferably an azo group where a heterocyclic group is directly bonded to both sides of the azo group. When the coloring agent has such a structure and contains a substituent having a proper Hammett's a value described later, the dye can be reduced in the reactivity with oxidative gas such as ozone and can have an oxidation potential more positive than 1.0 V (vs SCE). A more positive oxidation potential is more preferred and the oxidation potential is more preferably more positive than 1.1 V (vs SCE) and most preferably more positive than 1.2 V (vs SCE).

The magenta dye for use in the magenta ink or light magenta ink of the present invention is preferably a compound represented by the following formula (M-I):

Formula (M-I):

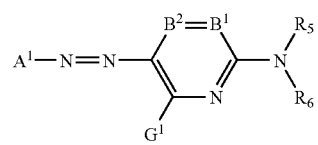

wherein $A^1$ represents a 5-membered heterocyclic group;

$B^1$ and $B^2$ each represents =$CR^1$- or —$CR^2$= or either one of $B^1$ and $B^2$ represents a nitrogen atom and the other represents =$CR^1$- or —$CR^2$=;

$R^5$ and $R_6$ each independently represents a hydrogen atom or a substituent, the substituent is an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and the hydrogen atom of each substituent may be substituted;

$G^1$, $R^1$ and $R^2$ each independently represents a hydrogen atom or a substituent, the substituent is a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an alkylamino group, an arylamino group and a heterocyclic amino group), an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and the hydrogen atom of each substituent may be substituted; and $R^1$ and $R^5$, or $R^5$ and $R^6$ may combine to form a 5- or 6-membered ring.

The dye of formula (M-I) is described in more detail.

In formula (M-I), $A^1$ represents a 5-membered heterocyclic group. Examples of the heteroatom of the heterocyclic ring include N, O and S. $A^1$ is preferably a nitrogen-containing 5-membered heterocyclic ring and the heterocyclic ring may be condensed with an aliphatic ring, an aromatic ring or another heterocyclic ring. Preferred examples of the heterocyclic ring include a pyrazole ring, an imidazole ring, a thiazole ring, an isothiazole ring, a thiadiazole ring, a benzothiazole ring, a benzoxazole ring and a benzisothiazole ring. Each heterocyclic group may further have a substituent. Among those rings, more preferred are a pyrazole ring, an imidazole ring, an isothiazole ring, a thiadiazole ring and a benzothiazole ring represented by the following formulae (a) to (f):

(a)
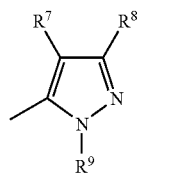

(b)
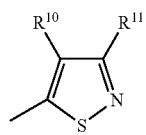

(c)
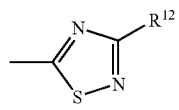

(d)
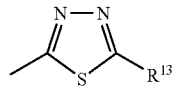

(e)
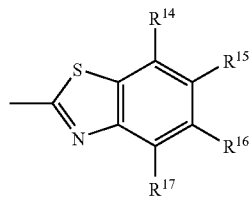

(f)
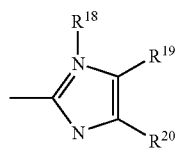

wherein $R^7$ to $R^{20}$ each represents the same substituent as $G^1$, $R^1$ and $R^2$ in formula (M-I).

Among formulae (a) to (f), preferred are a pyrazole ring and an isothiazole ring represented by formulae (a) and (b), and most preferred is a pyrazole ring represented by formula (a).

In formula (M-I), $B^1$ and $B^{12}$ each represents =$CR^1$- or —$CR^2$= or either one of $B^1$ and $B^{12}$ represents a nitrogen atom and the other represents =$CR^1$- or —$CR^2$=. $B^1$ and $B^2$ each preferably represents =$CR^1$- or —$CR^2$=.

$R^5$ and $R^6$ each independently represents a hydrogen atom or a substituent, the substituent is an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and the hydrogen atom of each substituent may be substituted.

$R^5$ and $R^6$ each is preferably a hydrogen atom, an aliphatic group, an aromatic group, a heterocyclic group, an acyl group, an alkylsulfonyl group or an arylsulfonyl group, more preferably a hydrogen atom, an aromatic group, a heterocyclic group, an acyl group, an alkylsulfonyl group or an arylsulfonyl group, and most preferably a hydrogen atom, an aryl group or a heterocyclic group, and the hydrogen atom of each substituent may be substituted, but $R^5$ and $R_6$ are not a hydrogen atom at the same time.

$G^1$, $R^1$ and $R^2$ each independently represents a hydrogen atom or a substituent, the substituent is a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an alkylamino group, an arylamino group and a heterocyclic amino group), an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and the hydrogen atom of each substituent may be substituted.

$G^1$ is preferably a hydrogen atom, a halogen atom, an aliphatic group, an aromatic group, a hydroxy group, an alkoxy group, an aryloxy group, an acyloxy group, a heterocyclic oxy group, an amino group (including an alkylamino group, an arylamino group and a heterocyclic amino group), an acylamino group, a ureido group, a sulfamoylamino group, an alkoxycarbonylamino group, an aryloxycarbonylamino group, an alkylthio group, an arylthio group or a heterocyclic thio group, more preferably a hydrogen atom, a halogen atom, an alkyl group, a hydroxy group, an alkoxy group, an aryloxy group, an acyloxy group, an amino group or an acylamino group, and most preferably a hydrogen atom, an amino group (preferably an anilino group) or an acylamino group, and the hydrogen atom of each substituent may be substituted.

$R^1$ and $R^2$ each is preferably a hydrogen atom, an alkyl group, a halogen atom, an alkoxycarbonyl group, a carboxyl group, a carbamoyl group, a hydroxy group, an alkoxy group or a cyano group, and the hydrogen atom of each substituent may be substituted.

$R^1$ and $R^5$, or $R^5$ and $R^6$ may combine to form a 5- or 6-membered ring.

When $A^1$ has a substituent or when the substituent $R^1$, $R^2$, $R^5$, $R^6$ or $G^1$ further has a substituent, examples of the substituent include the substituents set forth above for $G^1$, $R^1$ and $R^2$.

In the case where the dye of formula (M-I) of the present invention is a water-soluble dye, the dye preferably has further an ionic hydrophilic group as a substituent on any position of $A^1$, $R^1$, $R^2$, $R^5$, $R^6$ and $G^1$. Examples of the ionic hydrophilic group as a substituent include a sulfo group, a carboxyl group, a phosphono group and a quaternary ammonium group. Among these ionic hydrophilic groups, preferred are a carboxyl group, a phosphono group and a sulfo group, more preferred are a carboxyl group and a sulfo group. The carboxyl group, the phosphono group and the sulfo group each may be in a salt state and examples of the counter ion for forming the salt include ammonium ion, alkali metal ions (e.g., lithium ion, sodium ion, potassium ion) and organic cations (e.g., tetramethylammonium ion, tetramethylguanidium ion, tetramethylphosphonium).

The terms (substituents) used in the present invention are described below. These terms each is common among different symbols in formula (M-I) and also in formula (M-Ia) shown later.

The halogen atom includes a fluorine atom, a chlorine atom and a bromine atom.

The aliphatic group means an alkyl group, a substituted alkyl group, an alkenyl group, a substituted alkenyl group, an alkynyl group, a substituted alkynyl group, an aralkyl group and a substituted aralkyl group. The "substituted" used for a "substituted alkyl group" and the like in the present invention means that the hydrogen atom present in an "alkyl group" and the like is substituted by a substituent described above for $G^1$, $R^1$ and $R^2$.

The aliphatic group may be branched or may form a ring. The number of carbon atoms in the aliphatic group is preferably from 1 to 20, more preferably from 1 to 16. The aryl moiety in the aralkyl group and the substituted aralkyl group is preferably a phenyl group or a naphthyl group, more preferably a phenyl group. Examples of the aliphatic group include a methyl group, an ethyl group, a butyl group, an isopropyl group, a tert-butyl group, a hydroxyethyl group, a methoxyethyl group, a cyanoethyl group, a trifluoromethyl group, a 3-sulfopropyl group, a 4-sulfobutyl group, a cyclohexyl group, a benzyl group, a 2-phenethyl group, a vinyl group and an allyl group.

The aromatic group means an aryl group and a substituted aryl group. The aryl group is preferably a phenyl group or a naphthyl group, more preferably a phenyl group. The number of carbon atoms in the aromatic group is preferably from 6 to 20, more preferably from 6 to 16.

Examples of the aromatic group include a phenyl group, a p-tolyl group, a p-methoxyphenyl group, an o-chlorophenyl group and an m-(3-sulfopropylamino)phenyl group.

The heterocyclic group includes a substituted heterocyclic group. In the heterocyclic group, the heterocyclic ring may be condensed with an aliphatic ring, an aromatic ring or another heterocyclic ring. The heterocyclic group is preferably a 5- or 6-membered heterocyclic group. Examples of the substituent of the substituted heterocyclic group include an aliphatic group, a halogen atom, an alkylsulfonyl group, an arylsulfonyl group, an acyl group, an acylamino group, a sulfamoyl group, a carbamoyl group and an ionic hydrophilic group. Examples of the heterocyclic group include a 2-pyridyl group, a 2-thienyl group, a 2-thiazolyl group, a 2-benzothiazolyl group, a 2-benzoxazolyl group and a 2-furyl group.

The carbamoyl group includes a substituted carbamoyl group. Examples of the substituent include an alkyl group. Examples of the carbamoyl group include a methylcarbamoyl group and a dimethylcarbamoyl group.

The alkoxycarbonyl group includes a substituted alkoxycarbonyl group. The alkoxycarbonyl group is preferably an alkoxycarbonyl group having from 2 to 20 carbon atoms. Examples of the substituent include an ionic hydrophilic group. Examples of the alkoxycarbonyl group include a methoxycarbonyl group and an ethoxycarbonyl group.

The aryloxycarbonyl group includes a substituted aryloxycarbonyl group. The aryloxycarbonyl group is preferably an aryloxycarbonyl group having from 7 to 20 carbon atoms. Examples of the substituent include an ionic hydrophilic group. Examples of the aryloxycarbonyl group include a phenoxycarbonyl group.

The heterocyclic oxycarbonyl group includes a substituted heterocyclic oxycarbonyl group. Examples of the heterocyclic ring include the heterocyclic rings described above for the heterocyclic group. The heterocyclic oxycarbonyl group is preferably a heterocyclic oxycarbonyl group having from 2 to 20 carbon atoms. Examples of the substituent include an ionic hydrophilic group. Examples of the heterocyclic oxycarbonyl group include a 2-pyridyloxycarbonyl group.

The acyl group includes a substituted acyl group. The acyl group is preferably an acyl group having from 1 to 20 carbon atoms. Examples of the substituent include an ionic hydrophilic group. Examples of the acyl group include an acetyl group and a benzoyl group.

The alkoxy group includes a substituted alkoxy group. The alkoxy group is preferably an alkoxy group having from 1 to 20 carbon atoms. Examples of the substituent include an alkoxy group, a hydroxyl group and an ionic hydrophilic group. Examples of the alkoxy group include a methoxy group, an ethoxy group, an isopropoxy group, a methoxyethoxy group, a hydroxyethoxy group and a 3-carboxypropoxy group.

The aryloxy group includes a substituted aryloxy group. The aryloxy group is preferably an aryloxy group having from 6 to 20 carbon atoms. Examples of the substituent include an alkoxy group and an ionic hydrophilic group. Examples of the aryloxy group include a phenoxy group, a p-methoxyphenoxy group and an o-methoxyphenoxy group.

The heterocyclic oxy group includes a substituted heterocyclic oxy group. Examples of the heterocyclic ring include the heterocyclic rings described above for the heterocyclic group. The heterocyclic oxy group is preferably a heterocyclic oxy group having from 2 to 20 carbon atoms. Examples of the substituent include an alkyl group, an alkoxy group and an ionic hydrophilic group. Examples of the heterocyclic oxy group include a 3-pyridyloxy group and a 3-thienyloxy group.

The silyloxy group is preferably a silyloxy group substituted by an aliphatic or aromatic group having from 1 to 20 carbon atoms. Examples of the silyloxy group include a trimethylsilyloxy group and a diphenylmethylsilyloxy group.

The acyloxy group includes a substituted acyloxy group. The acyloxy group is preferably an acyloxy group having from 1 to 20 carbon atoms. Examples of the substituent include an ionic hydrophilic group. Examples of the acyloxy group include an acetoxy group and a benzoyloxy group.

The carbamoyloxy group includes a substituted carbamoyloxy group. Examples of the substituent include an alkyl group. Examples of the carbamoyloxy group include an N-methylcarbamoyloxy group.

The alkoxycarbonyloxy group includes a substituted alkoxycarbonyloxy group. The alkoxycarbonyloxy group is preferably an alkoxycarbonyloxy group having from 2 to 20 carbon atoms. Examples of the alkoxycarbonyloxy group include a methoxycarbonyloxy group and an isopropoxycarbonyloxy group.

The aryloxycarbonyloxy group includes a substituted aryloxycarbonyloxy group. The aryloxycarbonyloxy group is preferably an aryloxycarbonyloxy group having from 7 to 20 carbon atoms. Examples of the aryloxycarbonyloxy group include a phenoxycarbonyloxy group.

The amino group includes a substituted amino group. Examples of the substituent include an alkyl group, an aryl group and a heterocyclic group, and the alkyl group, the aryl group and the heterocyclic group each may further have a substituent. The alkylamino group includes a substituted alkylamino group. The alkylamino group is preferably an alkylamino group having from 1 to 20 carbon atoms. Examples of the substituent include an ionic hydrophilic group. Examples of the alkylamino group include a methylamino group and a diethylamino group.

The arylamino group includes a substituted arylamino group. The arylamino group is preferably an arylamino group having from 6 to 20 carbon atoms. Examples of the substituent include a halogen atom and an ionic hydrophilic group. Examples of the arylamino group include a phenylamino group and a 2-chlorophenylamino group.

The heterocyclic amino group includes a substituted heterocyclic amino group. Examples of the heterocyclic ring include the heterocyclic rings described above for the heterocyclic group. The heterocyclic amino group is preferably a heterocyclic amino group having from 2 to 20 carbon atoms. Examples of the substituent include an alkyl group, a halogen atom and an ionic hydrophilic group.

The acylamino group includes a substituted acylamino group. The acylamino group is preferably an acylamino group having from 2 to 20 carbon atoms. Examples of the substituent include an ionic hydrophilic group. Examples of the acylamino group include an acetylamino group, a propionylamino group, a benzoylamino group, an N-phenylacetylamino group and a 3,5-disulfobenzoylamino group.

The ureido group includes a substituted ureido group. The ureido group is preferably a ureido group having from 1 to 20 carbon atoms. Examples of the substituent include an alkyl group and an aryl group. Examples of the ureido group include a 3-methylureido group, a 3,3-dimethylureido group and a 3-phenylureido group.

The sulfamoylamino group includes a substituted sulfamoylamino group. Examples of the substituent include an alkyl group. Examples of the sulfamoylamino group include an N,N-dipropylsulfamoylamino group.

The alkoxycarbonylamino group includes a substituted alkoxycarbonylamino group. The alkoxycarbonylamino group is preferably an alkoxycarbonylamino group having from 2 to 20 carbon atoms. Examples of the substituent include an ionic hydrophilic group. Examples of the alkoxycarbonylamino group include an ethoxycarbonylamino group.

The aryloxycarbonylamino group includes a substituted aryloxycarbonylamino group. The aryloxycarbonylamino group is preferably an aryloxycarbonylamino group having from 7 to 20 carbon atoms. Examples of the substituent include an ionic hydrophilic group. Examples of the aryloxycarbonylamino group include a phenoxycarbonylamino group.

The alkylsulfonylamino group and the arylsulfonylamino group include a substituted alkylsulfonylamino group and a substituted arylsulfonylamino group, respectively. The alkylsulfonylamino group and the arylsulfonylamino group are preferably an alkylsulfonylamino group having from 1 to 20 carbon atoms and an arylsulfonylamino group having from 7 to 20 carbon atoms, respectively. Examples of the substituent include an ionic hydrophilic group. Examples of the alkylsulfonylamino group and arylsulfonylamino group include a methylsufonylamino group, an N-phenyl-methylsulfonylamino group, a phenylsulfonylamino group and a 3-carboxyphenylsulfonylamino group.

The heterocyclic sulfonylamino group includes a substituted heterocyclic sulfonylamino group. Examples of the heterocyclic ring include the heterocyclic rings described above for the heterocyclic group. The heterocyclic sulfonylamino group is preferably a heterocyclic sulfonylamino group having from 1 to 12 carbon atoms. Examples of the substituent include an ionic hydrophilic group. Examples of the heterocyclic sulfonylamino group include a 2-thienylsulfonylamino group and a 3-pyridylsulfonylamino group.

The alkylthio group, the arylthio group and the heterocyclic thio group include a substituted alkylthio group, a substituted arylthio group and a substituted heterocyclic thio group, respectively. Examples of the heterocyclic ring include the heterocyclic rings described above for the heterocyclic group. The alkylthio group, the arylthio group and the heterocyclic thio group are preferably an alkylthio group having from 1 to 20 carbon atoms, an arylthio group having from 1 to 20 carbon atoms and a heterocyclic thio group having from 1 to 20 carbon atoms, respectively. Examples of the substituent include an ionic hydrophilic group. Examples of the alkylthio group, arylthio group and heterocyclic thio group include a methylthio group, a phenylthio group and a 2-pyridylthio group.

The alkylsulfonyl group and the arylsulfonyl group include a substituted alkylsulfonyl group and a substituted arylsulfonyl group, respectively. Examples of the alkylsulfonyl group and arylsulfonyl group include a methylsulfonyl group and a phenylsulfonyl group.

The heterocyclic sulfonyl group includes a substituted heterocyclic sulfonyl group. Examples of the heterocyclic ring include the heterocyclic rings described above for the heterocyclic group. The heterocyclic sulfonyl group is preferably a heterocyclic sulfonyl group having from 1 to 20 carbon atoms. Examples of the substituent include an ionic hydrophilic group. Examples of the heterocyclic sulfonyl group include a 2-thienylsulfonyl group and a 3-pyridylsulfonyl group.

The alkylsulfinyl group and the arylsulfinyl group include a substituted alkylsulfinyl group and a substituted arylsulfinyl group, respectively. Examples of the alkylsulfinyl group and arylsulfinyl group include a methylsulfinyl group and a phenylsulfinyl group.

The heterocyclic sulfinyl group includes a substituted heterocyclic sulfinyl group. Examples of the heterocyclic ring include the heterocyclic rings described above for the heterocyclic group. The heterocyclic sulfinyl group is preferably a heterocyclic sulfinyl group having from 1 to 20 carbon atoms. Examples of the substituent include an ionic hydrophilic group. Examples of the heterocyclic sulfinyl group include a 4-pyridylsulfinyl group.

The sulfamoyl group includes a substituted sulfamoyl group. Examples of the substituent include an alkyl group. Examples of the sulfamoyl group include a dimethylsulfamoyl group and a di-(2-hydroxyethyl)sulfamoyl group.

In the present invention, particularly preferred is a structure represented by the following formula (M-Ia):

Formula (M-Ia):

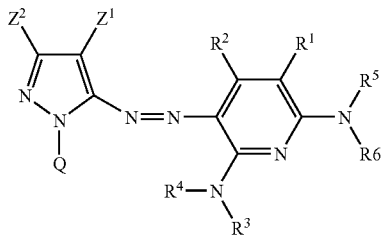

In formula (M-Ia), $R^1$, $R^2$, $R^5$ and $R^6$ have the same meanings as in formula (M-I).

$R^3$ and $R^4$ each independently represents a hydrogen atom or a substituent, and the substituent is an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group. $R^3$ and $R^4$ each is preferably a hydrogen atom, an aromatic group, a heterocyclic group, an acyl group, an alkylsulfonyl group or an arylsulfonyl group, more preferably a hydrogen atom, an aromatic group or a heterocyclic group.

$Z^1$ represents an electron-withdrawing group having a Hammett's substituent constant σp value of 0.20 or more. $Z^1$ is preferably an electron-withdrawing group having a σp value of 0.30 or more, more preferably 0.45 or more, still more preferably 0.60 to more, but the σp value preferably does not exceed 1.0. Specific preferred examples of this substituent include electron-withdrawing substituents described later. Among those, preferred are an acyl group having from 2 to 20 carbon atoms, an alkyloxycarbonyl group having from 2 to 20 carbon atoms, a nitro group, a cyano group, an alkylsulfonyl group having from 1 to 20 carbon atoms, an arylsulfonyl group having from 6 to 20 carbon atoms, a carbamoyl group having from 1 to 20 carbon atoms and a halogenated alkyl group having from 1 to 20 carbon atoms, more preferred are a cyano group, an alkylsulfonyl group having from 1 to 20 carbon atoms and an arylsulfonyl group having from 6 to 20 carbon atoms, and most preferred is a cyano group.

$Z^2$ represents a hydrogen atom or a substituent and the substituent is an aliphatic group, an aromatic group or a heterocyclic group. $Z^2$ is preferably an aliphatic group, more preferably an alkyl group having from 1 to 6 carbon atoms.

Q represents a hydrogen atom or a substituent and the substituent is an aliphatic group, an aromatic group or a heterocyclic group. Q is preferably a group comprising a nonmetallic atom group necessary for forming a 5-, 6-, 7- or 8-membered ring. The 5-, 6-, 7- or 8-membered ring may be substituted, may be a saturated ring or may have an unsaturated bond. Q is more preferably an aromatic group or a heterocyclic group. Preferred examples of the nonmetallic atom include a nitrogen atom, an oxygen atom, a sulfur atom and a carbon atom. Specific examples of the ring structure include a benzene ring, a cyclopentane ring, a cyclohexane ring, a cycloheptane ring, a cyclooctane ring, a cyclohexene ring, a pyridine ring, a pyrimidine ring, a pyrazine ring, a pyridazine ring, a triazine ring, an imidazole ring, a benzimidazole ring, an oxazole ring, a benzoxazole ring, a thiazole ring, a benzothiazole ring, an oxane ring, a sulfolane ring and a thiane ring.

The hydrogen atom of each substituent described in regard to formula (M-Ia) may be substituted. Examples of the substituent include the substituents described in regard to formula (M-I), the groups described as examples for $G^1$, $R^1$ and $R^2$, and ionic hydrophilic groups.

Here, the Hammett's substituent constant σp value used in the present invention is described. The Hammett's rule is an empirical rule advocated by L. P. Hammett in 1935 so as to quantitatively discuss the effect of substituent on the reaction or equilibrium of benzene derivatives and its propriety is widely admitted at present. The substituent constant determined by the Hammett's rule includes a σp value and a σm value and these values can be found in a large number of general publications but these are described in detail, for example, in J. A. Dean (compiler), *Lange's Handbook of Chemistry*, 12th ed., McGraw-Hill (1979), and *Kagakuno Ryoiki* (*Chemistry Region*), special number, No. 122, pp. 96-103, Nankodo (1979). In the present invention, each substituent is limited or described by using the Hammett's substituent constant σp but this does not mean that the substituent is limited only to those having a known value which can be found in the above-described publications. Needless to say, the substituent includes substituents of which σp value is not known in publications but when measured based on the Hammett's rule, falls within the range specified. Furthermore, although formula (1a) of the present invention include those which are not a benzene derivative, the σp value is used as a measure for showing the electron effect of the substituent irrespective of the substitution site. In the present invention, the σp value is used in this meaning.

Examples of the electron-withdrawing group having a Hammett's substituent constant σp value of 0.60 or more include a cyano group, a nitro group, an alkylsulfonyl group (e.g., methylsulfonyl) and an arylsulfonyl group (e.g., phenylsulfonyl).

Examples of the electron-withdrawing group having a Hammett's σp value of 0.45 or more include, in addition to those described above, an acyl group (e.g., acetyl), an alkoxycarbonyl group (e.g., dodecyloxycarbonyl), an aryloxycarbonyl group (e.g., m-chlorophenoxycarbonyl), an alkylsulfinyl group (e.g., n-propylsulfinyl), an arylsulfinyl group (e.g., phenylsulfinyl), a sulfamoyl group (e.g., N-ethylsulfamoyl, N,N-dimethylsulfamoyl) and a halogenated alkyl group (e.g., trifluoromethyl).

Examples of the electron-withdrawing group having a Hammett's substituent constant σp value of 0.30 or more include, in addition to those described above, an acyloxy group (e.g., acetoxy), a carbamoyl group (e.g., N-ethylcarbamoyl, N,N-dibutylcarbamoyl), a halogenated alkoxy group (e.g., trifluoromethyloxy), a halogenated aryloxy group (e.g., pentafluorophenyloxy), a sulfonyloxy group (e.g., methylsulfonyloxy), a halogenated alkylthio group (e.g., difluoromethylthio), an aryl group substituted by two or more electron-withdrawing groups having a σp value of 0.15 or more (e.g., 2,4-dinitrophenyl, pentachlorophenyl) and a heterocyclic ring (e.g., 2-benzoxazolyl, 2-benzothiazolyl, 1-phenyl-2-benzimidazolyl).

Specific examples of the electron-withdrawing group having a σp value of 0.20 or more include, in addition to those described above, a halogen atom.

The preferred combination of substituents in the azo dye represented by formula (M-I) is described below. $R^5$ and $R^6$ each is preferably a hydrogen atom, an alkyl group, an aryl group, a heterocyclic group, a sulfonyl group or an acyl group, more preferably a hydrogen atom, an aryl group, a heterocyclic group or a sulfonyl group, and most preferably a hydrogen atom, an aryl group or a heterocyclic group.

However, $R^5$ and $R^6$ are not a hydrogen atom at the same time.

$G^1$ is preferably a hydrogen atom, a halogen atom, an alkyl group, a hydroxyl group, an amino group or an acylamino group, more preferably a hydrogen atom, a halogen atom, an amino group or an acylamino group, and most preferably a hydrogen atom, an amino group or an acylamino group.

$A^1$ is preferably a pyrazole ring, an imidazole ring, an isothiazole ring, a thiadiazole ring or a benzothiazole ring, more preferably a pyrazole ring or an isothiazole ring, and most preferably a pyrazole ring.

$B^1$ and $B^2$ each is $=CR^1$- or $—CR^2=$, and $R^1$ and $R^2$ each is preferably a hydrogen atom, an alkyl group, a halogen atom, a cyano group, a carbamoyl group, a carboxyl group, a hydroxyl group, an alkoxy group or an alkoxycarbonyl group, more preferably a hydrogen atom, an alkyl group, a carboxyl group, a cyano group or a carbamoyl group.

As for the preferred combination of substituents in the compound represented by formula (M-I), a compound where at least one of various substituents is the preferred group is preferred, a compound where a larger number of various substituents are the preferred groups is more preferred, and a compound where all substituents are the preferred groups is most preferred.

Specific examples of the compound (azo dye) represented by formula (M-I) are set forth below, however, the azo dye for use in the present invention is not limited to those set forth below.

TABLE 7

[Structure of azo dye with pyrazole ring bearing tert-butyl and CN substituents, connected via N=N to a pyridine ring bearing CH$_3$, CN, and two NH-R groups (R$_2$ and R$_3$)]

| Dye | $R_1$ | $R_2$ | $R_3$ |
|---|---|---|---|
| a-1 | 2-benzothiazolyl | —C$_6$H$_4$—C$_8$H$_{17}$ (p) | —C$_6$H$_4$—C$_8$H$_{17}$ (p) |
| a-2 | 5-chloro-2-benzothiazolyl | —C$_6$H$_4$—C$_8$H$_{17}$ (p) | 2,4,6-trimethylphenyl |
| a-3 | 6-chloro-2-benzothiazolyl | 2,4,6-trimethylphenyl | —C$_6$H$_4$—C$_8$H$_{17}$ (p) |
| a-4 | 2-benzothiazolyl | 2-(OC$_8$H$_{17}$)phenyl | —C$_6$H$_4$—C$_8$H$_{17}$ (p) |
| a-5 | 5-nitro-2-benzothiazolyl | 2,4-dimethylphenyl | 2,4-dimethylphenyl |

TABLE 8
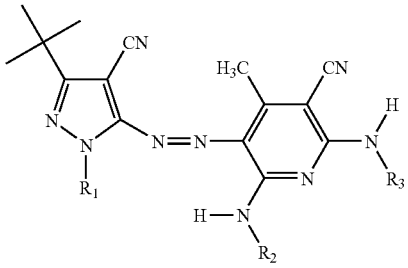
| Dye | R₁ | R₂ | R₃ |
|---|---|---|---|
| a-6 | 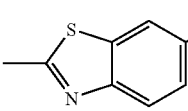 | 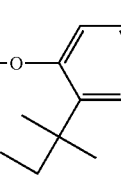 | 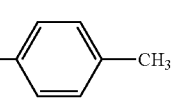 |
| a-7 | 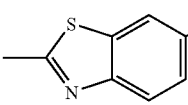 | 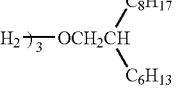 | 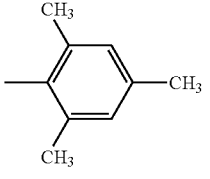 |
| a-8 | 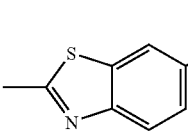 | 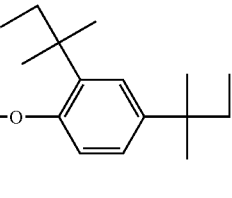 | 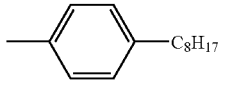 |
| a-9 | 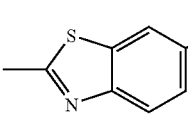 | 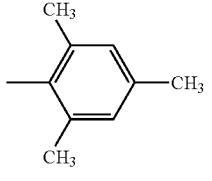 | $C_8H_{17}(t)$ |
| a-10 | 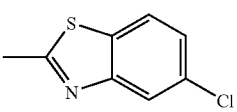 | 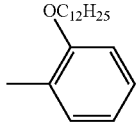 | 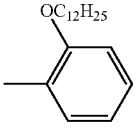 |

TABLE 9

| Dye | R₁ | R₂ | R₃ | R₄ |
|---|---|---|---|---|
| a-11 | t-Bu | 2-methylbenzothiazol-6-yl-SO₂Na | 4-methylphenyl | 4-SO₃Na-phenyl |
| a-12 | phenyl | 2-methylbenzothiazol-6-yl-COOH | 4-SO₃K-phenyl | 3-COOH-phenyl |
| a-13 | 2-chlorophenyl | 2-methylbenzothiazol-SO₃K (4,5-mix) | 4-SO₃K-phenyl | 3-COOH-phenyl |
| a-14 | t-Bu | 2-methylbenzothiazol-6-yl-SO₃Na | 2,3,5-trimethyl-6-SO₃Na-phenyl | 2,3,5-trimethyl-6-SO₃Na-phenyl |
| a-15 | t-Bu | 2-methylbenzothiazol-6-yl-SO₃K | 2,3,5-trimethyl-6-SO₃K-phenyl | 2,3,5-trimethyl-6-SO₃K-phenyl |
| a-16 | t-Bu | 2-methyl-6-chlorobenzothiazolyl | 3,5-dimethyl-4-CH₂N(CH₂CO₂H)₂-phenyl | 3,5-dimethyl-4-CH₂N(CH₂CO₂H)₂-phenyl |
| a-17 | t-Bu | 2-methylbenzothiazol-6-yl-SO₃Na | 3,4,5-trimethyl-SO₃Na-phenyl | 3,4,5-trimethyl-SO₃Na-phenyl |

TABLE 10

*p*-toluenesulfonate sodium (—C₆H₄—SO₃Na, para-methyl): structure shown above table

| Dye | R₁ | R₂ | R₃ | R₄ |
|---|---|---|---|---|
| a-18 | 2-benzothiazolyl | 2-benzothiazolyl | 2,4,6-trimethylphenyl | 2,4,6-trimethylphenyl |
| a-19 | 5-chloro-2-benzothiazolyl | —SO₂CH₃ | 2,4,6-trimethylphenyl | 4-methylphenyl |
| a-20 | 2-benzothiazolyl | —COCH₃ | C₈H₁₇(t) | C₈H₁₇(t) |
| a-21 | 6-chloro-2-benzothiazolyl | —SO₂CH₃ | 2,5-dimethylphenyl | C₈H₁₇(t) |
| a-22 | 2-benzothiazolyl | H | 2,4,6-trimethylphenyl | 2,4,6-trimethylphenyl |
| a-23 | 2-benzothiazolyl | H | 2-methylphenyl | 2-methylphenyl |
| a-24 | 2-benzothiazolyl | H | 2,3-dimethylphenyl | 2,3-dimethylphenyl |
| a-25 | 3-carboxyphenyl | 3-carboxyphenyl | 2,4,6-trimethylphenyl | 2,4,6-trimethylphenyl |

TABLE 11

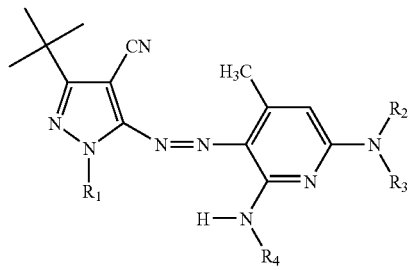

| Dye | R₁ | R₂ |
|---|---|---|
| a-26 | 2-methylbenzothiazole | 2-methylbenzothiazol-6-yl-SO₂NH(CH₂)₃O-(2,4-di-tert-pentylphenyl) |
| a-27 | 2-methylbenzothiazol-6-yl-SO₂NH(CH₂)₃O-(2,4-di-tert-pentylphenyl) | 2-methylbenzothiazol-6-yl-SO₂NH(CH₂)₃O-(2,4-di-tert-pentylphenyl) |
| a-28 | 5-chloro-2-methylbenzothiazole | 2-methylbenzothiazol-6-yl-NHC(O)CH(Et)-O-(2,4-di-tert-pentylphenyl) |
| a-29 | 2-methylbenzothiazole | 2-methylbenzothiazole |
| a-30 | 5-nitro-2-methylbenzothiazole | 2-methylbenzothiazol-6-yl-NHSO₂-(2-(n)C₈H₁₇O-5-OC₈H₁₇(t)-phenyl) |
| a-31 | 2-methylbenzoxazol-6-yl-SO₂NHCH₂CH(C₂H₅)(C₄H₉) | 2-methylbenzoxazol-6-yl-SO₂NHCH₂CH(C₂H₅)(C₄H₉) |

| Dye | R₃ | R₄ |
|---|---|---|
| a-26 | 2,4,6-trimethylphenyl (mesityl) | 2,4,6-trimethylphenyl (mesityl) |

TABLE 11-continued

| Dye | | |
|---|---|---|
| a-27 | 2,3,5-trimethylphenyl | 2,4,6-trimethylphenyl |
| a-28 | 2,4-dimethylphenyl | 2,4-dimethylphenyl |
| a-29 | 2-methyl-6-dodecyloxyphenyl | 2-methyl-6-dodecyloxyphenyl |
| a-30 | 4-octylphenyl | $C_8H_{17}(t)$ |
| a-31 | 2,3-dimethylphenyl | 2,3-dimethylphenyl |

TABLE 12

| Dye | $R_1$ | $R_2$ | $R_3$ | $R_4$ |
|---|---|---|---|---|
| a-32 | 2-methylbenzothiazole-6-SO$_3$K | 2-methylbenzothiazole-6-SO$_3$K | 2,4,6-trimethylphenyl | 2,4,6-trimethylphenyl |
| a-33 | 2-methylbenzothiazole-6-SO$_2$NH-(3,5-dicarboxyphenyl) | 2-methylbenzothiazole-6-SO$_2$NH-(3,5-dicarboxyphenyl) | 2,4,6-trimethylphenyl | 2,4,6-trimethylphenyl |

TABLE 12-continued

[Structure: pyrazole-azo-pyridine dye with tert-butyl, CN, H₃C, R₁, R₂, R₃, R₄ substituents]

| Dye | R₁ | R₂ | R₃ | R₄ |
|---|---|---|---|---|
| a-34 | 2-methylbenzothiazole-SO₂NH-phenyl(COOK)(COOK) (5,6-mix) | 2-methylbenzothiazole-SO₂NH-phenyl(COOK)(COOK) (5,6-mix) | 3,4,5-trimethylphenyl | 2,4,6-trimethylphenyl |
| a-35 | 2-methylbenzothiazole-SO₃Na (5,6-mix) | 2-methylbenzothiazole-SO₂NH-phenyl(COOK)(COOK) (5,6-mix) | 4-methylphenyl | 2,3-dimethylphenyl |

TABLE 13

[Structure: pyrazole-azo-pyridine dye with tert-butyl, CN, H₃C, R₁, R₂, R₃, R₄ substituents]

| Dye | R₁ | R₂ | R₃ | R₄ |
|---|---|---|---|---|
| a-36 | 2-methylbenzothiazole-6-SO₃Na | 2-methylbenzothiazole-6-SO₃Na | 2,4,6-trimethylphenyl-SO₃Na | 2,4,6-trimethylphenyl-SO₃Na |
| a-37 | 2-methylbenzothiazole-6-SO₂NH-phenyl(COOK)(COOK) | 2-methylbenzothiazole | 2,4,6-trimethylphenyl-SO₃K | 2,4,6-trimethylphenyl-SO₃K |

TABLE 13-continued
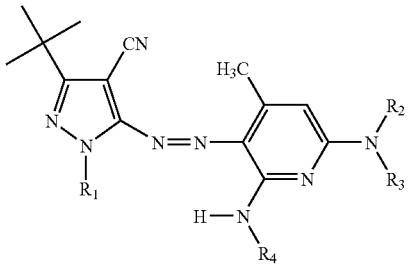
| Dye | R₁ | R₂ | R₃ | R₄ |
|---|---|---|---|---|
| a-38 | 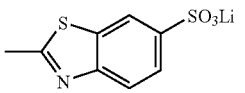 | 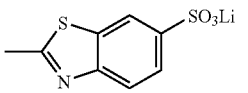 | 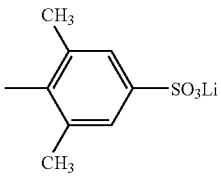 | 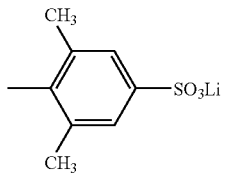 |
| a-39 | 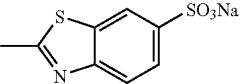 | 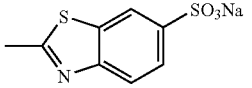 | 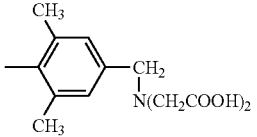 | 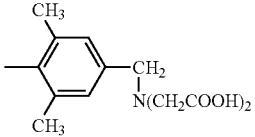 |
| a-40 | 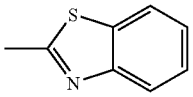 | 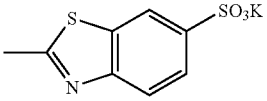 | 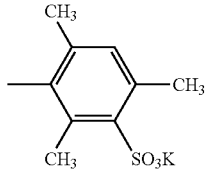 | 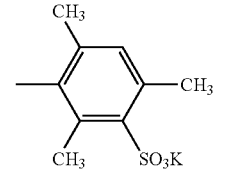 |
TABLE 14
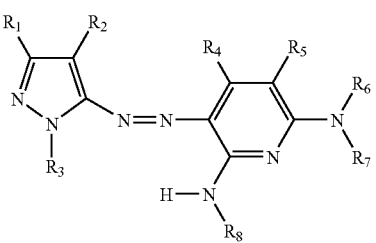
| Dye | R₁ | R₂ | R₃ | R₄ | R₅ | R₆ |
|---|---|---|---|---|---|---|
| a-41 | 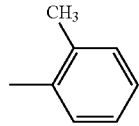 | CN | 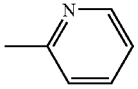 | H | CONH₂ | SO₂CH₃ |
| a-42 |  | Br |  | COOEt | H | 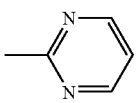 |

TABLE 14-continued

| Dye | | | | | |
|---|---|---|---|---|---|
| a-43 | 2-pyridyl | SO$_2$CH$_3$ | 6-methyl-2,4-bis(NHCH$_3$)-1,3,5-triazinyl | CONH$_2$ | H | 6-chloro-2-methylbenzothiazolyl |
| a-44 | t-Bu | CN | 4-methyl-3,5-dicyanophenyl (with CN) | H | H | 5-chloro-2-methylbenzothiazolyl |
| a-45 | t-Bu | Br | 2,6-dichloro-4-nitrophenyl | H | CONH$_2$ | COCH$_3$ |
| a-46 | t-Bu | CN | 2-methylbenzothiazolyl | CH$_3$ | H | 2-methylbenzothiazolyl |

| Dye | R$_7$ | R$_8$ |
|---|---|---|
| a-41 | 2-(OC$_8$H$_{17}$)phenyl | o-tolyl |
| a-42 | C$_8$H$_{17}$(t) | COCH$_3$ |
| a-43 | p-tolyl | CO-t-Bu |
| a-44 | o-tolyl | SO$_2$CH$_3$ |
| a-45 | 2,4,6-trimethylphenyl | 4-C$_8$H$_{17}$-phenyl |
| a-46 | 2,6-diethyl-4-methylphenyl | 2,6-diethyl-4-methylphenyl |

TABLE 15

Structure: Isothiazole-CN ring (R1 substituted) azo-linked to pyridine ring bearing R2, R3, NR4R5, and NHR6 groups.

| Dye | R1 | R2 | R3 | R4 | R5 | R6 |
|---|---|---|---|---|---|---|
| b-1 | $CH_3$ | $CH_3$ | CN | H | 4-($C_8H_{17}$)phenyl | 4-($C_8H_{17}$)phenyl |
| b-2 | $CH_3$ | $CH_3$ | CN | H | 2,4,5-trimethylphenyl | 2,4,5-trimethylphenyl |
| b-3 | $CH_3$ | $CH_3$ | $CONH_2$ | H | 4-($C_8H_{17}$)phenyl | 2,4,5-trimethylphenyl |
| b-4 | $CH_3$ | $CH_3$ | H | H | 2,4,5-trimethyl-3-$SO_3Li$-phenyl | 2,4,5-trimethyl-3-$SO_3Li$-phenyl |
| b-5 | $CH_3$ | H | CN | H | 4-$SO_3Na$-phenyl | 4-$SO_3Na$-phenyl |

TABLE 16

Structure: Same core as Table 15.

| Dye | R1 | R2 | R3 | R4 | R5 | R6 |
|---|---|---|---|---|---|---|
| b-6 | $CH_3$ | $CH_3$ | H | 2-benzothiazolyl | 2,4,6-trimethyl-3-$CH_2N(CH_2CO_2K)_2$-phenyl | 2,4,6-trimethyl-3-$CH_2N(CH_2CO_2K)_2$-phenyl |

TABLE 16-continued
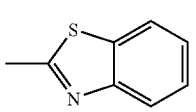
| Dye | R$_1$ | R$_2$ | R$_3$ | R$_4$ | R$_5$ | R$_6$ |
|---|---|---|---|---|---|---|
| b-7 | CH$_3$ | CH$_3$ | H | 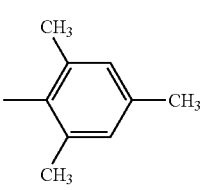 | 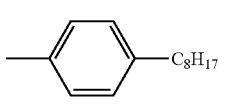 | 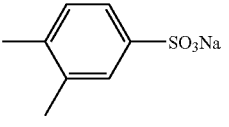 |
| b-8 | CH$_3$ | H | H | SO$_2$CH$_3$ | 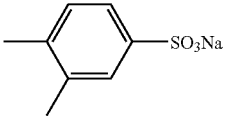 | 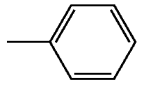 |
TABLE 17
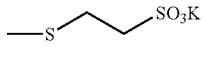
| Dye | R$_1$ | R$_2$ | R$_3$ | R$_4$ |
|---|---|---|---|---|
| c-1 | —SCH$_3$ | CH$_3$ | CN | H |
| c-2 | 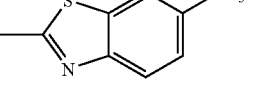 | H | CONH$_2$ | H |
| c-3 | —S—CH$_2$CH$_2$SO$_3$K | CH$_3$ | H | 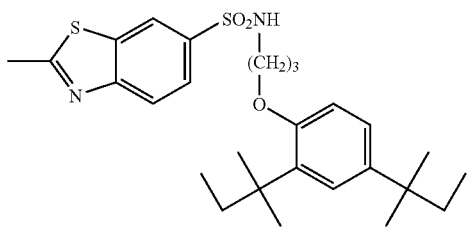 (benzothiazole-SO$_3$K) |
| c-4 | —CH$_3$ | CH$_3$ | H | (benzothiazole-SO$_2$NH(CH$_2$)$_3$O-2,4-di-tert-pentylphenyl) |

TABLE 17-continued

| | | | | |
|---|---|---|---|---|
| c-5 | (phenyl) | H | H | 2-methyl-benzothiazol-6-yl-NHSO2-(2-OC8H17(n)-5-C8H17(t)-phenyl) |

| Dye | R5 | R6 |
|---|---|---|
| c-1 | C8H17(t) | —C6H4—C8H17 |
| c-2 | —C6H4—SO3K | —C6H4—SO3K |
| c-3 | —C6H4—SO3K | —C6H4—SO3K |
| c-4 | 2,4,5-trimethylphenyl | —C6H4—C8H17 |
| c-5 | 2,4,5-trimethylphenyl | C8H17(t) |

TABLE 18

$$\text{R}^1\text{-(1,3,4-thiadiazol-2-yl)-N=N-(pyridine with R}^2\text{, R}^3\text{, NR}^4\text{R}^5\text{, NHR}^6\text{)}$$

| Dye | R1 | R2 | R3 | R4 | R5 | R6 |
|---|---|---|---|---|---|---|
| d-1 | Me | CH3 | CN | H | —C6H4—SO3K | —C6H4—SO3K |
| d-2 | Me | CH3 | CN | H | 2,6-diethyl-4-methylphenyl | 2,6-diethyl-4-methylphenyl |

TABLE 18-continued

[Structure: 1,3,4-thiadiazole with R¹ substituent, linked via azo group (N=N) to a pyridine ring with substituents R², R³, R⁴, R⁵, and NHR⁶]

| Dye | R₁ | R₂ | R₃ | R₄ | R₅ | R₆ |
|---|---|---|---|---|---|---|
| d-3 | Me | H | H | 2-methylbenzothiazolyl | 2,4,6-trimethyl-3-SO₃K-phenyl | 2,4,6-trimethyl-3-SO₃K-phenyl |
| d-4 | Ph | CH₃ | CONH₂ | H | 4-C₈H₁₇-phenyl | 4-C₈H₁₇-phenyl |
| d-5 | Ph | CH₃ | H | 2-methylbenzothiazol-6-yl-SO₂NH-(CH₂)₃-O-(2,4-di-tert-pentylphenyl) | 4-OC₄H₉(n)-phenyl | 2,4-diethyl-6-methylphenyl |

TABLE 19

[Structure: benzothiazole (positions 4,5,6,7 labeled) with R₁ substituent, linked via azo group (N=N) to a pyridine ring with substituents R², R³, R⁴, R⁵, and NHR⁶]

| Dye | R₁ | R₂ | R₃ | R₄ | R₅ | R₆ |
|---|---|---|---|---|---|---|
| e-1 | 5-Cl | CH₃ | CONH₂ | H | C₈H₁₇(t) | C₈H₁₇(t) |
| e-2 | 5,6-diCl | H | H | 2-methylbenzothiazolyl | 4-C₈H₁₇-phenyl | 4-C₈H₁₇-phenyl |
| e-3 | 5,6-diCl | CH₃ | H | 2-methylbenzothiazolyl | 2,4,6-trimethylphenyl | COCH₃ |

TABLE 19-continued

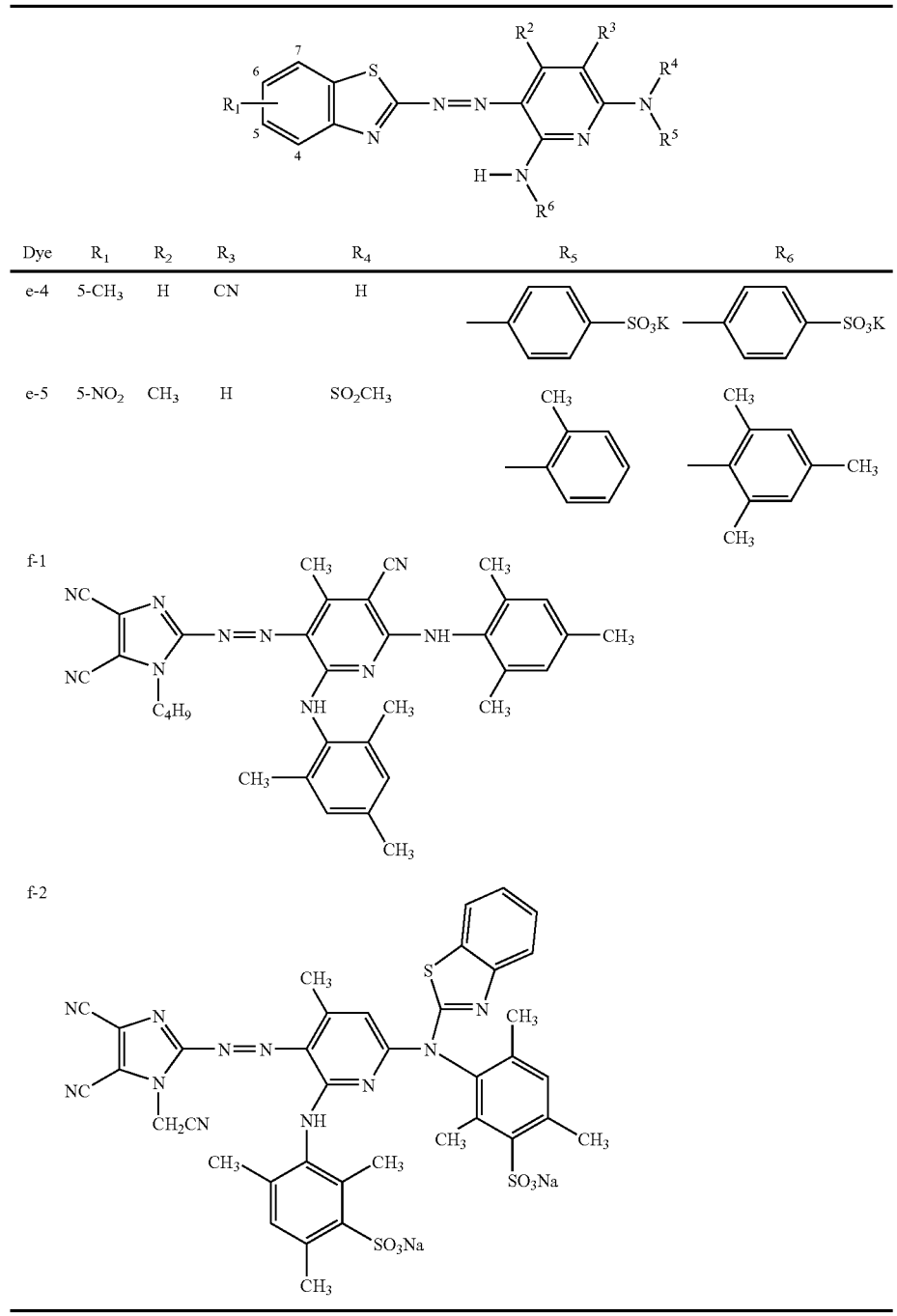

The magenta ink composition of the present invention is prepared by dissolving and/or dispersing at least one azo dye of formula (M-I) in an aqueous medium and preferably contains the azo dye in an amount of 0.2 to 20 wt %, more preferably from 0.5 to 15 wt %.

The azo dye of formula (M-I) for use in the present invention is substantially water-soluble. The "substantially water-soluble" means that the dye dissolves in an amount of 2 wt % or more in water at 20° C.

In the magenta ink composition, other magenta dyes can be used in combination with the azo dye of formula (M-1).

Examples of the magenta dye which can be used in combination include aryl- or heteryl-azo dyes (except for the dye represented by formula (M-I) of the present invention) having a phenol, a naphthol or an aniline as the coupling component; azomethine dyes having a pyrazolone or a pyrazolotriazole as the coupling component; methine dyes such as arylidene dye, styryl dye, merocyanine dye and oxonol dye; carbonium dyes such as diphenylmethane dye, triphenylmethane dye and xanthene dye; quinone-base dyes such as naphthoquinone, anthraquinone and anthrapyridone; and condensed polycyclic dyes such as dioxazine dye. These dyes may be a dye which provides a magenta color for the first time when a part of the chromophore is dissociated. In this case, the counter cation may be an inorganic cation such as alkali metal and ammonium, an organic cation such as pyridinium and quaternary ammonium salt, or a polymer cation having such a cation in a partial structure.

<Cyan Ink>

For the purpose of, for example, reducing the reactivity with an oxidative gas such as ozone, the coloring agent in the cyan ink of the present invention is preferably rendered to have an oxidation potential more positive than 1.0 V (vs SCE) by introducing an electron-withdrawing group into the phthalocyanine skeleton. A more positive oxidation potential is more preferred and the oxidation potential is more preferably more positive than 1.1 V (vs SCE) and most preferably more positive than 1.2 V (vs SCE).

The oxidation potential value (Eox) can be easily measured by one skilled in the art and the method therefor is described, for example, in P. Delahay, *New Instrumental Methods in Electrochemistry*, Interscience Publishers (1954), A. J. Bard et al., *Electrochemical Methods*, John Wiley & Sons (1980), and Akira Fujishima et al., *Denkikagaku Sokutei Ho* (*Electrochemical Measuring Method*), Gihodo Shuppan Sha (1984).

More specifically, a test sample is dissolved to a concentration of $1\times10^{-4}$ to $1\times10^{-6}$ mol/liter in a solvent such as dimethylformamide or acetonitrile containing a supporting electrolyte such as sodium perchlorate or tetrapropylammonium perchlorate and the oxidation potential is measured as a value to SCE (saturated calomel electrode) by using a cyclic voltammetry or a direct current polarography. This value sometimes deviates on the order of tens of millivolt due to the effect of liquid junction potential, liquid resistance of sample solution, or the like, however, the reproducibility of potential can be guaranteed by adding a standard sample (for example, hydroquinone).

In order to univocally specify the potential, in the present invention, the value (vs SCE) measured by a direct current polarography in a dimethylformamide (concentration of dye: 0.001 mol dm$^{-3}$) containing 0.1 mol dm$^{-3}$ of tetrapropylammonium perchlorate as the supporting electrolyte is used as the oxidation potential of the dye.

The Eox value indicates the transferability of an electron from the sample to the electrode and as the value is larger (the oxidation potential is more positive), the electron is less transferable from the sample to the electrode, in other words, the oxidation less occurs. As for the relationship with the structure of compound, the oxidation potential becomes positive when an electron-withdrawing group is introduced, and becomes negative when an electron-donating group is introduced. In the present invention, the oxidation potential is preferably rendered more positive by introducing an electron-withdrawing group into the phthalocyanine skeleton so as to reduce the reactivity with ozone which is an electrophilic agent. When the Hammett's substituent constant σp value as a measure for the electron-withdrawing property or electron-donating property of substituent is used, the oxidation potential can be rendered more positive by introducing a substituent having a large σp value, such as sulfinyl group, sulfonyl group and sulfamoyl group.

In the present invention, a phthalocyanine-base dye represented by formula (C-I) is preferably used.

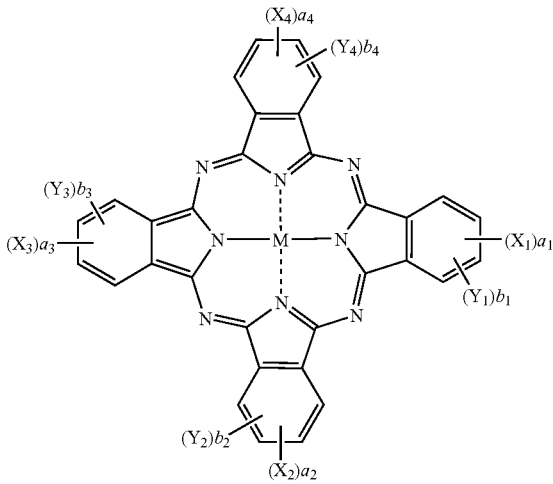

The compound of formula (C-I) for use in the present invention is described in detail below.

In formula (C-I), $X_1$, $X_2$, $X_3$ and $X_4$ each independently represents —SO-Z, —SO$_2$-Z, —SO$_2$NR$_1$R$_2$, a sulfo group, —CONR$_1$R$_2$ or —CO$_2$R$_1$. Among these substituents, preferred are —SO—Z, —SO$_2$-Z, —SO$_2$NR$_1$R$_2$ and —CONR$_1$R$_2$, more preferred are —SO$_2$-Z and —SO$_2$NR$_1$R$_2$, and most preferred is —SO$_2$-Z. In the case where $a_1$ to $a_4$ showing the number of substituents each represents a number of 2 or more, a plurality of substituents $X_1$, $X_2$, $X_3$ or $X_4$ may be the same or different and each independently represents any one of the above-described groups. $X_1$, $X_2$, $X_3$ and $X_4$ may be completely the same substituents, may be substituents of the same kind but partially different as in the case, for example, where $X_1$, $X_2$, $X_3$ and $X_4$ all are —SO$_2$-Z and Zs are different from each other, or may include substituents differing from each other, for example, —SO$_2$-Z and —SO$_2$NR$_1$R$_2$.

Each Z independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, preferably a substituted or unsubstituted alkyl group, a substituted or unsubstituted aryl group or a substituted or unsubstituted heterocyclic group, and most preferably a substituted alkyl group, a substituted aryl group or a substituted heterocyclic group.

$R_1$ and $R_2$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, preferably a hydrogen atom, a substituted or unsubstituted alkyl group, a substituted or unsubstituted aryl group, or a substituted or unsubstituted heterocyclic group, most preferably a hydrogen atom, a substituted alkyl group, a substituted aryl group or a substituted heterocyclic group. However, it is not preferred that $R_1$ and $R_2$ both are a hydrogen atom.

The substituted or unsubstituted alkyl group represented by $R_1$, $R_2$ and Z is preferably an alkyl group having from 1 to 30 carbon atoms, more preferably a branched alkyl group because the solubility of dye and the stability of ink are improved, still more preferably an alkyl group having an asymmetric carbon (use in the racemic form). Examples of the substituent include those described later as the substituent when Z, $R_1$, $R_2$, $Y_1$, $Y_2$, $Y_3$ and $Y_4$ can further have a substituent. In particular, a hydroxyl group, an ether group, an ester group, a cyano group, an amido group and a sulfonamido group are preferred because the aggregating property and fastness of dye are enhanced.

Other than these, the alkyl group may be substituted by a halogen atom or an ionic hydrophilic group. Incidentally, the number of carbon atoms in the alkyl group does not contain carbon atoms of substituents and this applies to other groups.

The substituted or unsubstituted cycloalkyl group represented by $R_1$, $R_2$ and Z is preferably a cycloalkyl group having from 5 to 30 carbon atoms, more preferably a cycloalkyl group having an asymmetric carbon (use in the racemic form) because the solubility of dye and the stability of ink are improved. Examples of the substituent include those described later as the substituent when Z, $R_1$, $R_2$, $Y_1$, $Y_2$, $Y_3$ and $Y_4$ can further have a substituent. In particular, a hydroxyl group, an ether group, an ester group, a cyano group, an amido group and a sulfonamido group are preferred because the aggregating property and fastness of dye are enhanced. Other than these, the cycloalkyl group may be substituted by a halogen atom or an ionic hydrophilic group.

The substituted or unsubstituted alkenyl group represented by $R_1$, $R_2$ and Z is preferably an alkenyl group having from 2 to 30 carbon atoms, more preferably a branched alkenyl group because the solubility of dye and the stability of ink are improved, still more preferably an alkenyl group having an asymmetric carbon (use in the racemic form). Examples of the substituent include those described later as the substituent when Z, $R_1$, $R_2$, $Y_1$, $Y_2$, $Y_3$ and $Y_4$ can further have a substituent. In particular, a hydroxyl group, an ether group, an ester group, a cyano group, an amido group and a sulfonamido group are preferred because the aggregating property and fastness of dye are enhanced. Other than these, the alkenyl group may be substituted by a halogen atom or an ionic hydrophilic group.

The substituted or unsubstituted aralkyl group represented by $R_1$, $R_2$ and Z is preferably an aralkyl group having from 7 to 30 carbon atoms, more preferably a branched aralkyl group because the solubility of dye and the stability of ink are improved, still more preferably an aralkyl group having an asymmetric carbon (use in the racemic form). Examples of the substituent include those described later as the substituent when Z, $R_1$, $R_2$, $Y_1$, $Y_2$, $Y_3$ and $Y_4$ can further have a substituent. In particular, a hydroxyl group, an ether group, an ester group, a cyano group, an amido group and a sulfonamido group are preferred because the aggregating property and fastness of dye are enhanced. Other than these, the aralkyl group may be substituted by a halogen atom or an ionic hydrophilic group.

The substituted or unsubstituted aryl group represented by $R_1$, $R_2$ and Z is preferably an aryl group having from 6 to 30 carbon atoms. Examples of the substituent include those described later as the substituent when Z, $R_1$, $R_2$, $Y_1$, $Y_2$, $Y_3$ and $Y_4$ can further have a substituent. In particular, an electron-withdrawing group is preferred because the dye can have a noble oxidation potential and be improved in the fastness. Examples of the electron-withdrawing group include those having a positive Hammett's substituent constant σp value. Among these, preferred are a halogen atom, a heterocyclic group, a cyano group, a carboxyl group, an acylamino group, a sulfonamido group, a sulfamoyl group, a carbamoyl group, a sulfonyl group, an imido group, an acyl group, a sulfo group and a quaternary ammonium group, more preferred are a cyano group, a carboxyl group, a sulfamoyl group, a carbamoyl group, a sulfonyl group, an imido group, an acyl group, a sulfo group and a quaternary ammonium group.

The heterocyclic group represented by $R_1$, $R_2$ and Z is preferably a 5- or 6-membered ring and the ring may be further condensed. Also, the heterocyclic group may be an aromatic heterocyclic group or a non-aromatic heterocyclic group. Examples of the heterocyclic group represented by $R_1$, $R_2$ and Z are shown below in the form of a heterocyclic ring by omitting the substitution site. The substitution site is not limited and, for example, in the case of pyridine, the 2-position, 3-position and 4-position can be substituted. Examples include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine and thiazoline. In particular, an aromatic heterocyclic group is preferred. Preferred examples thereof include, shown in the same manner as above, pyridine, pyrazine, pyrimidine, pyridazine, triazine, pyrazole, imidazole, benzimidazole, triazole, thiazole, benzothiazole, isothiazole, benzisothiazole and thiadiazole. These groups each may have a substituent and examples of the substituent include those described later as the substituent when Z, $R_1$, $R_2$, $Y_1$, $Y_2$, $Y_3$ and $Y_4$ can further have a substituent. Preferred substituents are the same as the above-described substituents of the aryl group and more preferred substituents are the same as the above-described more preferred substituents of the aryl group.

$Y_1$, $Y_2$, $Y_3$ and $Y_4$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an acylamino group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group, a carboxyl group or a sulfo group. These groups each may further have a substituent.

$Y_1$, $Y_2$, $Y_3$ and $Y_4$ each is preferably a hydrogen atom, a halogen atom, an alkyl group, an aryl group, a cyano group, an alkoxy group, an amido group, a ureido group, a sulfonamido group, a carbamoyl group, a sulfamoyl group, an alkoxycarbonyl group, a carboxyl group or a sulfo group, more preferably a hydrogen atom, a halogen atom, a cyano group, a carboxyl group or a sulfo group, and most preferably a hydrogen atom.

When Z, $R_1$, $R_2$, $Y_1$, $Y_2$, $Y_3$ and $Y_4$ each is a group which can further have a substituent, the group may further have the following substituent.

Examples of the substituent include a linear or branched alkyl group having from 1 to 12 carbon atoms, a linear or branched aralkyl group having from 7 to 18 carbon atoms, a linear or branched alkenyl group having from 2 to 12 carbon atoms, a linear or branched alkynyl group having from 2 to 12 carbon atoms, a linear or branched cycloalkyl group having from 3 to 12 carbon atoms, a linear or branched cycloalkenyl group having from 3 to 12 carbon atoms (these groups each is preferably a group having a branched chain because the solubility of dye and the stability of ink are improved, more preferably a group having an asymmetric carbon; specific examples of the groups include a methyl group, an ethyl group, a propyl group, an isopropyl group, a sec-butyl group, a tert-butyl group, a 2-ethylhexyl group, a 2-methylsulfonylethyl group, a 3-phenoxypropyl group, a trifluoromethyl group and a cyclopentyl group), a halogen atom (e.g., chlorine, bromine), an aryl group (e.g., phenyl, 4-tert-butylphenyl, 2,4-di-tert-amylphenyl), a heterocyclic group (e.g., imidazolyl, pyrazolyl, triazolyl, 2-furyl, 2-thienyl, 2-pyrimidinyl, 2-benzothiazolyl), a cyano group, a hydroxyl group, a nitro group, a carboxy group, an amino group, an alkyloxy group (e.g., methoxy, ethoxy, 2-methoxyethoxy, 2-methanesulfonylethoxy), an aryloxy group (e.g., phenoxy, 2-methylphenoxy, 4-tert-butylphenoxy, 3-nitrophenoxy, 3-tert-butyloxycarbamoylphenoxy, 3-methoxycarbamoyl), an acylamino group (e.g., acetamido, benzamido, 4-(3-tert-butyl-4-hydroxyphenoxy)butanamido), an alkylamino group (e.g., methylamino, butylamino, diethylamino, methylbutylamino), an anilino group (e.g., phenylamino, 2-chloroanilino), a ureido group (e.g., phenylureido, methylureido, N,N-dibutylureido), a sulfamoylamino group (e.g., N,N-dipropylsulfamoylamino), an alkylthio group (e.g., methylthio, octylthio, 2-phenoxyethylthio), an arylthio group (e.g., phenylthio, 2-butoxy-5-tert-octylphenylthio, 2-carboxyphenylthio), an alkyloxycarbonylamino group (e.g., methoxycarbonylamino), a sulfonamido group (e.g., methanesulfonamido, benzenesulfonamido, p-toluenesulfonamido), a carbamoyl group (e.g., N-ethylcarbamoyl, N,N-dibutylcarbamoyl), a sulfamoyl group (e.g., N-ethylsulfamoyl, N,N-dipropylsulfamoyl, N-phenylsulfamoyl), a sulfonyl group (e.g., methanesulfonyl, octanesulfonyl, benzenesulfonyl, toluenesulfonyl), an alkyloxycarbonyl group (e.g., methoxycarbonyl, butyloxycarbonyl), a heterocyclic oxy group (e.g., 1-phenyltetrazol-5-oxy, 2-tetrahydropyranyloxy), an azo group (e.g., phenylazo, 4-methoxyphenylazo, 4-pivaloylaminophenylazo, 2-hydroxy-4-propanoylphenylazo), an acyloxy group (e.g., acetoxy), a carbamoyloxy group (e.g., N-methylcarbamoyloxy, N-phenylcarbamoyloxy), a silyloxy group (e.g., trimethylsilyloxy, dibutylmethylsilyloxy), an aryloxycarbonylamino group (e.g., phenoxycarbonylamino), an imido group (e.g., N-succinimido, N-phthalimido), a heterocyclic thio group (e.g., 2-benzothiazolylthio, 2,4-di-phenoxy-1,3,5-triazole-6-thio, 2-pyridylthio), a sulfinyl group (e.g., 3-phenoxypropylsulfinyl), a phosphonyl group (e.g., phenoxyphosphonyl, octyloxyphosphonyl, phenylphosphonyl), an aryloxycarbonyl group (e.g., phenoxycarbonyl), an acyl group (e.g., acetyl, 3-phenylpropanoyl, benzoyl), and an ionic hydrophilic group (e.g., carboxyl, sulfo, phosphono, quaternary ammonium).

In the case where the phthalocyanine dye represented by formula (C-I) is water-soluble, the dye preferably contains an ionic hydrophilic group. Examples of the ionic hydrophilic group include a sulfo group, a carboxyl group, a phosphono group and a quaternary ammonium group.

Among these ionic hydrophilic groups, preferred are a carboxyl group, a phosphono group and a sulfo group, more preferred are a carboxyl group and a sulfo group. The carboxyl group, the phosphono group and the sulfo group each may be in a salt state and examples of the counter ion for forming the salt include ammonium ion, alkali metal ions (e.g., lithium ion, sodium ion, potassium ion) and organic cations (e.g., tetramethylammonium ion, tetramethylguanidium ion, tetramethylphosphonium). Among these counter ions, alkali metal ions are preferred and lithium ion is more preferred because the solubility of dye and the stability of ink are enhanced.

As for the number of ionic hydrophilic groups, the phthalocyanine dye preferably contains at least two ionic hydrophilic groups, more preferably at least two sulfo groups and/or carboxyl groups, within one molecule.

$a_1$ to $a_4$ and $b_1$ to $b_4$ represent the number of substituents $X_1$ to $X_4$ and $Y_1$ to $Y_4$, respectively. $a_1$ to $a_4$ each independently represents an integer of 0 to 4 but all are not 0 at the same time. $b_1$ to $b_4$ each independently represents an integer of 0 to 4. When $a_1$ to $a_4$ and $b_1$ to $b_4$ each represents a number of 2 or more, a plurality of substituents $X_1$, $X_2$, $X_3$, $X_4$, $Y_1$, $Y_2$, $Y_3$ or $Y_4$ may be the same or different.

$a_1$ and $b_1$ satisfy the relationship of $a_1+b_1=4$. In particular, a combination that $a_1$ represents 1 or 2 and $b_1$ represents 3 or 2 is preferred, and a combination that $a_1$ represents 1 and $b_1$ represents 3 is most preferred.

The same relationship as that between $a_1$ and $b_1$ is present in each of the pairs $a_2$ and $b_2$, $a_3$ and $b_3$, and $a_4$ and $b_4$, and the preferred combination is also the same.

M represents a hydrogen atom, a metal element or an oxide, hydroxide or halide thereof.

M is preferably a hydrogen atom, a metal element such as Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb and Bi, an oxide such as VO and GeO, a hydroxide such as $Si(OH)_2$, $Cr(OH)_2$ and $Sn(OH)_2$, or a halide such as AlCl, $SiCl_2$, VCl, $VCl_2$, VOCl, FeCl, GaCl and ZrCl, more preferably Cu, Ni, Zn or Al, and most preferably Cu.

Also, Pc (phthalocyanine ring) may form a dimer (for example, Pc-M-L-M-Pc) or a trimer through L (divalent linking group). At this time, Ms may be the same or different.

The divalent linking group represented by L is preferably an oxy group —O—, a thio group —S—, a carbonyl group —CO—, a sulfonyl group —$SO_2$-, an imino group —NH—, a methylene group —$CH_2$- or a group formed by combining two or more of these groups.

As for the preferred combination of substituents in the compound represented by formula (C-I), a compound where at least one of various substituents is the preferred group is preferred, a compound where a larger number of various substituents are the preferred groups is more preferred, and a compound where all substituents are the preferred groups is most preferred.

Among the phthalocyanine dyes represented by formula (C-I), a phthalocyanine dye having a structure represented by formula (C-II) is preferred. The phthalocyanine dye represented by formula (C-II) of the present invention is described in detail below.

Formula (C-II):

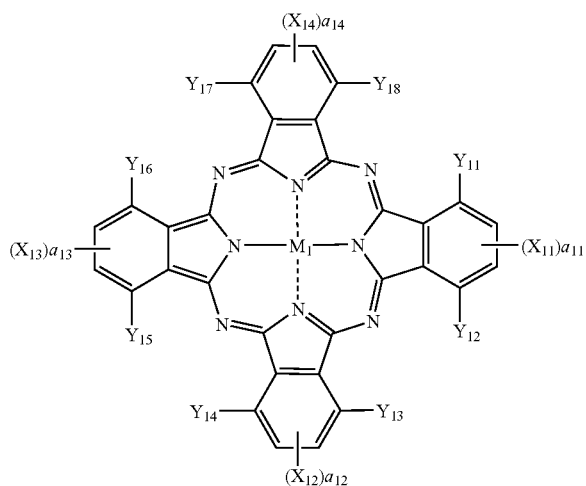

In formula (C-II), $X_{11}$ to $X_{14}$ and $Y_{11}$ to $Y_{18}$ have the same meanings as $X_1$ to $X_4$ and $Y_1$ to $Y_4$ in formula (C-I), respectively, and preferred examples are also the same. $M_1$ has the same meaning as M in formula (C-I) and preferred examples are also the same.

In formula (C-II), $a_{11}$ to $a_{14}$ each independently represents an integer of 1 or 2. $a_{11}+a_{12}+a_{13}+a_{14}$ is preferably from 4 to 6, and $a_{11}=a_{12}=a_{13}=a_{14}=1$ is more preferred.

$X_{11}$, $X_{12}$, $X_{13}$ and $X_{14}$ may be completely the same substituents, may be substituents of the same kind but partially different as in the case, for example, where $X_{11}$, $X_{12}$, $X_{13}$ and $X_{14}$ all are —$SO_2$-Z and Zs are different from each other, or may include substituents different from each other, for example, —$SO_2$-Z and —$SO_2NR_1R_2$.

In the phthalocyanine dye represented by formula (C-II), the following combinations of substituents are particularly preferred.

$X_{11}$ to $X_{14}$ each independently represents preferably —SO-Z, —$SO_2$-Z, —$SO_2NR_1R_2$ or —$CONR_1R_2$, more preferably —$SO_2$-Z or —$SO_2NR_1R_2$, most preferably —$SO_2$-Z.

Each Z independently represents preferably a substituted or unsubstituted alkyl group, a substituted or unsubstituted aryl group or a substituted or unsubstituted heterocyclic group, and most preferably a substituted alkyl group, a substituted aryl group or a substituted heterocyclic group. In particular, the case where an asymmetric carbon is present in the substituent (use in the racemic form) is preferred because the solubility of dye and the stability of ink are enhanced. Also, the case where a hydroxyl group, an ether group, an ester group, a cyano group, an amido group or a sulfonamido group is present in the substituent is preferred because the aggregating property and fastness are improved.

$R_1$ and $R_2$ each independently represents preferably a hydrogen atom, a substituted or unsubstituted alkyl group, a substituted or unsubstituted aryl group or a substituted or unsubstituted heterocyclic group, and most preferably a hydrogen atom, a substituted alkyl group, a substituted aryl group or a substituted heterocyclic group. However, it is not preferred that $R_1$ and $R_2$ both are a hydrogen atom. In particular, the case where an asymmetric carbon is present in the substituent (use in the racemic form) is preferred because the solubility of dye and the stability of ink are enhanced. Also, the case where a hydroxyl group, an ether group, an ester group, a cyano group, an amido group or a sulfonamido group is present in the substituent is preferred because the aggregating property and fastness are improved.

$Y_{11}$ to $Y_{18}$ each independently represents preferably a hydrogen atom, a halogen atom, an alkyl group, an aryl group, a cyano group, an alkoxy group, an amido group, a ureido group, a sulfonamido group, a carbamoyl group, a sulfamoyl group, an alkoxycarbonyl group, a carboxyl group or a sulfo group, more preferably a hydrogen atom, a halogen atom, a cyano group, a carboxyl group or a sulfo group, and most preferably a hydrogen atom.

$a_{11}$ to $a_{14}$ each independently represents preferably 1 or 2 and it is more preferred that all are 1.

$M_1$ represents a hydrogen atom, a metal element or an oxide, hydroxide or halide thereof, preferably Cu, Ni, Zn or Al, and most preferably Cu.

In the case where the phthalocyanine dye represented by formula (C-II) is water-soluble, the dye preferably contains an ionic hydrophilic group. Examples of the ionic hydrophilic group include a sulfo group, a carboxyl group, a phosphono group and a quaternary ammonium group. Among these ionic hydrophilic groups, preferred are a carboxyl group, a phosphono group and a sulfo group, more preferred are a carboxyl group and a sulfo group. The carboxyl group, the phosphono group and the sulfo group each may be in a salt state and examples of the counter ion for forming the salt include ammonium ion, alkali metal ions (e.g., lithium ion, sodium ion, potassium ion) and organic cations (e.g., tetramethylammonium ion, tetramethylguanidium ion, tetramethylphosphonium). Among these counter ions, alkali metal ions are preferred and lithium ion is more preferred because the solubility of dye and the stability of ink are enhanced.

As for the number of ionic hydrophilic groups, the phthalocyanine dye preferably contains at least two ionic hydrophilic groups, more preferably at least two sulfo groups and/or carboxyl groups, within one molecule.

As for the preferred combination of substituents in the compound represented by formula (C-II), a compound where at least one of various substituents is the preferred group is preferred, a compound where a larger number of various substituents are the preferred groups is more preferred, and a compound where all substituents are the above-mentioned preferred groups is most preferred.

As for the chemical structure of the phthalocyanine dye of the present invention, at least one electron-withdrawing group such as sulfinyl group, sulfonyl group and sulfamoyl group is preferably introduced into respective four benzene rings of phthalocyanine such that the total of σp values of the substituents in the entire phthalocyanine skeleton becomes 1.6 or more.

The Hammett's substituent constant σp value is briefly described here. The Hammett's rule is an empirical rule advocated by L. P. Hammett in 1935 so as to quantitatively discuss the effect of substituent on the reaction or equilibrium of benzene derivatives and its propriety is widely admitted at present. The substituent constant determined by the Hammett's rule includes a σp value and a σm value and these values can be found in a large number of general publications but these are described in detail, for example, in J. A. Dean (compiler), *Lange's Handbook of Chemistry*, 12th ed., McGraw-Hill (1979), and *Kagakuno Ryoiki* (*Chemistry Region*), special number, No. 122, pp. 96-103, Nankodo (1979).

Inevitably in view of the synthesis method, the phthalocyanine derivative represented by formula (C-I) is generally a mixture of analogues differing in the site where the substituents Xn (n=1 to 4) and Ym (m=1 to 4) are introduced and in the number of the substituents introduced. Accordingly, these analogue mixtures are statistically averaged and represented by a formula in many cases. In the present invention, it has been found that when these analogue mixtures are classified into the following three types, a specific mixture is particularly preferred. The phthalocyanine-base dye analogue mixtures represented by formulae (C-I) and (C-II) are defined by classifying these into the following three types based on the substitution site.

(1) β-Position Substitution Type:
A phthalocyanine dye having specific substituents at the 2- and/or 3-position, the 6- and/or 7-position, the 10- and/or 11-position, and the 14- and/or 15-position.

(2) α-Position Substitution Type:
A phthalocyanine dye having specific substituents at the 1- and/or 4-position, the 5- and/or 8-position, the 9- and/or 12-position, and the 13- and/or 16-position.

(3) α,β-Position Mixed Substitution Type:
A phthalocyanine dye having specific substitutions at the 1- to 16-positions without any regularity.

In the present invention, phthalocyanine dye derivatives differing in the structure (particularly in the substitution site) are described by using these β-position substitution type, α-position substitution type and α,β-position mixed substitution type.

The phthalocyanine derivative for use in the present invention can be synthesized by combining the methods described or cited, for example, in Shirai and Kobayashi, *Phthalocyanine-Kagaku to Kino-(Phthalocyanine-Chemistry and Function-)*, pp. 1-62, IPC, and C. C. Leznoff and A. B. P. Lever, *Phthalocyanines-Properties and Applications*, pp. 1-54, VCH, or methods analogous thereto.

The phthalocyanine compound represented by formula (C-I) of the present invention can be synthesized, for example, through sulfonation, sulfonyl chloridation or amidation of an unsubstituted phthalocyanine compound as described in International Publications 00/17275, 00/08103, 00/08101 and 98/41853 and JP-A-10-36471. In this case, sulfonation may take place at any site of the phthalocyanine nucleus and the number of sites sulfonated is difficult to control. Accordingly, when a sulfo group is introduced under such reaction conditions, the positions and number of sulfo groups introduced into the product cannot be specified and a mixture of those differing in the number of substituents or in the substitution site inevitably results. If the compound of the present invention is synthesized starting from such a product, the compound of the present invention is obtained as an α,β-position mixed substitution type mixture containing several kinds of compounds differing in the number of substituents or in the substitution site because the number of sulfamoyl groups substituted on the heterocyclic ring or their substitution sites cannot be specified.

As described above, for example, when many electron-withdrawing groups such as sulfamoyl group are introduced into the phthalocyanine nucleus, the oxidation potential becomes positive and the ozone resistance is increased. However, according to the above-described synthesis method, a phthalocyanine dye where the number of electron-withdrawing groups introduced is small, namely, the oxidation potential is negative, is inevitably mingled. Therefore, in order to improve the ozone resistance, it is preferred to use a synthesis method where the production of a compound having a negative oxidation potential is suppressed.

The phthalocyanine compound represented by formula (C-II) of the present invention can be synthesized, for example, by reacting a phthalonitrile derivative (Compound P) shown below and/or a diiminoisoindoline derivative (Compound Q) shown below with a metal derivative represented by formula (III) or can be derived from a tetrasulfophthalocyanine compound obtained by reacting a 4-sulfophthalonitrile derivative (Compound R) shown below with a metal derivative represented by formula (III).

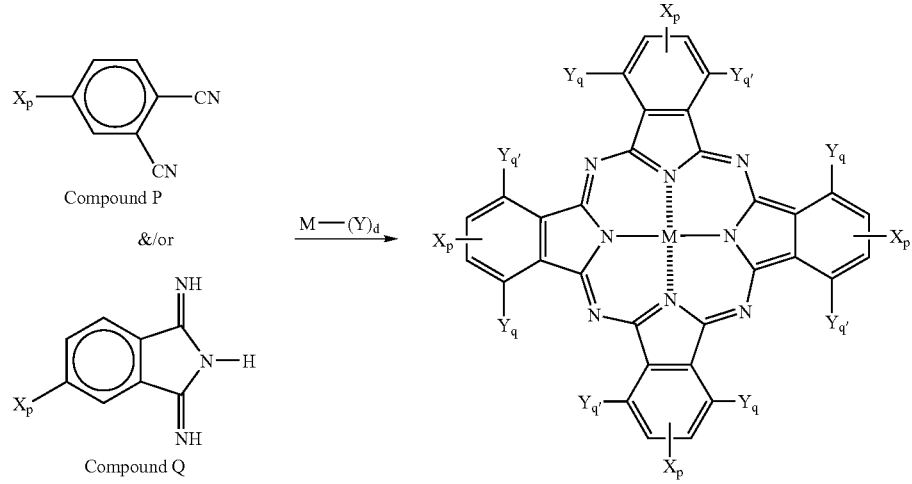

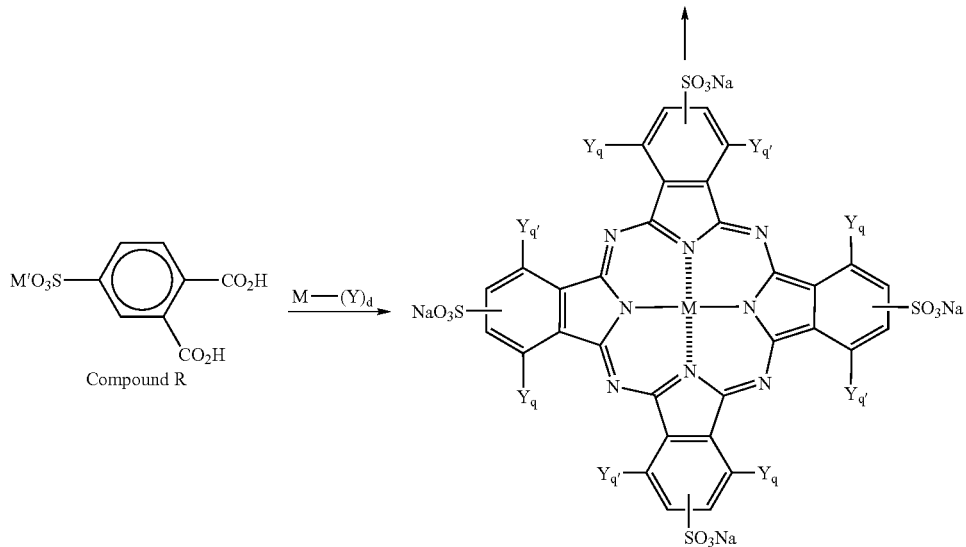

In the formulae above, $X_p$ corresponds to $X_{11}, X_{12}, X_{13}$ or $X_{14}$ in formula (C-II) and $Y_q$ and $Y_{q'}$ each corresponds to $Y_{11}, Y_{12}, Y_{13}, Y_{14}, Y_{15}, Y_{16}, Y_{17}$ or $Y_{18}$ in formula (C-II). In Compound R, M' represents cation.

Examples of the cation represented by M' include alkali metal ions such as Li, Na and K, and organic cations such as triethylammonium ion and pyridinium ion.

M-(Y)$_d$  Formula (III):

wherein M has the same meaning as $M_1$ in formula (C-II), Y represents a monovalent or divalent ligand such as halogen atom, acetate anion, acetylacetonate and oxygen, and d represents an integer of 1 to 4.

That is, according to this synthesis method, a specific number of desired substituents can be introduced. Particularly, in the case of introducing a large number of electron-withdrawing groups so as to render the oxidation potential more positive as in the present invention, this synthesis method is very excellent as compared with the above-described method for synthesizing the phthalocyanine compound of formula (C-I).

The thus-obtained phthalocyanine compound represented by formulae (C-II) is usually a mixture of compounds represented by the following formulae (a)-1 to (a)-4 which are isomers with respect to the substitution site of each $X_p$, namely, a β-position substitution type.

Formula (a)-1:

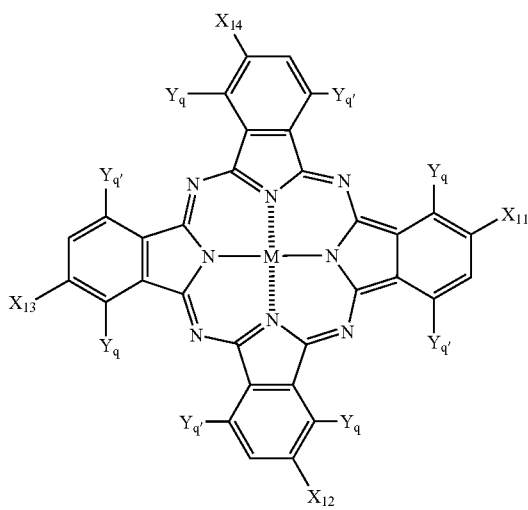

Formula (a)-2:

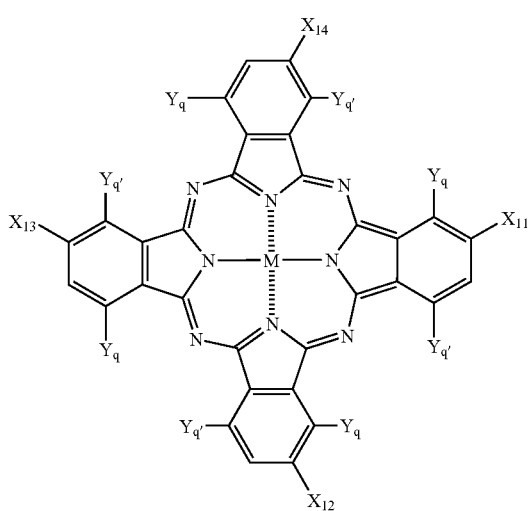

Formula (a)-3:

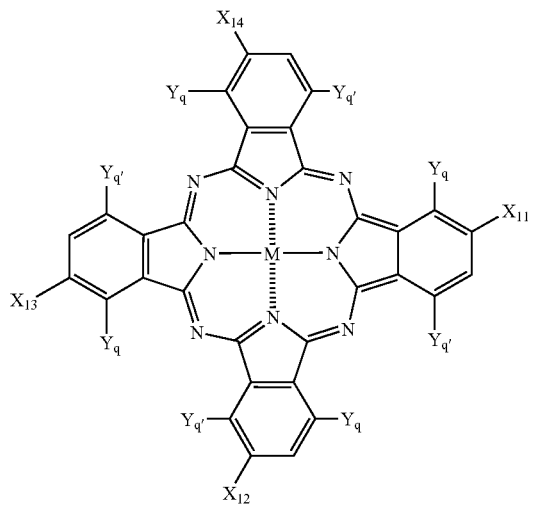

Formula (a)-4:

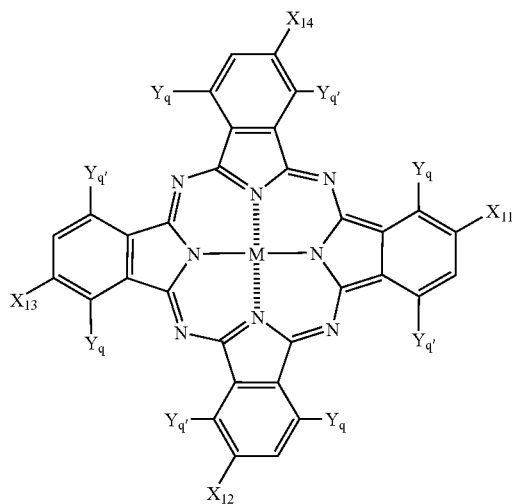

In the synthesis method above, when all $X_p$s are the same, a β-position substitution type phthalocyanine dye where $X_{11}$, $X_{12}$, $X_{13}$ and $X_{14}$ are completely the same substituents can be obtained. On the other hand, when $X_p$s are different, a dye having substituents of the same kind but partially different from each other or a dye having substituents different from each other can be synthesized. Among the dyes of formula (C-II), these dyes having electron-withdrawing substituents different from each other are preferred because the solubility and aggregating property of dye and the aging stability of ink can be controlled.

In the present invention, it has been found very important for the improvement of fastness that in any substitution type, the oxidation potential is more positive than 1.0 V (vs SCE). The great effect thereof cannot be expected at all from the above-described known techniques. Furthermore, although the reason is not particularly known, there is a tendency that the β-position substitution type is apparently more excellent in the color hue, light fastness, ozone gas resistance and the like than the α,β-position mixed substitution type.

Specific examples (Compounds I-1 to I-12 and 101 to 190) of the phthalocyanine dyes represented by formulae (C-I) and (C-II) are set forth below, however, the phthalocyanine dye for use in the present invention is not limited to the following examples.

Compound (I-1):

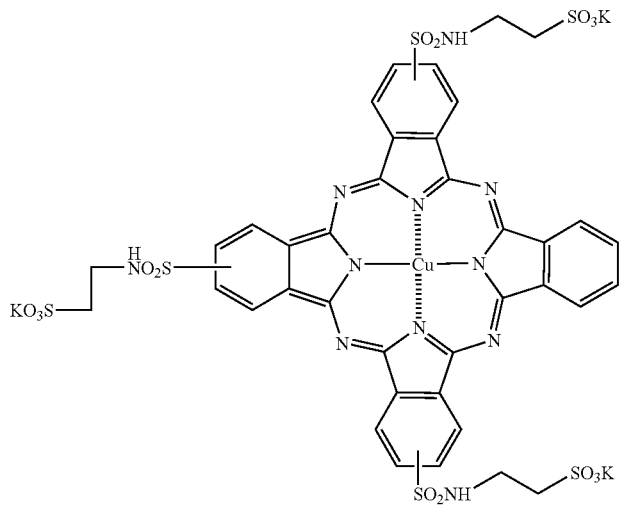

-continued
Compound (I-2):
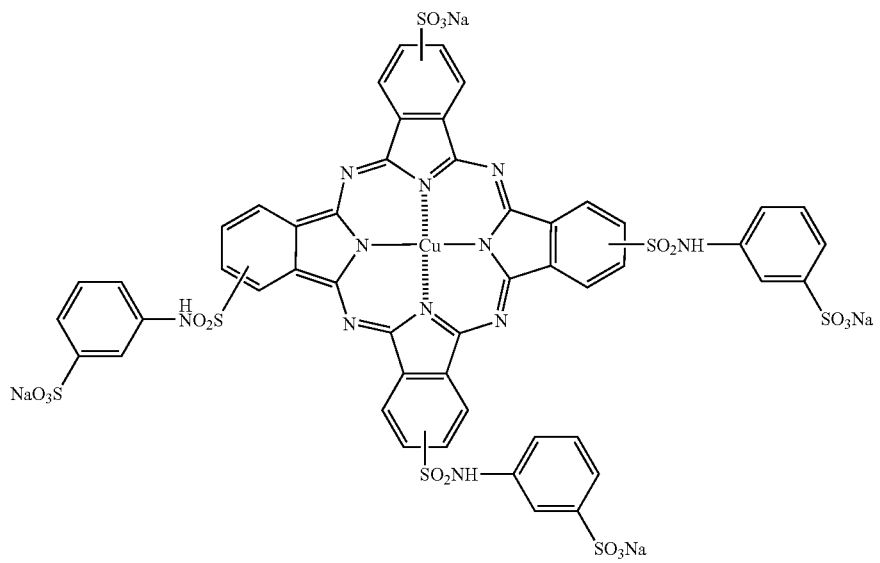
Compound (I-3):
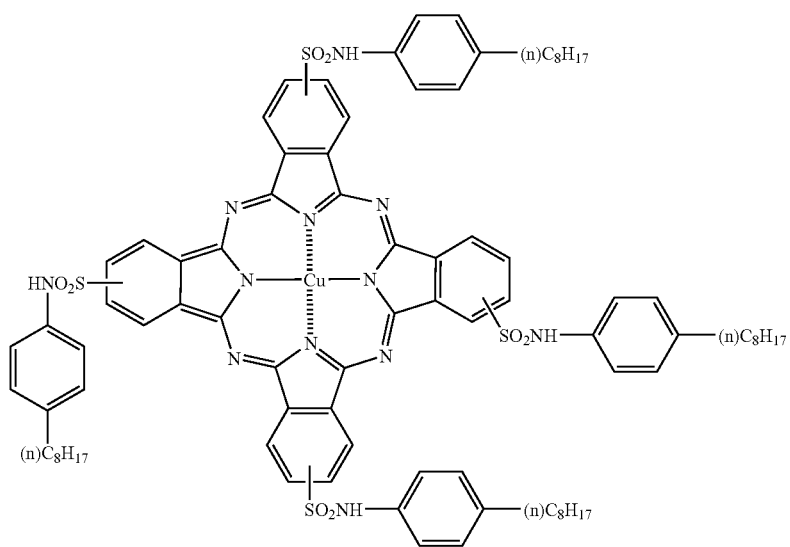

Compound (I-4):
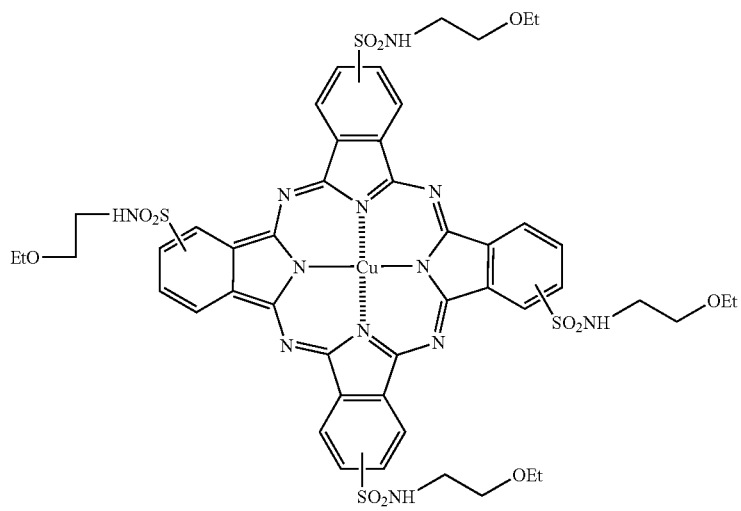
Compound (I-5):
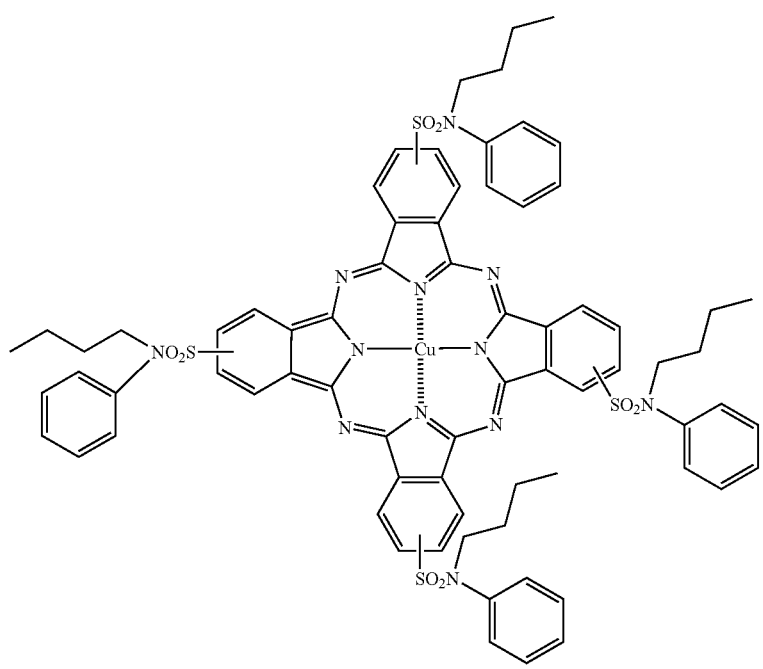

Compound (I-6):
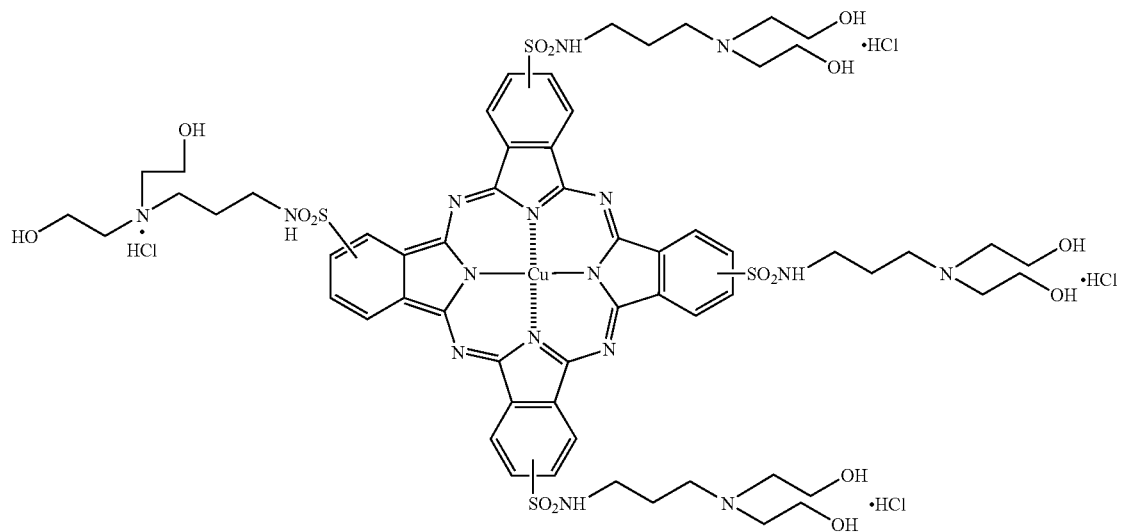
Compound (I-7):
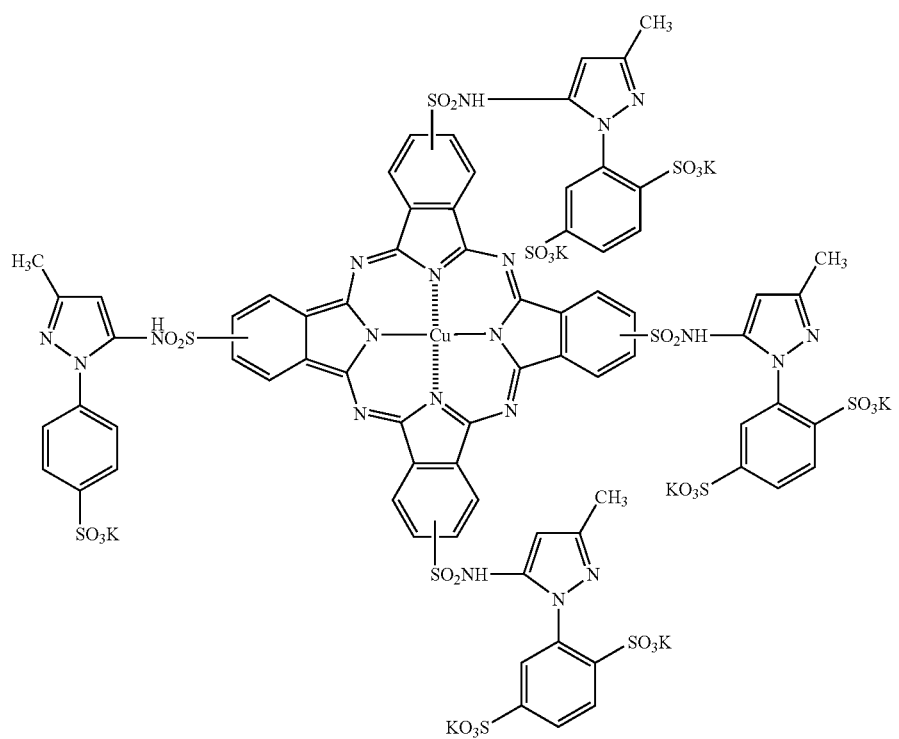

Compound (I-8):
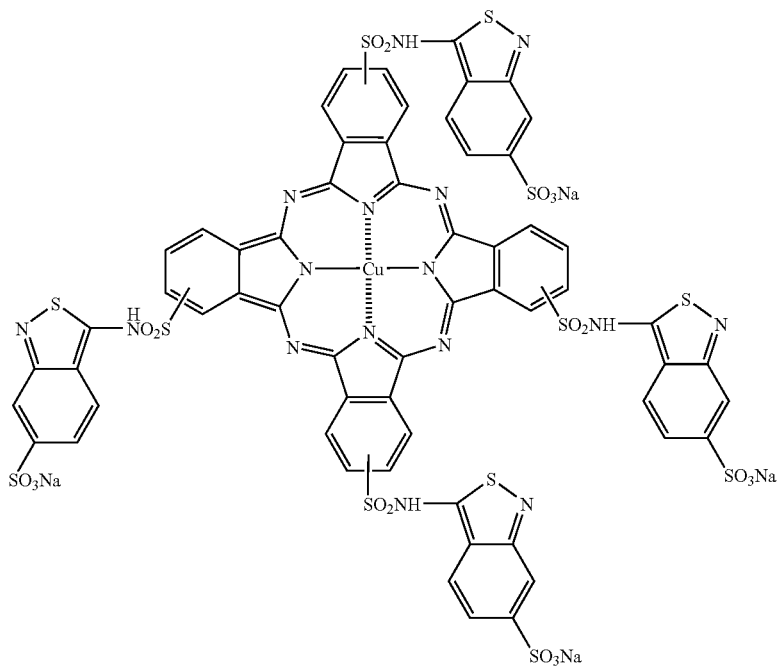
Compound (I-9):
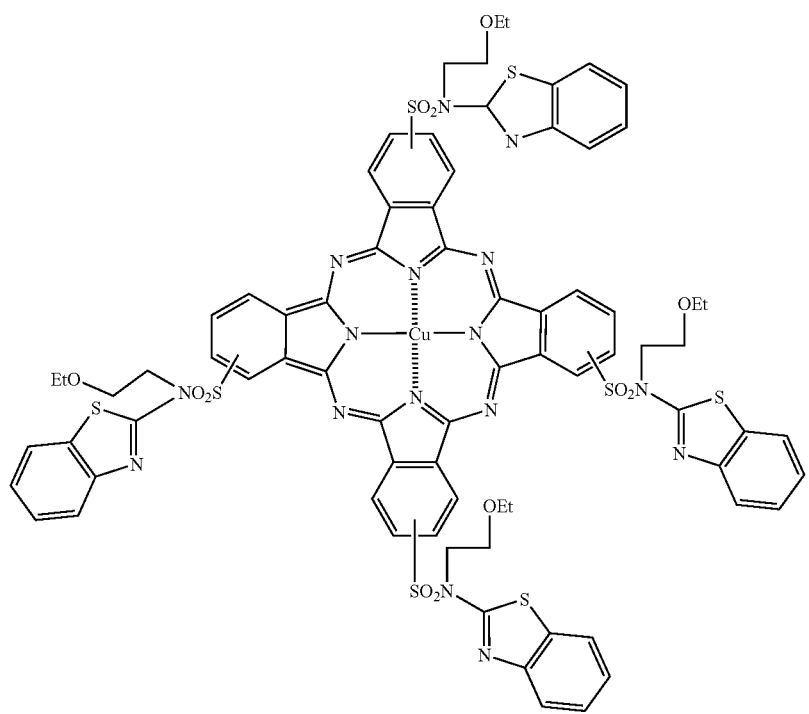

Compound (I-10):
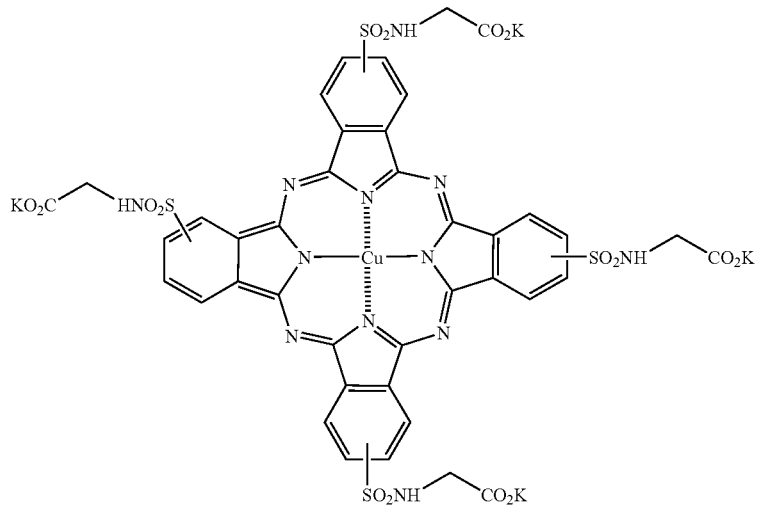
Compound (I-11):
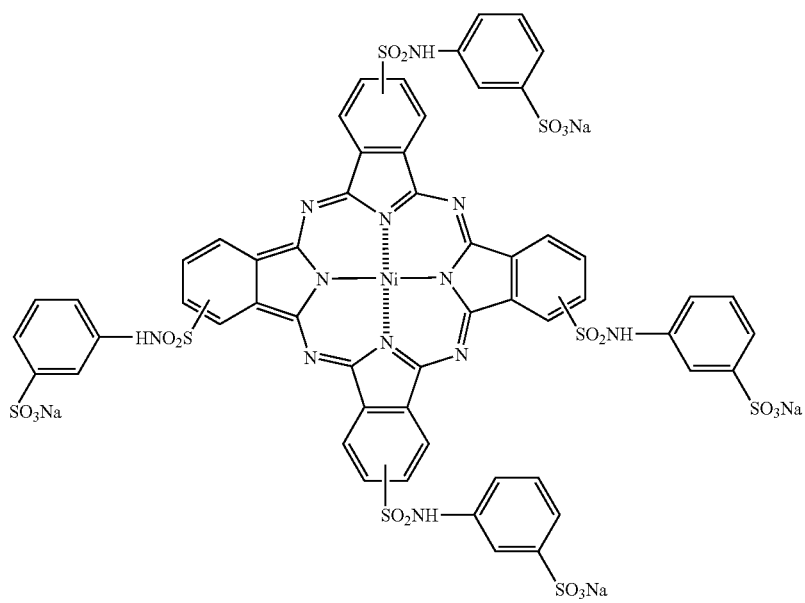
Compound (I-12):
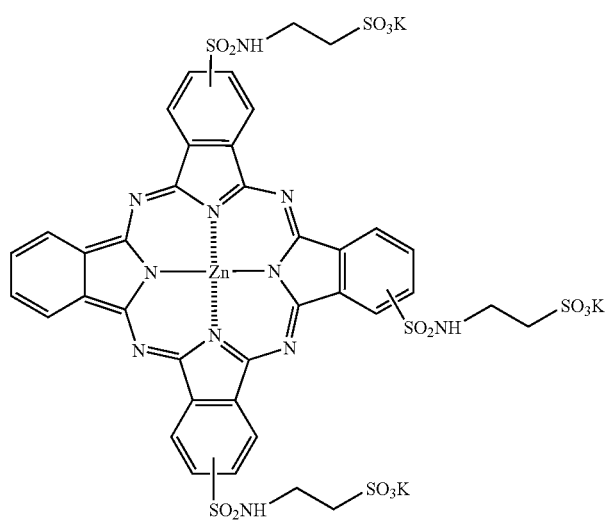

TABLE 20

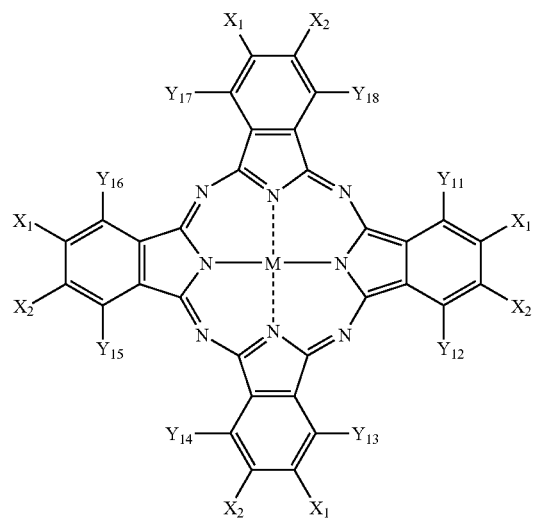

| Comp. No. | M | $X_1$ | $X_2$ | $Y_{11}, Y_{12}$ | $Y_{13}, Y_{14}$ | $Y_{15}, Y_{16}$ | $Y_{17}, Y_{18}$ |
| --- | --- | --- | --- | --- | --- | --- | --- |
| 101 | Cu | —SO$_2$—NH—CH$_2$—CH$_2$—SO$_3$Li | —H | —H, —H | —H, —H | —H, —H | —H, —H |
| 102 | Cu | —SO$_2$—NH—CH$_2$—CH(OH)—CO—NH—CH$_2$CH$_2$—SO$_3$Na | —H | —Cl, —H | —Cl, —H | —Cl, —H | —Cl, —H |
| 103 | Cu | —SO$_2$—NH—CH$_2$—CH$_2$—CH$_2$—SO$_2$NH—CH$_2$CH(OH)—SO$_3$Li | —H | —H, —H | —H, —H | —H, —H | —H, —H |
| 104 | Cu | —SO$_2$—NH—C$_6$H$_4$—SO$_2$NH—CH$_2$CH$_2$—SO$_3$Li | —H | —H, —H | —H, —H | —H, —H | —H, —H |
| 105 | Ni | —SO$_2$—NH—CH$_2$—CH$_2$—CO—NH—CH(CH$_2$—COONa)—COONa | —H | —Cl, —H | —Cl, —H | —Cl, —H | —Cl, —H |
| 106 | Cu | —SO$_2$—NH—CH$_2$—CH$_2$—SO$_2$—NH—CH$_2$—COONa | —CN | —H, —H | —H, —H | —H, —H | —H, —H |
| 107 | Cu | —SO$_2$—CH$_2$—CH$_2$—CH$_2$—SO$_2$—NH—CH(CH$_2$—OH)—COOLi | —H | —H, —H | —H, —H | —H, —H | —H, —H |
| 108 | Cu | —SO$_2$—CH$_2$—CH$_2$—CH$_2$—SO$_3$Li | —H | —H, —H | —H, —H | —H, —H | —H, —H |
| 109 | Cu | —SO$_2$—CH$_2$—CH$_2$—CH$_2$—SO$_3$K | —H | —H, —H | —H, —H | —H, —H | —H, —H |
| 110 | Cu | —SO$_2$—(CH$_2$)$_3$—CO$_2$K | —H | —H, —H | —H, —H | —H, —H | —H, —H |

Note:
In the following Tables, specific examples of each pair of ($X_1$, $X_2$), ($Y_{11}$, $Y_{12}$), ($Y_{13}$, $Y_{14}$), ($Y_{15}$, $Y_{16}$) and ($Y_{17}$, $Y_{18}$) are independently in an irregular order.

TABLE 21

[Structure: phthalocyanine macrocycle with central metal M, substituents X₁, X₂ on benzene rings and Y₁₁–Y₁₈ peripheral positions]

| Comp. No. | M | X₁ | X₂ | Y₁₁, Y₁₂ | Y₁₃, Y₁₄ | Y₁₅, Y₁₆ | Y₁₇, Y₁₈ |
|---|---|---|---|---|---|---|---|
| 111 | Cu | —SO₂—NH—CH₂—CH₂—CH₂—SO₂—NH—CH₂CH(OH)—CH₂—SO₃Li | —H | —H, —H | —H, —H | —H, —H | —H, —H |
| 112 | Cu | —SO₂—NH—CH₂—CH₂—CH₂—SO₂NH—CH₂—CH(OH)—CH₃ | —SO₃Li | —H, —H | —H, —H | —H, —H | —H, —H |
| 113 | Cu | —SO₂—CH₂—CH(OH)—CH₂SO₃K | —H | —H, —H | —H, —H | —H, —H | —H, —H |
| 114 | Cu | —SO₂—CH₂—CH(OH)—CH₃ | —SO₃Li | —H, —H | —H, —H | —H, —H | —H, —H |
| 115 | Cu | —SO₂NH(CH₂)₃N⁺(CH₃)(CH₂CH₂CH₂)₂—CH₃—C₆H₄—SO₃⁻ | —H | —H, —H | —H, —H | —H, —H | —H, —H |
| 116 | Cu | —CO—NH—CH₂—CH(OH)—CH₂SO₃K | —H | —H, —H | —H, —H | —H, —H | —H, —H |
| 117 | Cu | —CO—NH—CH(COOLi)—CH₂CH₂SO₃Li | —H | —H, —H | —H, —H | —H, —H | —H, —H |

Note:
In the following Tables, specific examples of each pair of (X₁, X₂), (Y₁₁, Y₁₂), (Y₁₃, Y₁₄), (Y₁₅, Y₁₆) and (Y₁₇, Y₁₈) are independently in an irregular order.

TABLE 22

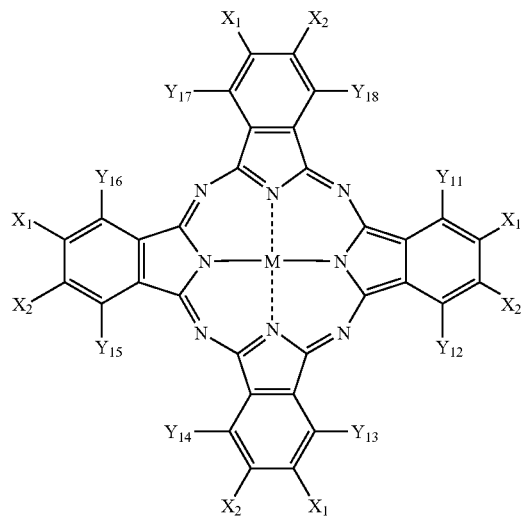

| Comp. No. | M | X₁ | X₂ | Y₁₁, Y₁₂ | Y₁₃, Y₁₄ | Y₁₅, Y₁₆ | Y₁₇, Y₁₈ |
|---|---|---|---|---|---|---|---|
| 118 | Cu | —SO₂CH₂CH₂CH(CH₃)SO₃Li | —H | —H, —H | —H, —H | —H, —H | —H, —H |
| 119 | Cu | —SO₂—CH₂—CH(OH)—CH₂—SO₃Na | —H | —H, —H | —H, —H | —H, —H | —H, —H |
| 120 | Cu | —SO₂—CH₂—CH₂—CH(CH₃)—COOLi | —H | —H, —H | —H, —H | —H, —H | —H, —H |
| 121 | Cu | —SO₂(CH₂)₃SO₂NHCH₂—CH(OH)—CH₂—SO₃Li | —H | —H, —H | —H, —H | —H, —H | —H, —H |
| 122 | Cu | —CO₂CH₂CH₂CH₂SO₂—NH—CH₂—CH(OH)—CH₂—SO₃Li | —H | —H, —H | —H, —H | —H, —H | —H, —H |
| 123 | Cu | —SO₂NH—C₈H₁₇(t) | —H | —H, —H | —H, —H | —H, —H | —H, —H |
| 124 | Cu | —SO₂—NH—CH₂—CH(CH₂CH₃)—CH₂CHCH₂—CH₃ | —H | —H, —H | —H, —H | —H, —H | —H, —H |

Note:
In the following Tables, specific examples of each pair of (X₁, X₂), (Y₁₁, Y₁₂), (Y₁₃, Y₁₄), (Y₁₅, Y₁₆) and (Y₁₇, Y₁₈) are independently in an irregular order.

TABLE 23

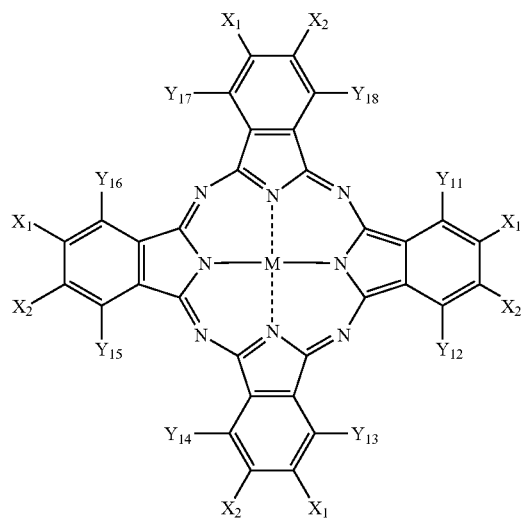

| Comp. No. | M | X₁ | X₂ | Y₁₁, Y₁₂ | Y₁₃, Y₁₄ | Y₁₅, Y₁₆ | Y₁₇, Y₁₈ |
|---|---|---|---|---|---|---|---|
| 125 | Cu | —SO₂CH₂CH₂CH₂SO₂—NH—CH₂—CH(CH₃)—CH₂—CH₃ | —H | —H, —H | —H, —H | —H, —H | —H, —H |
| 126 | Cu | —SO₂—CH₂—CH₂—CH₂—CO₂—CH(CH₃)—CH₂—O—CH₃ | —H | —H, —H | —H, —H | —H, —H | —H, —H |
| 127 | Cu | —SO₂CH₂CH₂CH₂SO₂NHCH₂CH₂CH₂O—CH(CH₃)(CH₃) | —H | —H, —H | —H, —H | —H, —H | —H, —H |
| 128 | Zn | —SO₂—CH₂—CH(O—CH₃)—CH₂—O—CH₂ | —CN | —H, —H | —H, —H | —H, —H | —H, —H |
| 129 | Cu | —CO—NH—CH₂—CH(CH₂CH₃)—CH₂—CH₂—CH₂CH₃ | —H | —Cl, —H | —Cl, —H | —Cl, —H | —Cl, —H |
| 130 | Cu | —CO—CH(CH₃)—CH₂—O—C₄H₉(t) | —H | —H, —H | —H, —H | —H, —H | —H, —H |
| 131 | Cu | —SO₂—CH₂—CH₂—CH(CH₃)—SO₂—NH—C₆H₃(SO₃Li)(SO₃Li) | —H | —H, —H | —H, —H | —H, —H | —H, —H |

Note:

In the following Tables, specific examples of each pair of (X₁, X₂), (Y₁₁, Y₁₂), (Y₁₃, Y₁₄), (Y₁₅, Y₁₆) and (Y₁₇, Y₁₈) are independently in an irregular order.

TABLE 24

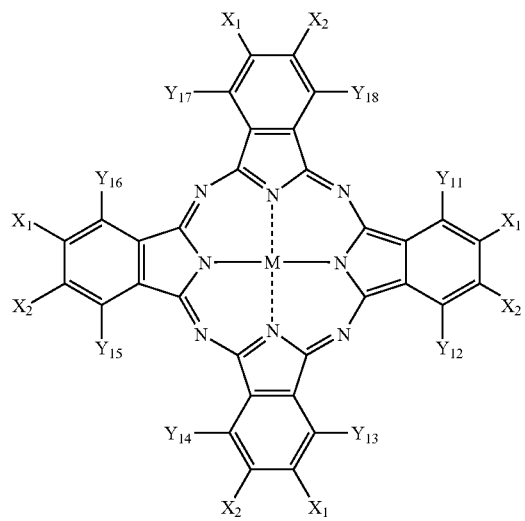

| Comp. No. | M | X₁ | X₂ | Y₁₁, Y₁₂ | Y₁₃, Y₁₄ | Y₁₅, Y₁₆ | Y₁₇, Y₁₈ |
|---|---|---|---|---|---|---|---|
| 132 | Cu | —SO₂NH—C₆H₃(CO₂C₆H₁₃(n))₂ | —H | —H, —H | —H, —H | —H, —H | —H, —H |
| 133 | Cu | —SO₂NH—C₆H₃(OCH₂CH₂OCH₃)(SO₂NHCH₂CH(C₂H₅)(C₄H₉)) | —H | —H, —H | —H, —H | —H, —H | —H, —H |
| 134 | Cu | —SO₂NH—C₆H₄—SO₂—NH—CH₂—CH(CH₂CH₃)—CH₂CH₂—CH₂—CH₃ | —H | —H, —H | —H, —H | —H, —H | —H, —H |
| 135 | Cu | —SO₂NH—C₆H₄—CO₂Na | —H | —H, —H | —H, —H | —H, —H | —H, —H |
| 136 | Cu | —SO₂N(C₄H₉(n))(C₆H₅) | —H | —H, —H | —H, —H | —H, —H | —H, —H |

Note:
In the following Tables, specific examples of each pair of (X₁, X₂), (Y₁₁, Y₁₂), (Y₁₃, Y₁₄), (Y₁₅, Y₁₆) and (Y₁₇, Y₁₈) are independently in an irregular order.

TABLE 25

[Structure: Metal phthalocyanine core with substituents X₁, X₂ on benzene rings and Y₁₁–Y₁₈ positions around the macrocycle, coordinated to central metal M]

| Comp. No. | M | $X_1$ | $X_2$ | $Y_{11}, Y_{12}$ | $Y_{13}, Y_{14}$ | $Y_{15}, Y_{16}$ | $Y_{17}, Y_{18}$ |
|---|---|---|---|---|---|---|---|
| 137 | Cu | —SO₂–(benzothiazol-2-yl)-6-SO₃Li | —H | —H, —H | —H, —H | —H, —H | —H, —H |
| 138 | Cu | —SO₂NH–(3-methyl-1-(2-SO₃Li-4-LiO₃S-phenyl)pyrazol-5-yl) | —H | —H, —H | —H, —H | —H, —H | —H, —H |
| 139 | Cu | —SO₂(CH₂)₃—NH—C(=O)—(3,4-di-CO₂Li-phenyl) | —Cl | —H, —H | —H, —H | —H, —H | —H, —H |
| 140 | Cu | —CO₂—CH₂CH₂CH₂—NH—(4,6-bis(NH—CH₂—CH₂—CH(CH₃)—SO₃Li)-1,3,5-triazin-2-yl) | —H | —H, —H | —H, —H | —H, —H | —H, —H |

Note:
In the following Tables, specific examples of each pair of ($X_1$, $X_2$), ($Y_{11}$, $Y_{12}$), ($Y_{13}$, $Y_{14}$), ($Y_{15}$, $Y_{16}$) and ($Y_{17}$, $Y_{18}$) are independently in an irregular order.

TABLE 26

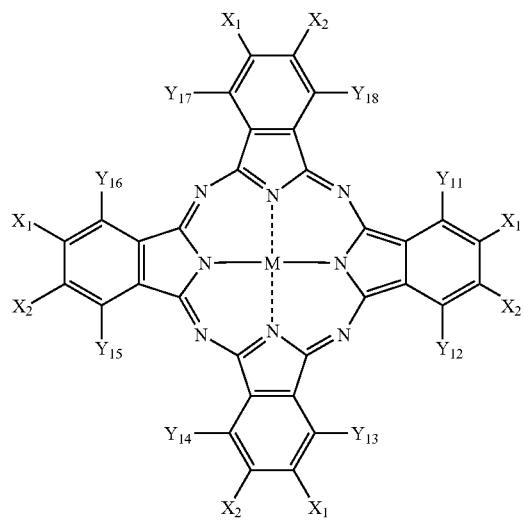

| Comp. No. | M | $X_1$ | $X_2$ | $Y_{11}, Y_{12}$ | $Y_{13}, Y_{14}$ | $Y_{15}, Y_{16}$ | $Y_{17}, Y_{18}$ |
|---|---|---|---|---|---|---|---|
| 141 | Cu | —SO$_2$NH—CH(COONa)—CH$_2$—CO—N—(CH$_2$CH$_2$OH)$_2$ | —H | —H, —H | —H, —H | —H, —H | —H, —H |
| 142 | Cu | —SO$_2$NH—(C$_6$H$_4$)—NHC(O)—(C$_6$H$_4$)—SO$_3$Li | —H | —H, —H | —H, —H | —H, —H | —H, —H |
| 143 | Cu | —CO—NH—CH$_2$—CH(OH)—CO—NH—CH(COOK)—CH$_2$CH$_2$—SO$_3$K | —H | —H, —H | —H, —H | —H, —H | —H, —H |
| 144 | Cu | —SO$_2$—CH$_2$CH$_2$CH$_2$—NH—CO—(C$_6$H$_4$)—CO—NH—CH(COOLi)—CH$_2$—COOLi | —H | —H, —H | —H, —H | —H, —H | —H, —H |
| 145 | Cu | —SO$_2$CH$_2$CH$_2$OCH$_2$CH$_2$OCH$_2$CH$_2$SO$_3$Li | —H | —H, —H | —H, —H | —H, —H | —H, —H |

Note:
In the following Tables, specific examples of each pair of ($X_1$, $X_2$), ($Y_{11}$, $Y_{12}$), ($Y_{13}$, $Y_{14}$), ($Y_{15}$, $Y_{16}$) and ($Y_{17}$, $Y_{18}$) are independently in an irregular order.

TABLE 27

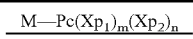

| Comp. No. | M | $Xp_1$ | m |
|---|---|---|---|
| 146 | Cu | —SO$_2$—NH—CH$_2$—CH(CH$_3$)—SO$_3$Li | 3 |
| 147 | Cu | —SO$_2$—NH—CH$_2$—CH$_2$SO$_3$Li | 3 |
| 148 | Cu | —SO$_2$—NH—CH$_2$—CH(CH$_3$)—SO$_3$Li | 3 |

TABLE 27-continued

| | | | n |
|---|---|---|---|
| 149 | Cu | —SO$_2$—NH—CH$_2$—CH(CH$_3$)—SO$_3$Li | 2 |
| 150 | Cu | —SO$_2$—NH—CH$_2$—CH$_2$—SO$_2$—NH—CH$_2$CH$_2$—COONa | 3 |
| 151 | Cu | —SO$_2$—NH—C$_6$H$_4$—SO$_2$NH—CH$_2$—CH(OH)—SO$_3$Li | 3 |
| 152 | Cu | —SO$_2$—CH$_2$—CH$_2$—CH(CH$_3$)—SO$_3$Li | 2.5 |
| 153 | Cu | —SO$_2$—CH$_2$—CH$_2$—CH(CH$_3$)—SO$_3$Na | 2 |
| 154 | Cu | —SO$_2$—CH$_2$—CH$_2$—CH$_2$—SO$_3$Li | 3 |
| 155 | Cu | —SO$_2$—CH$_2$—CH$_2$—CH$_2$—COOK | 2 |
| 156 | Cu | —SO$_2$—CH$_2$—CH$_2$—CH$_2$—SO$_3$Li | 3 |
| 157 | Cu | —SO$_2$—CH$_2$—CH$_2$—O—CH$_2$—CH$_2$—SO$_3$Li | 2 |

| Comp. No. | X$_{p2}$ | n |
|---|---|---|
| 146 | —SO$_2$—NH—CH$_2$—CH(OH)—CH$_3$ | 1 |
| 147 | —SO$_2$—NH—CH$_2$—CH$_2$—CH$_2$—SO$_2$—NH—CH$_2$—CH(OH)—CH$_3$ | 1 |
| 148 | —SO$_2$NH—CH$_2$—CH$_2$—CH$_2$—SO$_2$—NH—CH$_2$—CH$_2$—O—CH$_2$—CH$_2$—OH | 1 |
| 149 | —SO$_2$—NH—CH$_2$—CH$_2$—CH$_2$—CO—N(—CH$_2$—CH$_2$—OH)$_2$ | 2 |
| 150 | —SO$_2$NH—CH(CH$_3$)—CH$_2$OH | 1 |
| 151 | —SO$_2$NH—CH$_2$—CH$_2$—O—CH$_2$—CH$_2$—OH | 1 |
| 152 | —SO$_2$—CH$_2$—CH$_2$—O—CH$_2$—CH$_2$—OH | 1.5 |
| 153 | —SO$_2$—CH$_2$—CH$_2$—CH$_2$—CO—N(—CH$_2$—CH$_2$—OH)$_2$ | 2 |
| 154 | —SO$_2$—CH$_2$—CH$_2$—CH$_2$—SO$_2$—NH—CH$_2$—CH(OH)—CH$_3$ | 1 |
| 155 | —SO$_2$—CH$_2$—CH$_2$—CH$_2$—SO$_2$—NH—CH$_2$—CH(OH)—CH$_2$—COOK | 2 |
| 156 | —SO$_2$—CH$_2$—CH(OH)—CH$_2$—SO$_3$Li | 1 |
| 157 | —SO$_2$—CH$_2$—CH$_2$—CH$_2$—CO$_2$—CH$_2$—CH$_2$—CH(OH)—CH$_2$—COOK | 2 |

Note:
In the following Tables, each introduction site of substituents (X$_{p1}$) and (X$_{p2}$) is in an irregular order within the β-position substitution type.

TABLE 28

$$M-Pc(Xp_1)_m(Xp_2)_n$$

| Comp. No. | M | $Xp_1$ | m |
|---|---|---|---|
| 158 | Cu | —SO$_2$—CH$_2$—CH(OH)—CH$_2$SO$_3$Li | 3 |
| 159 | Cu | —SO$_2$NHCH$_2$CH$_2$—SO$_3$Li | 3 |
| 160 | Cu | —SO$_2$—CH$_2$—CH$_2$—O—CH$_2$—CH$_2$—O—CH$_2$—CH$_2$—SO$_3$Na | 3 |
| 161 | Cu | —SO$_2$CH$_2$CH$_2$CH$_2$SO$_3$Li | 3 |
| 162 | Cu | —SO$_2$CH$_2$CH$_2$CH$_2$SO$_3$Li | 2 |
| 163 | Cu | —SO$_2$CH$_2$CH$_2$CH$_2$SO$_3$K | 3 |
| 164 | Cu | —SO$_2$CH$_2$CH$_2$CH$_2$SO$_3$Li | 2 |
| 165 | Cu | —CO—NH—CH$_2$—CH$_2$—SO$_3$K | 3 |
| 166 | Cu | —CO—NH—CH$_2$—CH$_2$—SO$_2$—NH—CH$_2$—CH$_2$—COONa | 3 |
| 167 | Cu | —SO$_2$(CH$_2$)$_3$SO$_2$NHCH$_2$—CH(OH)—CH$_2$CO$_2$Li | 2.5 |
| 168 | Cu | —CO$_2$—CH$_2$—CH$_2$—CH(CH$_3$)—SO$_3$Na | 2 |
| 169 | Cu | —CO$_2$—CH$_2$—CH$_2$—CH$_2$—SO$_3$Li | 3 |
| 170 | Cu | —CO$_2$—CH$_2$—CH$_2$—CH$_2$COOK | 2 |

| Comp. No. | $Xp_2$ | n |
|---|---|---|
| 158 | —SO$_2$—CH$_2$—C$_6$H$_4$—SO$_2$NH—CH$_2$—CH(OH)—CH$_2$—OH | 1 |
| 159 | —SO$_2$—CH$_2$—CH$_2$—CH$_2$—SO$_2$—NH—CH$_2$—CH(OH)—CH$_3$ | 1 |
| 160 | —SO$_2$—CH$_2$—CH$_2$—CH$_2$—CO—N(CH$_2$—CH$_2$—COONa)(CH$_2$—COONa) | 1 |
| 161 | —SO$_2$CH$_2$CH$_2$CH$_2$SO$_2$NHCH$_2$—CH(OH)—CH$_2$SO$_3$Li | 1 |
| 162 | —SO$_2$CH$_2$CH$_2$OCH$_2$CH$_2$OCH$_2$CH$_2$OH | 2 |
| 163 | —SO$_2$CH$_2$CH$_2$CH$_2$SO$_2$NH—CH(CH$_3$)—CH$_2$—OH | 1 |
| 164 | —SO$_2$CH$_2$CH$_2$CH$_2$SO$_2$N(CH$_2$CH$_2$OH)$_2$ | 2 |
| 165 | —CO—NH—CH$_2$—CH$_2$—O—CH$_2$—CH$_2$—OH | 1 |
| 166 | —CO—NH—CH$_2$—CH(OH)—CH$_3$ | 1 |
| 167 | —CO—NH—CH$_2$—CH$_2$—CH$_2$—CO—N—(CH$_2$—CH$_2$—OH)$_2$ | 1.5 |
| 168 | —CO—CH$_2$—CH$_2$—CH$_2$—CO—N(—CH$_2$—CH$_2$—OH)$_2$ | 2 |
| 169 | —CO$_2$—CH$_2$—CH$_2$—CH$_2$—SO$_2$—NH—CH$_2$—CH(OH)—CH$_3$ | 1 |
| 170 | —CO$_2$—CH$_2$—CH$_2$—CH$_2$—SO$_2$—NH—CH$_2$—CH(OH)—CH$_2$—COOK | 2 |

Note:
In the following Tables, each introduction site of substituents ($X_{p1}$) and ($X_{p2}$) is in an irregular order within the β-position substitution type.

TABLE 29

M—Pc(Xp$_1$)$_m$(Xp$_2$)$_n$

| Comp. No. | M | Xp$_1$ | m |
|---|---|---|---|
| 171 | Cu | —CO$_2$—CH$_2$—CH$_2$—O—CH$_2$—CH$_2$—O—CH$_2$—CH$_2$—SO$_3$Na | 3 |
| 172 | Cu | —SO$_2$CH$_2$CH$_2$OCH$_2$CH$_2$O—CH$_2$CH$_2$SO$_3$K | 2 |
| 173 | Cu | —SO$_2$(CH$_2$)$_3$SO$_2$NHCH$_2$CHCH$_2$OH<br>                                          \|<br>                                         OH | 2 |
| 174 | Cu | —SO$_2$(CH$_2$)$_3$SO$_2$NHCH$_2$—CH—CH$_2$SO$_3$K<br>                                    \|<br>                                   OH | 3 |
| 175 | Cu | —SO$_2$(CH$_2$)$_3$SO$_2$NH(CH$_2$)$_3$N(CH$_2$CH$_2$OH)$_2$ | 2 |
| 176 | Cu | —SO$_2$—CH$_2$—CH$_2$—CH$_2$—SO$_2$—NH—CH$_2$—CH(OH)—CH$_3$ | 3 |
| 177 | Cu | —SO$_2$—CH$_2$—CH$_2$—O—CH$_2$—CH$_2$—O—CH$_3$ | 2 |
| 178 | Cu | —SO$_2$—CH$_2$—CH$_2$—O—CH$_2$—CH$_2$—O—CH$_2$—CH$_2$—OH | 3 |
| 179 | Cu | —SO$_2$—CH$_2$—CH(CH$_2$CH$_3$)—CH$_2$CH$_2$—CH$_2$CH$_3$ | 2 |
| 180 | Cu | —SO$_2$—CH$_2$—CH$_2$—CH$_2$—SO$_2$—NH—CH$_2$—CH(O—CH$_3$)—CH$_3$ | 3 |
| 181 | Cu | —SO$_2$—CH$_2$—CH$_2$—CH$_2$—CO$_2$—NH—CH(CH$_3$)—CH$_2$—CH$_3$ | 3 |
| 182 | Cu | —SO$_2$—CH$_2$—CH$_2$—CH$_2$—SO$_2$NH—CH$_2$—CH(OH)—CH$_3$ | 2.5 |

| Comp. No. | Xp$_2$ | n |
|---|---|---|
| 171 | —SO$_2$—CH$_2$—C$_6$H$_4$—SO$_2$NH—CH$_2$—CH(OH)—CH$_2$—OH | 1 |
| 172 | —CO$_2$—CH$_2$—CH$_2$—CH$_2$—CO$_2$—CH$_2$—CH$_2$—CH(OH)—CH$_2$—COOK | 2 |
| 173 | —CO$_2$—CH$_2$—CH(OH)—CH$_2$—CH$_2$—SO$_3$Li | 2 |
| 174 | —CO$_2$—CH$_2$—CH$_2$—CH$_2$—SO$_2$—NH—CH$_2$—CH(OH)—CH$_3$ | 1 |
| 175 | —SO$_2$—CH$_2$—CH$_2$—CH$_2$—CO—N(CH$_2$—CH$_2$—COOLi)(CH$_2$—COOLi) | 2 |
| 176 | —SO$_2$—CH$_2$—CH$_2$—CH$_2$—SO$_2$—NH—CH$_2$—CH(CH$_2$CH$_3$)—CH$_2$CH$_2$—CH$_2$CH$_3$ | 1 |
| 177 | —SO$_2$—CH$_2$—CH$_2$—CH$_2$—SO$_2$—NH—CH$_2$—CH(OH)—CH$_3$ | 1 |

TABLE 29-continued

| 178 | —SO$_2$—CH$_2$—CH$_2$—CH$_2$—CO$_2$—CH$_2$—CH(CH$_2$CH$_3$)—CH$_2$CH$_2$—CH$_2$CH$_3$ | 1 |
| --- | --- | --- |
| 179 | —SO$_2$—CH$_2$—CH$_2$—CH$_2$—SO$_2$—NH—CH$_2$—CH(O—CH$_3$)—CH$_3$ | 2 |
| 180 | —SO$_2$NH—CH$_2$—CH$_2$—SO$_2$NH—CH$_2$—CH$_2$—O—CH$_2$—CH$_2$—OH | 1 |
| 181 | —SO$_2$—CH$_2$—CH$_2$—CH$_2$—SO$_2$—NH—CH(—CH$_3$)$_2$ | 1 |
| 182 | —SO$_2$—CH$_2$—CH$_2$—CH$_2$—CO$_2$—NH—CH(CH$_3$)—CH$_2$—CH$_3$ | 1.5 |

Note:
In the following Tables, each introduction site of substituents (X$_{p1}$) and (X$_{p2}$) is in an irregular order within the β-position substitution type.

TABLE 30

M—Pc(Xp$_1$)$_m$(Xp$_2$)$_n$

| Comp. No. | M | Xp$_1$ | m |
| --- | --- | --- | --- |
| 183 | Cu | —SO$_2$—CH$_2$—CH$_2$—CH$_2$—CO$_2$—NH—CH(CH$_3$)—CH$_2$—CH$_3$ | 2 |
| 184 | Cu | —SO$_2$—CH$_2$—CH$_2$—CH$_2$—SO$_2$—NH—CH$_2$—CH(H)—CH$_3$ | 3 |
| 185 | Cu | —SO$_2$—CH$_2$—CH$_2$—CH$_2$—SO$_2$—NH—CH$_2$—CH(OH)—CH$_3$ | 3 |
| 186 | Cu | —SO$_2$—CH$_2$—CH$_2$—CH$_2$—CO$_2$—NH—CH(CH$_3$)—CH$_2$—CH$_3$ | 3 |
| 187 | Cu | —SO$_2$—CH$_2$—CH$_2$—CH$_2$—SO$_2$—NH—CH(—CH$_3$)$_2$ | 3 |
| 188 | Cu | —CO$_2$—CH$_2$—CH$_2$—CH$_2$—CO$_2$—NH—CH(CH$_3$)—CH$_2$—CH$_3$ | 3 |
| 189 | Cu | —CO—NH—CH$_2$—CH$_2$—SO$_2$—NH—CH(—CH$_3$)$_2$ | 3 |
| 190 | Cu | —CO—NH—CH$_2$—CH(CH$_2$CH$_3$)—CH$_2$—CH$_2$—CH$_2$CH$_3$ | 3 |

| Comp. No. | Xp$_2$ | n |
| --- | --- | --- |
| 183 | —SO$_2$—CH$_2$—CH$_2$—CH$_2$—SO$_2$—NH—(CH$_2$)$_3$—CH$_2$—O—CH$_2$CH$_2$—OH | 2 |
| 184 | —SO$_2$—CH$_2$—CH$_2$—O—CH$_2$—CH$_2$—O—CH$_3$ | 1 |
| 185 | —SO$_2$—CH$_2$—CH$_2$—O—CH$_2$—CH$_2$—O—CH$_2$—CH$_2$—O—CH$_3$ | 1 |
| 186 | —SO$_2$—CH$_2$—CH$_2$—O—CH$_2$—CH$_2$—O—CH$_2$—CH$_2$—OH | 1 |
| 187 | —CO$_2$—CH$_2$—CH(CH$_2$CH$_3$)—CH$_2$—CH$_2$—CH$_2$CH$_3$ | 1 |
| 188 | —CO$_2$—CH$_2$—CH$_2$—O—CH$_2$—CH$_2$—O—CH$_3$ | 1 |
| 189 | —SO$_2$—NH—CH$_2$—CH(CH$_2$CH$_3$)—CH$_2$—CH$_2$—CH$_2$—CH$_3$ | 1 |

TABLE 30-continued

| 190 | —CO—NH—CH$_2$—CH$_2$—O—CH$_2$—CH$_2$—O—CH$_3$ | 1 |

Note:
In the following Tables, each introduction site of substituents (X$_{p1}$) and (X$_{p2}$) is in an irregular order within the β-position substitution type.

The structure of the phthalocyanine compound represented by M-Pc(X$_{p1}$)$_m$(X$_{p2}$)$_n$ in Tables 27 to 30 is shown below:

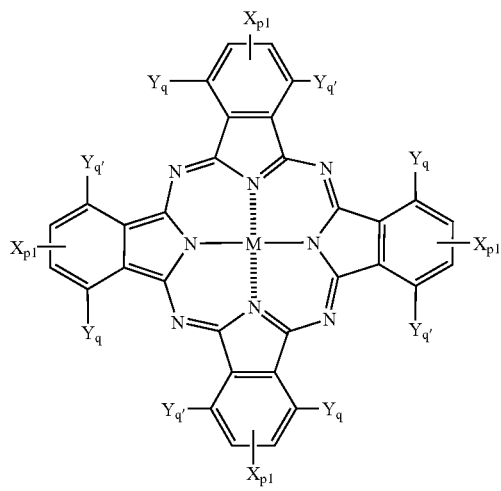

(wherein each X$_{p1}$ is independently X$_{p1}$ or X$_{p2}$)

The phthalocyanine dye represented by formula (C-I) can be synthesized according to the patent publications described above. Furthermore, the phthalocyanine dye represented by formula (C-II) can be synthesized by the methods described in JP-A-2001-226275, JP-A-2001-96610, JP-A-2001-47013 and JP-A-2001-193638 in addition to the above-described synthesis method. The starting material, dye intermediate and synthesis route are not limited to those described in these patent publications.

The ink composition for inkjet recording of the present invention contains the phthalocyanine dye in an amount of preferably from 0.2 to 20 wt %, more preferably from 0.5 to 15 wt %.

The phthalocyanine dye for use in the present invention is substantially water-soluble. The "substantially water-soluble" means that the dye dissolves in an amount of 2 wt % or more in water at 20° C.

In the inkjet ink composition of the present invention, other cyan dyes can be used in combination with the above-described phthalocyanine dye (cyan dye).

Examples of the cyan dye which can be used in combination include azomethine dyes such as indoaniline dye and indophenol dye; polymethine dyes such as cyanine dye, oxonol dye and merocyanine dye; carbonium dyes such as diphenylmethane dye, triphenylmethane dye and xanthene dye; phthalocyanine dyes except for the dye of formula (C-I) of the present invention; anthraquinone dyes; aryl- or heteryl-azo dyes having a phenol, a naphthol or an aniline as the coupling component; and indigo-thioindigo dyes. These dyes may be a dye which provides a cyan color for the first time when a part of the chromophore is dissociated. In this case, the counter cation may be an inorganic cation such as alkali metal and ammonium, an organic cation such as pyridinium and quaternary ammonium salt, or a polymer cation having such a cation in a partial structure.

The phthalocyanine dye represented by formula (C-I) can be synthesized according to the patent publications described above. Furthermore, the phthalocyanine dye represented by formula (C-II) can be synthesized by the methods described in JP-A-2001-226275, JP-A-2001-96610, JP-A-2001-47013 and JP-A-2001-193638. The starting material, dye intermediate and synthesis route are not limited to those described in these patent publications.

<Yellow Ink>

The yellow ink for use in the present invention preferably contains a coloring agent represented by formula (Y-I):

   Formula (Y-1):

$$A^{11}\text{-}N{=}N\text{-}B^{11}$$

wherein $A^{11}$ and $B^{11}$ each independently represents a heterocyclic group which may be substituted, provided that the dye represented by formula (Y-I) contains at least one ionic hydrophilic group within the molecule.

The represented by formula (Y-I) is characterized by having good light fastness and good color hue. Among the dyes represented by formula (Y-I), the yellow dye in particular shows a peak having a sharp shape in the absorption spectrum. The dye represented by formula (Y-I) is preferably a yellow dye, more preferably a yellow where λmax of the absorption spectrum with an aqueous solution is present in the region from 390 to 470 nm and the ratio {I(λmax+70)/I(λmax)} of the absorbance (I(λmax)) at λmax (nm) to the absorbance (I(λmax+70)) at λmax+70 (nm) is 0.2 or less, still more preferably a yellow dye where the ratio is 0.1 or less In formula (Y-I), $A^{11}$ and $B^{11}$ each independently represents a heterocyclic group which may be substituted. Examples of the substituent of the heterocyclic group include an ionic hydrophilic group. The heterocyclic group is preferably a heterocyclic group constituted by a 5- or 6-membered ring and may have a monocyclic structure or a polycyclic structure resulting from condensation of two or more rings. Also, the heterocyclic group is preferably a heterocyclic group containing at least one of N, O and S atoms.

The heterocyclic ring represented by $A^{11}$ in formula (Y-I) is preferably 5-pyrazolone, pyrazole, oxazolone, isoxazolone, barbituric acid, pyridone, rhodanine, pyrazolidinedione, pyrazolopyridone, merdramic acid or a condensed heterocyclic ring resulting from condensation of such a heterocyclic ring with a hydrocarbon aromatic ring or a heterocyclic ring, more preferably 5-pyrazolone, 5-aminopyrazole, pyridone, or a pyrazoloazole, still more preferably 5-aminopyrazole, 2-hydroxy-6-pyridone or pyrazolotriazole.

Examples of the heterocyclic ring represented by $B^{11}$ include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, isoxazole, benzoxazole, thiazole, benzothiazole, isothiazole, benzisothiazole, thiadiazole, benzisoxazole, pyrrolidine, piperidine, piperazine, imidazolidine and thiazoline. Among these, preferred are pyridine, quinoline, thiophene, benzothiophene, pyrazole, imidazole, benzimidazole, triazole, oxazole, isoxazole, benzoxazole, thiazole, benzothiazole, isothiazole, benzisothiazole, thiadiazole and benzisoxazole, more preferred are quinoline, thiophene, pyrazole, thiazole, benzoxazole, benzisoxazole, isothiazole, imidazole, benzothiazole and thiadiazole, and still more preferred are pyrazole, benzothiazole, benzoxazole, imidazole, 1,2,4-thiadiazole and 1,3,4-thiadiazole.

Examples of the substituent substituted to $A^{11}$ and $B^{11}$ include a halogen atom, an alkyl group, a cycloalkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic thio group, a sulfamoyl group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an imido group, a phosphino group, a phosphinyl group, a phosphinyloxy group, a phosphinylamino group and a silyl group.

The dye represented by formula (Y-I) contains at least one ionic hydrophilic group within the molecule. The dye contains an ionic hydrophilic group within the molecule and therefore, exhibits good solubility or dispersibility in an aqueous medium. Examples of the ionic hydrophilic group include a sulfo group, a carboxyl group, a phosphono group and a quaternary ammonium group. Among these, preferred are a sulfo group and a carboxyl group, more preferred is a sulfo group. The dye may contain two or more ionic hydrophilic groups within the molecule and in the case of containing two or more ionic hydrophilic groups, a combination of a carboxyl group and a sulfo group is preferred. The carboxyl group and the sulfo group each may be in a salt state and examples of the counter ion for forming the salt include alkali metal ions (e.g., lithium ion, sodium ion, potassium ion) and organic cations (e.g., tetramethylammonium ion, tetramethylguanidium ion, tetramethylphosphonium ion).

Among the dyes represented by formula (Y-I), the dyes represented by the following formulae (Y-II), (Y-III) and (Y-IV) are preferred because of their more excellent color hue and light fastness.

Formula (Y-II):

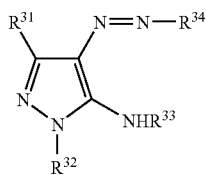

wherein $R_{31}$, $R^{32}$ and $R_{33}$ each independently represents a hydrogen atom, a halogen atom, a cyano group, an alkyl group, a cycloalkyl group, an aralkyl group, an aryl group, an alkylthio group, an arylthio group or an ionic hydrophilic group, and $R^{34}$ represents a heterocyclic group, provided that the dye represented by formula (Y-II) contains at least one hydrophilic group within the molecule;

Formula (Y-III):

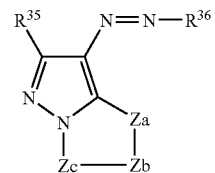

wherein $R^{35}$ represents a hydrogen atom, a cyano group, an alkyl group, a cycloalkyl group, an aralkyl group, an aryl group, an alkylthio group, an arylthio group or an ionic hydrophilic group, Za represents —N═, —NH— or —C($R^{41}$)═, Zb and Zc each independently represents —N═ or —C($R^{41}$)═, $R^{41}$ represents a hydrogen atom or a nonmetallic substituent, and $R^{36}$ represents a heterocyclic group, provided that the dye represented by formula (Y-III) contains at least one hydrophilic group within the molecule;

Formula (Y-IV):

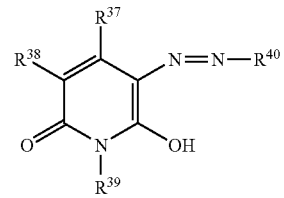

wherein $R^{37}$ and $R^{39}$ each independently represents a hydrogen atom, a cyano group, an alkyl group, a cycloalkyl group, an aralkyl group, an aryl group, an alkylthio group, an arylthio group or an ionic hydrophilic group, $R^{38}$ represents a hydrogen atom, a halogen atom, an alkyl group, an alkoxy group, an aryl group, an aryloxy group, a cyano group, an acylamino group, a sulfonylamino group, an alkoxycarbonylamino group, a ureido group, an alkylthio group, an arylthio group, an alkoxycarbonyl group, a carbamoyl group, a sulfamoyl group, a sulfonyl group, an acyl group, an alkylamino group, an arylamino group, a hydroxy group or an ionic hydrophilic group, and $R^{40}$ represents a heterocyclic group, provided that the dye represented by formula (Y-IV) contains at least one ionic hydrophilic group within the molecule.

In formulae (Y-II), (Y-III) and (Y-IV), $R^{31}$, $R^{32}$, $R^{33}$ $R^{35}$, $R^{37}$ and $R^{39}$ each independently represents a hydrogen atom, a halogen atom, a cyano group, an alkyl group, a cycloalkyl group, an aralkyl group, an aryl group, an alkylthio group, an arylthio group or an ionic hydrophilic group.

The alkyl group represented by $R^{31}$, $R^{32}$, $R^{33}$, $R^{35}$, $R^{37}$ and $R^{39}$ includes an alkyl group having a substituent and an unsubstituted alkyl group. The alkyl group is preferably an alkyl group having from 1 to 12 carbon atoms. Examples of the substituent include a hydroxyl group, an alkoxy group, a cyano group, a halogen atom and an ionic hydrophilic group. Examples of the alkyl group include a methyl group, an ethyl group, a butyl group, an isopropyl group, a tert-butyl group, a hydroxyethyl group, a methoxyethyl group, a cyanoethyl group, a trifluoromethyl group, a 3-sulfopropyl group and a 4-sulfobutyl group.

The cycloalkyl group represented by $R^{31}$, $R^{32}$, $R^{33}$, $R^{35}$, $R^{37}$ and $R^{39}$ includes a cycloalkyl group having a substituent and an unsubstituted cycloalkyl group. The cycloalkyl group is preferably a cycloalkyl group having from 5 to 12 carbon atoms. Examples of the substituent include an ionic hydrophilic group. Examples of the cycloalkyl group include a cyclohexyl group.

The aralkyl group represented by $R^{31}$, $R^{32}$, $R^{33}$, $R^{35}$, $R^{37}$ and $R^{39}$ include an aralkyl group having a substituent and an unsubstituted aralkyl group. The aralkyl group is preferably an aralkyl group having from 7 to 12 carbon atoms. Examples of the substituent include an ionic hydrophilic group. Examples of the aralkyl group include a benzyl group and a 2-phenethyl group.

The aryl group represented by $R^{31}$, $R^{32}$, $R^{33}$, $R^{35}$, $R^{37}$ and $R^{39}$ includes an aryl group having a substituent and an unsubstituted aryl group. The aryl group is preferably an aryl group having from 7 to 12 carbon atoms. Examples of the substituent include an alkyl group, an alkoxy group, a halogen atom, an alkylamino group and an ionic hydrophilic group. Examples of the aryl group include a phenyl group, a p-tolyl group, a p-methoxyphenyl group, an o-chlorophenyl group and an m-(3-sulfopropylamino)phenyl group.

The alkylthio group represented by $R^{31}$, $R^{32}$ $R^{33}$, $R^{35}$ $R^{37}$ and $R^{39}$ includes an alkylthio group having a substituent and an unsubstituted alkylthio group. The alkylthio group is preferably an alkylthio group having from 1 to 12 carbon atoms. Examples of the substituent include an ionic hydrophilic group. Examples of the alkylthio group include a methylthio group and an ethylthio group.

The arylthio group represented by $R^{31}$, $R^{32}$, $R^{33}$, $R^{35}$, $R^{37}$ and $R^{39}$ includes an arylthio group having a substituent and an unsubstituted arylthio group. The arylthio group is preferably an arylthio group having from 6 to 12 carbon atoms. Examples of the substituent include an alkyl group and an ionic hydrophilic group. Examples of the arylthio group include a phenylthio group and a p-tolylthio group.

Examples of the ionic hydrophilic group represented by $R^{31}$, $R^{32}$, $R^{33}$, $R^{35}$, $R^{37}$ and $R^{39}$ includes a sulfo group, a carboxyl group and a quaternary ammonium. Among these, preferred are a sulfo group and a carboxyl group, and more preferred is a sulfo group. The carboxyl group and the sulfo group each may be in a salt state and examples of the counter ion for forming the salt include alkali metal ions (e.g., sodium ion, potassium ion) and organic cations (e.g., tetramethylguanidium ion).

In formula (Y-IV), $R^{38}$ represents a hydrogen atom, a halogen atom, an alkyl group, an alkoxy group, an aryl group, an aryloxy group, a cyano group, an acylamino group, a sulfonylamino group, an alkoxycarbonylamino group, a ureido group, an alkylthio group, an arylthio group, an alkoxycarbonyl group, a carbamoyl group, a sulfamoyl group, a sulfonyl group, an acyl group, an alkylamino group, an arylamino group, a hydroxy group or an ionic hydrophilic group.

The halogen atom represented by $R^{38}$ includes a fluorine atom, a chlorine atom and a bromine atom.

The alkyl group represented by $R^{38}$ includes an alkyl group having a substituent and an unsubstituted alkyl group. The alkyl group is preferably an alkyl group having from 1 to 12 carbon atoms. Examples of the substituent include a hydroxyl group, an alkoxy group, a cyano group, a halogen atom and an ionic hydrophilic group. Examples of the alkyl group include a methyl group, an ethyl group, a butyl group, an isopropyl group, a tert-butyl group, a hydroxyethyl group, a methoxyethyl group, a cyanoethyl group, a trifluoromethyl group, a 3-sulfopropyl group and a 4-sulfobutyl group.

The alkoxy group represented by $R^{38}$ includes an alkoxy group having a substituent and an unsubstituted alkoxy group. The alkoxy group is preferably an alkoxy group having from 1 to 12 carbon atoms. Examples of the substituent include a hydroxyl group and an ionic hydrophilic group. Examples of the alkoxy group include a methoxy group, an ethoxy group, an isopropoxy group, a methoxyethoxy group, a hydroxyethoxy group and a 3-carboxypropoxy group.

The aryl group represented by $R^{39}$ includes an aryl group having a substituent and an unsubstituted aryl group. The aryl group is preferably an aryl group having from 7 to 12 carbon atoms. Examples of the substituent include an alkyl group, an alkoxy group, a halogen atom, an alkylamino group and an ionic hydrophilic group. Examples of the aryl group include a phenyl group, a p-tolyl group, a p-methoxyphenyl group, an o-chlorophenyl group and an m-(3-sulfopropylamino)phenyl group.

The aryloxy group represented by $R^{38}$ includes an aryloxy group having a substituent and an unsubstituted aryloxy group. The aryloxy group is preferably an aryloxy group having from 6 to 12 carbon atoms. Examples of the substituent include an alkoxy group and an ionic hydrophilic group. Examples of the aryloxy group include a phenoxy group, a p-methoxyphenoxy group and an o-methoxyphenoxy group. The acylamino group represented by $R^{38}$ includes an acylamino group having a substituent and an unsubstituted acylamino group. The acylamino group is preferably an acylamino group having from 2 to 12 carbon atoms. Examples of the substituent include an ionic hydrophilic group. Examples of the acylamino group include an acetamide group, a propionamide group, a benzamide group and a 3,5-disulfobenzamide group.

The sulfonylamino group represented by $R^{38}$ includes a sulfonylamino group having a substituent and an unsubstituted sulfonylamino group. The sulfonylamino group is preferably a sulfonylamino group having from 2 to 12 carbon atoms. Examples of the sulfonylamino group include a methylsulfonylamino group and an ethylsulfonylamino group.

The alkoxycarbonylamino group represented by $R^{38}$ includes an alkoxycarbonylamino group having a substituent and an unsubstituted alkoxycarbonylamino group. The alkoxycarbonylamino group is preferably an alkoxycarbonylamino group having from 2 to 12 carbon atoms. Examples of the substituent include an ionic hydrophilic group. Examples of the alkoxycarbonylamino group include an ethoxycarbonylamino group.

The ureido group represented by $R^{38}$ includes a ureido group having a substituent and an unsubstituted ureido group. The ureido group is preferably a ureido group having from 1 to 12 carbon atoms. Examples of the substituent include an alkyl group and an aryl group. Examples of the ureido group include a 3-methylureido group, a 3,3-dimethylureido group and a 3-phenylureido group.

The alkylthio group represented by $R^{38}$ includes an alkylthio group having a substituent and an unsubstituted alkylthio group. The alkylthio group is preferably an alkylthio group having from 1 to 12 carbon atoms. Examples of the substituent include an ionic hydrophilic group. Examples of the alkylthio group include a methylthio group and an ethylthio group.

The arylthio group represented by $R^{38}$ includes an arylthio group having a substituent and an unsubstituted arylthio group. The arylthio group is preferably an arylthio group having from 6 to 12 carbon atoms. Examples of the substituent include an alkyl group and an ionic hydrophilic group. Examples of the arylthio group include a phenylthio group and a p-tolylthio group.

The alkoxycarbonyl group represented by $R^{38}$ includes an alkoxycarbonyl group having a substituent and an unsubstituted alkoxycarbonyl group. The alkoxycarbonyl group is preferably an alkoxycarbonyl group having from 2 to 12 carbon atoms. Examples of the substituent include an ionic hydrophilic group. Examples of the alkoxycarbonyl group include a methoxycarbonyl group and an ethoxycarbonyl group.

The carbamoyl group represented by $R^{33}$ includes a carbamoyl group having a substituent and an unsubstituted carbamoyl group. Examples of the substituent include an alkyl group. Examples of the carbamoyl group include a methylcarbamoyl group and a dimethylcarbamoyl group.

The sulfamoyl group represented by $R^{38}$ includes a sulfamoyl group having a substituent and an unsubstituted sulfamoyl group. Examples of the substituent include an alkyl group. Examples of the sulfamoyl group include a dimethylsulfamoyl group and a di-(2-hydroxyethyl)sulfamoyl group.

Examples of the sulfonyl group represented by $R^{38}$ include a methanesulfonyl group and a phenylsulfonyl group.

The acyl group represented by $R^{38}$ includes an acyl group having a substituent and an unsubstituted acyl group. The acyl group is preferably an acyl group having from 1 to 12 carbon atoms. Examples of the substituent include an ionic hydrophilic group. Examples of the acyl group include an acetyl group and a benzoyl group.

The alkylamino group represented by $R^{38}$ includes an alkylamino group having a substituent and an unsubstituted alkylamino group. The alkylamino group is preferably an alkylamino group having from 1 to 6 carbon atoms. Examples of the substituent include an ionic hydrophilic group. Examples of the alkylamino group include a methylamino group and a diethylamino group.

The arylamino group represented by $R^{38}$ includes an arylamino group having a substituent and an unsubstituted arylamino group. The arylamino group is preferably an arylamino group having from 6 to 12 carbon atoms. Examples of the substituent include a halogen atom and an ionic hydrophilic group. Examples of the arylamino group include an anilino group and a 2-chloroanilino group.

Examples of the ionic hydrophilic group represented by $R^{38}$ includes a sulfo group, a carboxyl group and a quaternary ammonium. Among these, preferred are a sulfo group and a carboxyl group, and more preferred is a sulfo group. The carboxyl group and the sulfo group each may be in a salt state and examples of the counter ion for forming the salt include alkali metal ions (e.g., sodium ion, potassium ion) and organic cations (e.g., tetramethylguanidium ion).

In formula (Y-III), Za represents —N═, —NH— or —C($R^{41}$)═, Zb and Zc each independently represents —N═ or —C($R^{41}$)═, and $R^{41}$ represents a hydrogen atom or a nonmetallic substituent. The nonmetallic substituent represented by $R^{41}$ is preferably a cyano group, a cycloalkyl group, an aralkyl group, an aryl group, an alkylthio group, an arylthio group or an ionic hydrophilic group. These substituents have the same meanings as the substituents represented by $R^{31}$, respectively, and preferred examples are also the same. Examples of the skeleton of the heterocyclic ring comprising two 5-membered rings, contained in formula (YIII), are shown below.

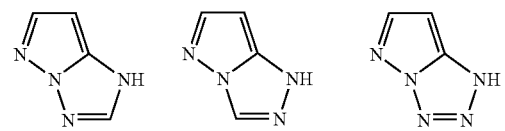

The dyes represented by formulae (Y-II) to (Y-IV) each contains at least one ionic hydrophilic group within the molecule. In this case, dyes of formulae (Y-II) to (Y-IV) where $R^{31}$, $R^{32}$, $R^{33}$, $R^{35}$, $R^{37}$, $R^{38}$ and $R^{39}$ each is an ionic hydrophilic group, and dyes of formulae (Y-II) to (Y-IV) where $R^{38}$ to $R^{41}$ each further has an ionic hydrophilic group as a substituent are included. These dyes each contains an ionic hydrophilic group within the molecule and therefore, exhibits good solubility or dispersibility in an aqueous medium. Examples of the ionic hydrophilic group include a sulfo group, a carboxyl group and a quaternary ammonium group. Among these, preferred are sulfo group and a carboxyl group, more preferred is a sulfo group. The dyes each may contain two or more ionic hyddrophilic groups within the molecule and in the case of containing two or more ionic hydrophilic groups, a combination of a carboxyl group and a sulfo group is preferred. The carboxyl group and the sulfo group each may be in a salt state and examples of the counter ion for forming the salt include alkali metal ions (e.g., lithium ion, sodium ion, potassium ion) and organic cations (e.g., tetramethylammonium ion, tetramethylguanidium ion, tetramethylphosphonium ion). Among these counter ions, alkali metal salts are preferred.

Specific examples of the dye represented by formula (Y-I) (specific examples (Y1-1 to Y1-17) of the dye represented by formula (Y-II), specific examples (Y2-1 to Y2-20) of the dye represented by formula (Y-III), specific examples (Y3-1 to Y3-12) of the dye represented by formula (Y-IV), and Y-101 to Y-155) are set forth below, however, the dye for use in the present invention is not limited to these specific examples. These compounds can be synthesized by referring to JP-A-2-24191 and JP-A-2001-279145.

Y1-1

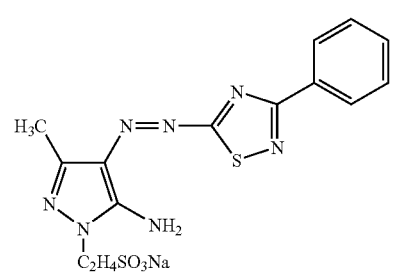

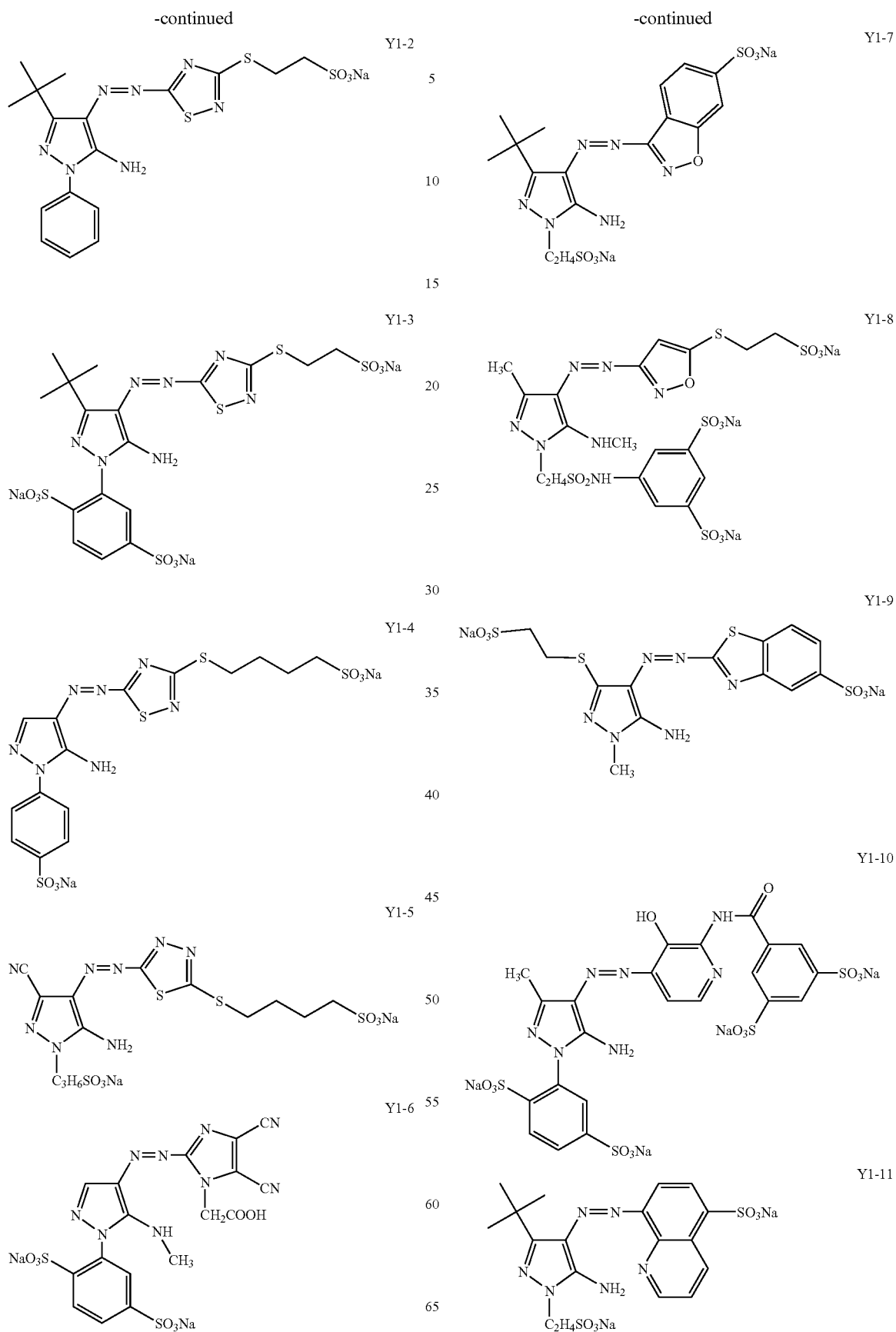

-continued
Y1-12
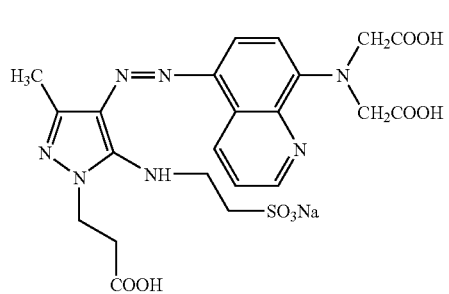
Y1-13
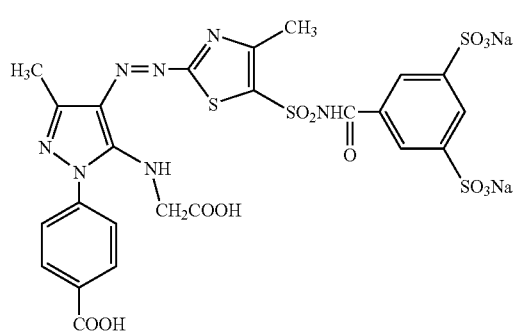
Y1-14
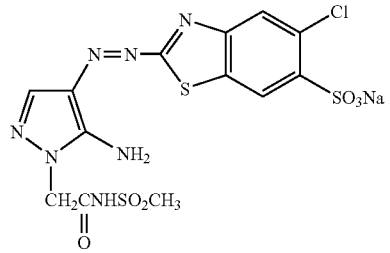
Y1-15
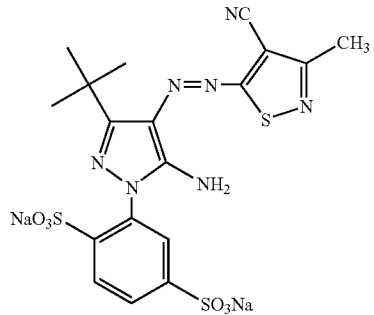
Y1-16
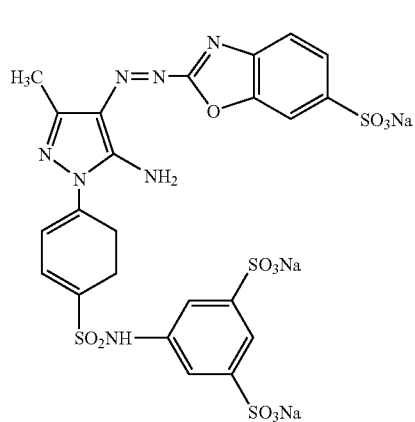
-continued
Y1-17
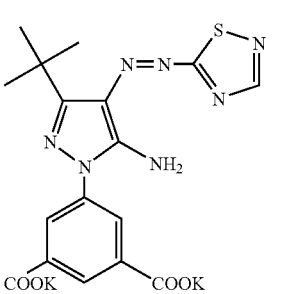
Y2-1
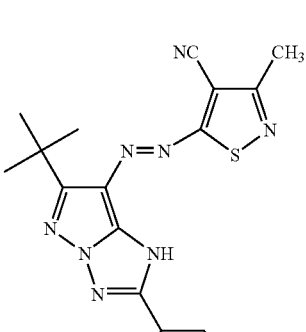
Y2-2
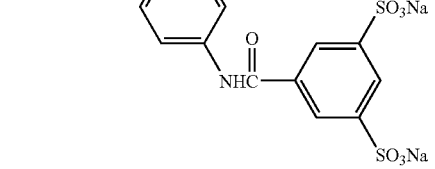
Y2-3
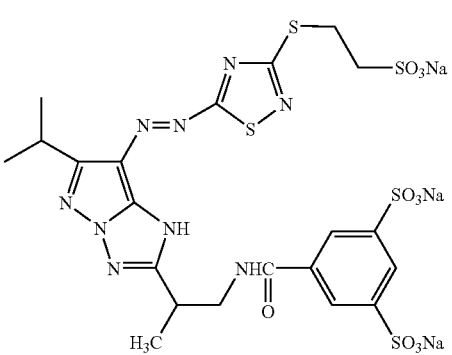
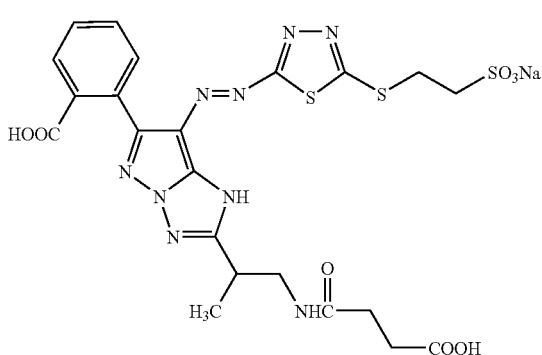

-continued
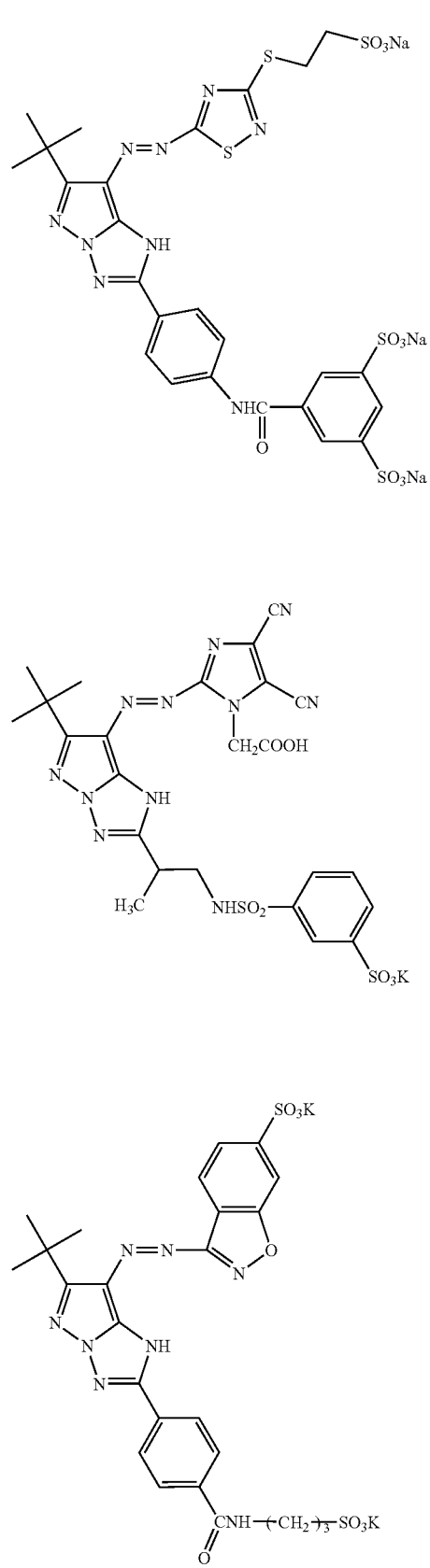
Y2-4
Y2-5
Y2-6
-continued
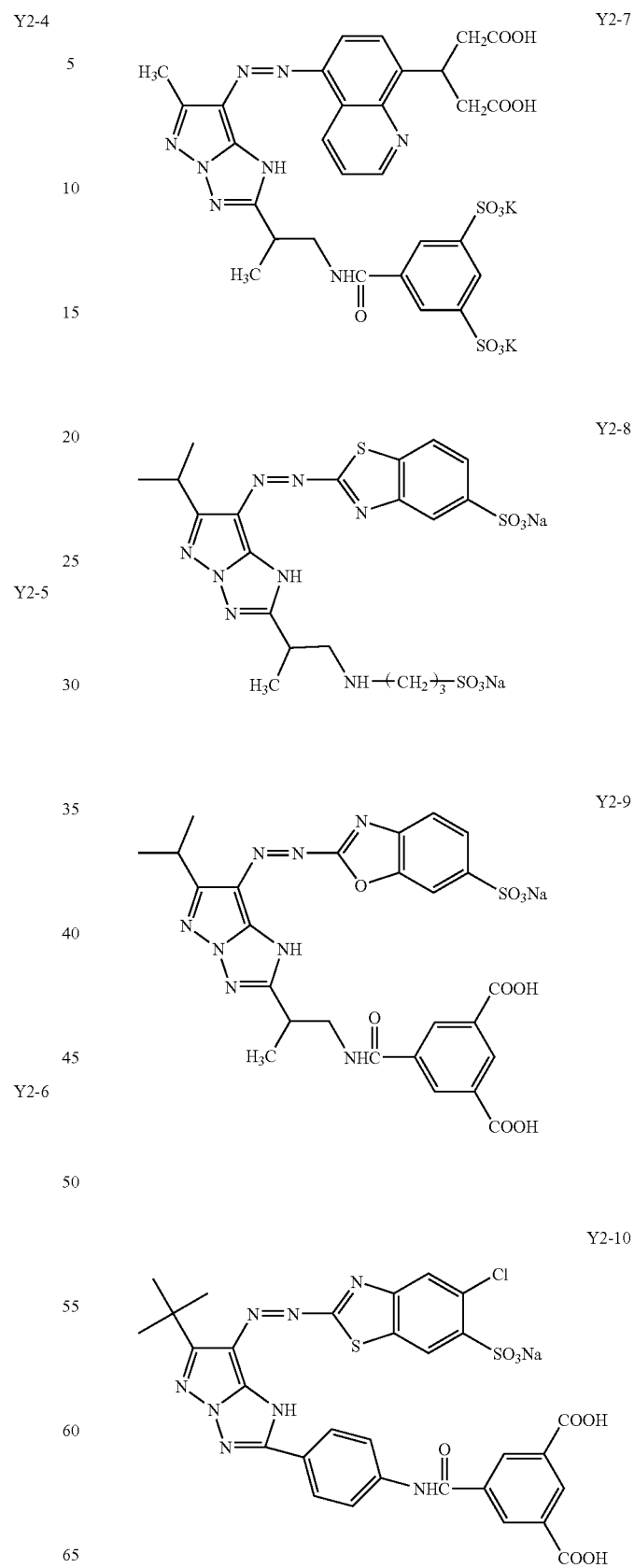
Y2-7
Y2-8
Y2-9
Y2-10

Y2-11
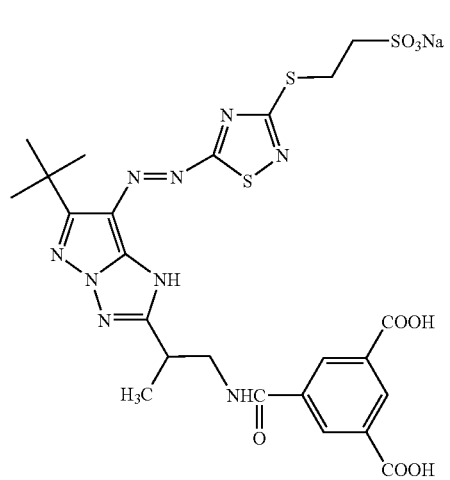
Y2-12
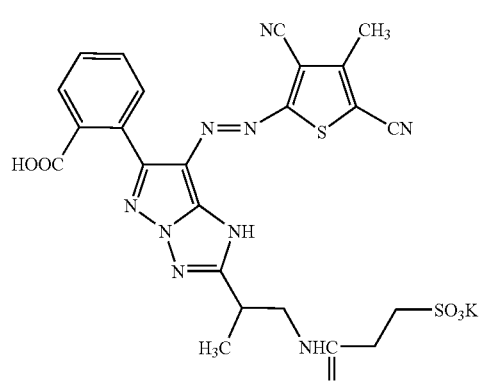
Y2-13
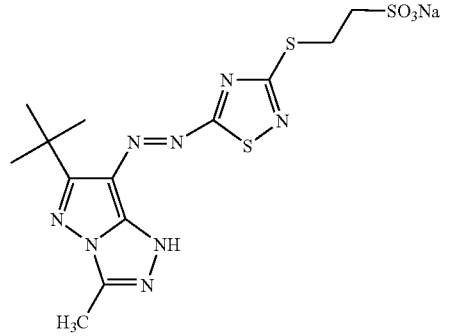
Y2-14
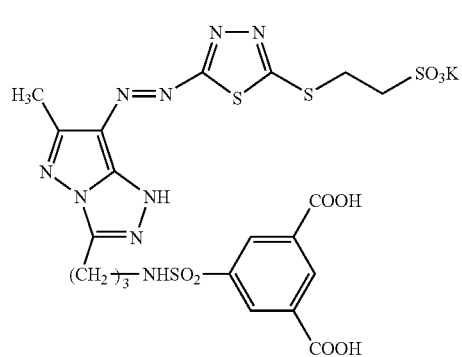
Y2-15
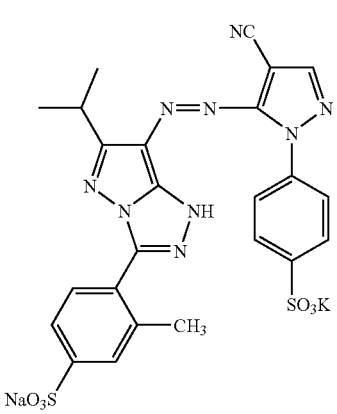
Y2-16
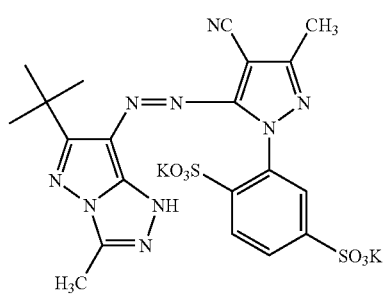
Y2-17
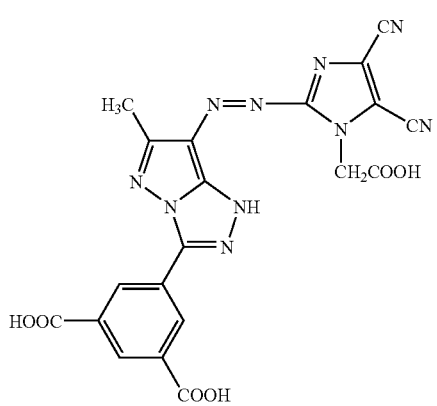
Y2-18
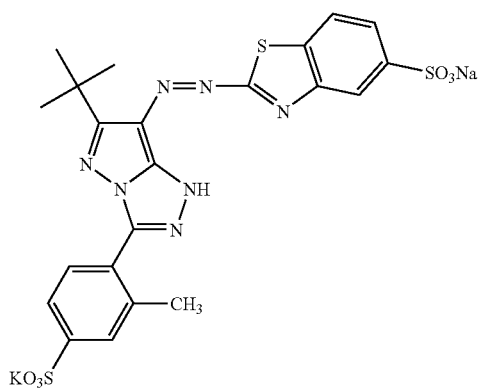

-continued
Y2-19
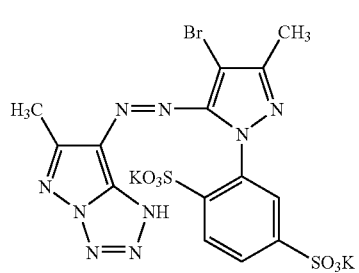
Y2-20
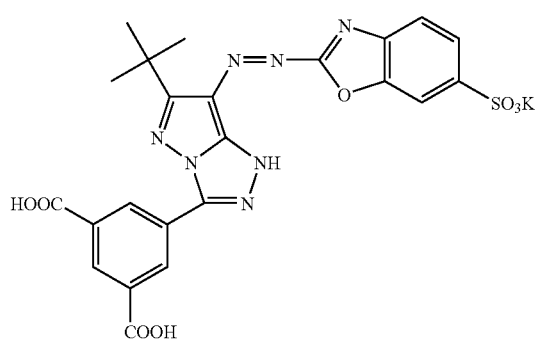
Y3-1
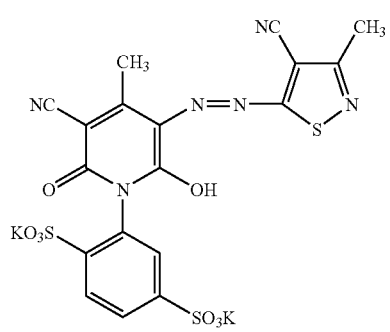
Y3-2
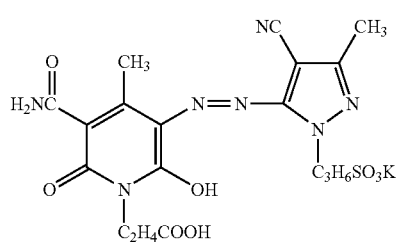
-continued
Y3-3
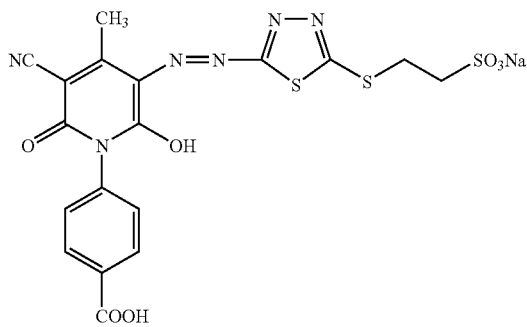
Y3-4
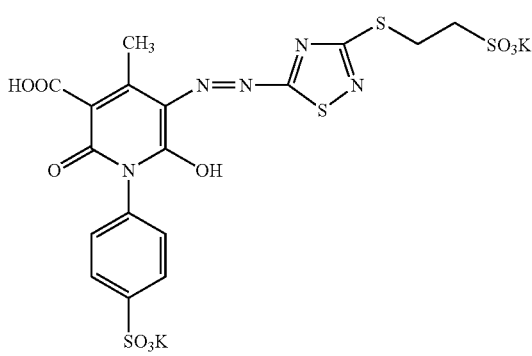
Y3-5
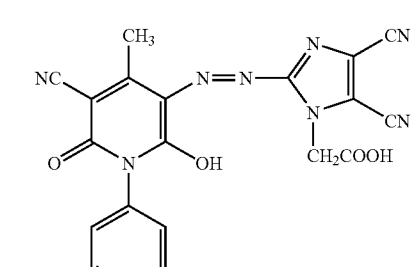
Y3-6
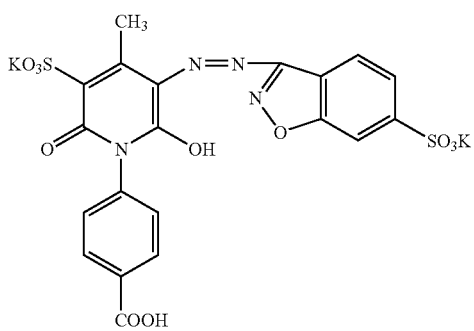
Y3-7
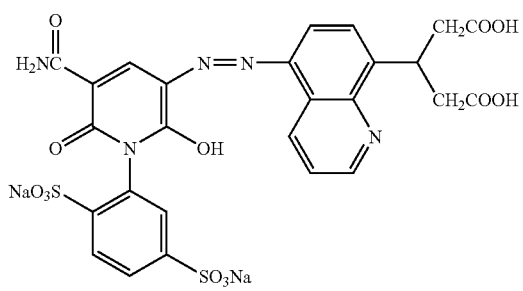

-continued
| | |
|---|---|
| Y3-8 | 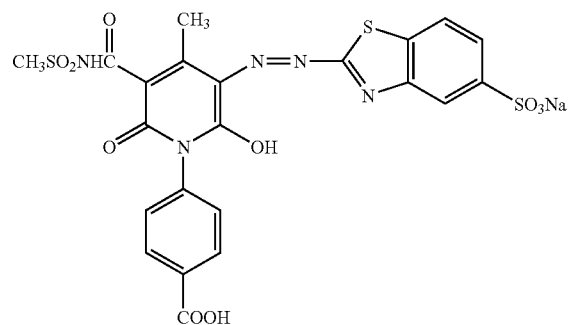 |
| Y3-9 | 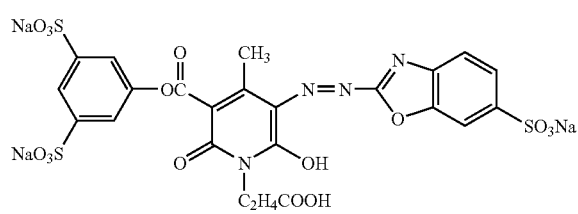 |
| Y3-10 | 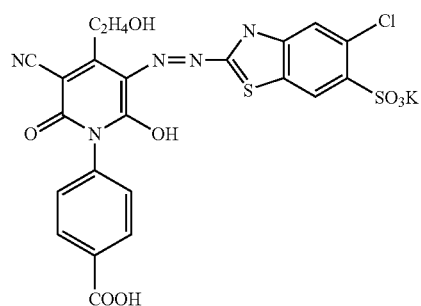 |
| Y3-11 | 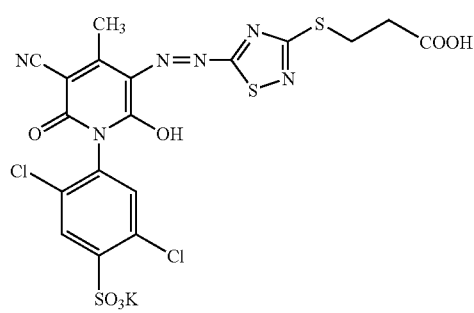 |
| Y3-12 | 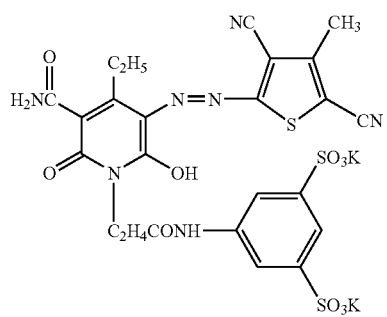 |
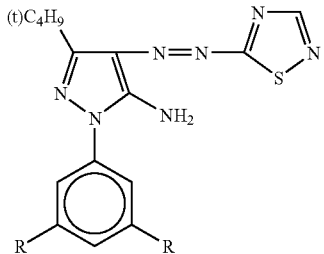
| Dye | R |
|---|---|
| Y-101 | $CON(C_2H_5)_2$ |
| Y-102 | $CON(C_4H_9)_2$ |
| Y-103 | $CON(C_6H_{13})_2$ |
| Y-104 | $COOC_4H_9$ |
| Y-105 | $COOC_6H_{13}$ |
| Y-106 | $COC_4H_9$ |
| Y-107 | $CONHC_4H_9$ |
| Y-108 | $CONHC_6H_{13}$ |
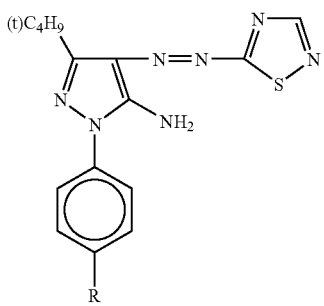
| Dye | R |
|---|---|
| Y-109 | $COOC_4H_9$ |
| Y-110 | $CONHC_4H_9$ |
| Y-111 | $CON(C_4H_9)_2$ |
| Y-112 | $SO_2NHC_6H_{13}$ |
| Y-113 | $SO_2N(C_4H_9)_2$ |
| Y-114 | $NHCOC_6H_{13}$ |
| Y-115 | $NHSO_2C_8H_{17}$ |
| Y-116 | $C_4H_9$ |
| Y-117 | $OC_6H_{13}$ |
| Y-118 | $COOC_{12}H_{25}$ |
| Y-119 | 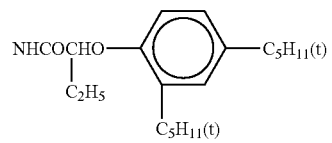 |
| Y-120 |  |
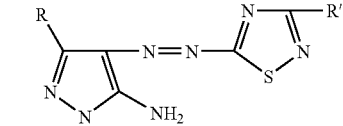
Dye R R'

-continued
| | | |
|---|---|---|
| Y-121 | CH₃ | H |
| Y-122 | Ph | H |
| Y-123 | OC₂H₅ | H |
| Y-124 | C₄H₉(t) | SCH₃ |
| Y-125 | C₄H₉(t) | Ph |
| Y-126 | C₄H₉(t) | CH₃ |
| Y-127 | C₄H₉(t) | SC₈H₁₇ |
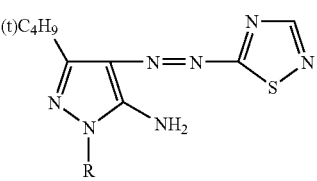
| Dye | R |
|---|---|
| Y-128 | CH₂Ph |
| Y-129 | C₄H₉ |
| Y-130 | C₈H₁₇ |
| Y-131 | CONH₂ |
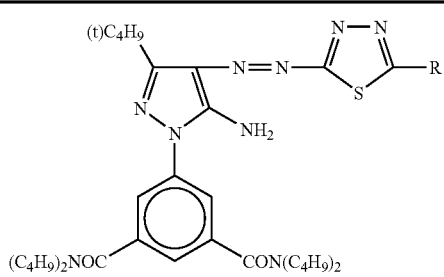
| Dye | R |
|---|---|
| Y-132 | H |
| Y-133 | CH₃ |
| Y-134 | Ph |
| Y-135 | SCH₃ |
Y-136
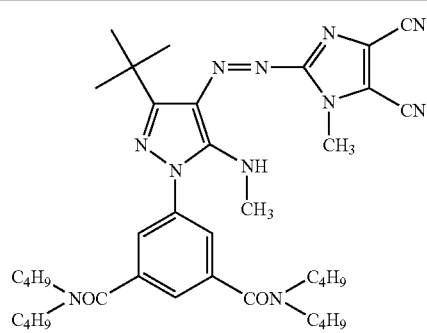
Y-137
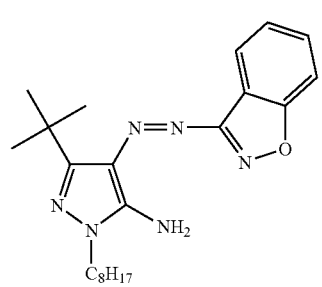
Y-138
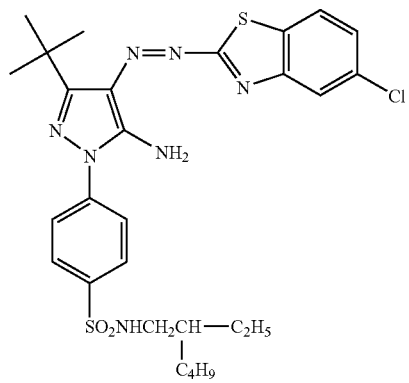
Y-139
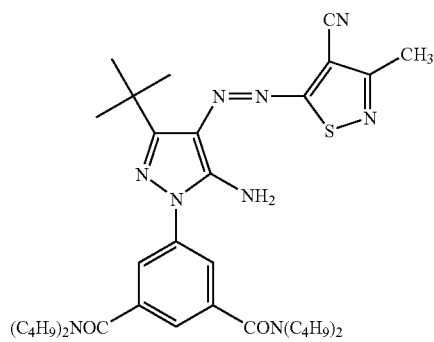
Y-140
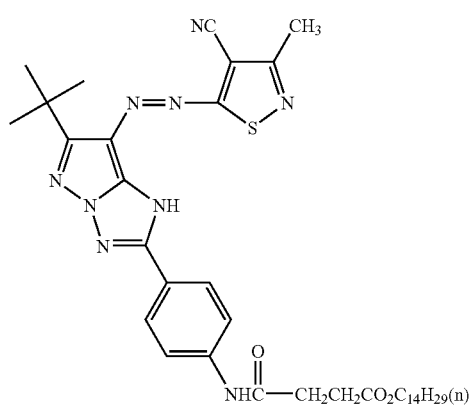
Y-141
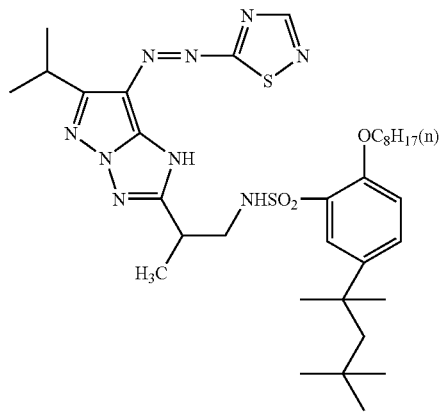

-continued
Y-142
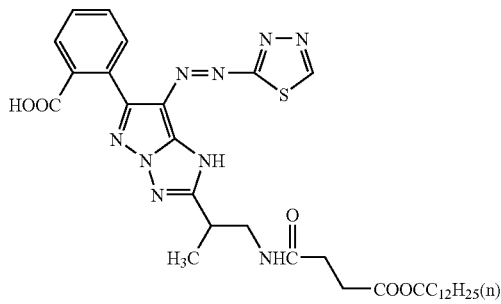
Y-143
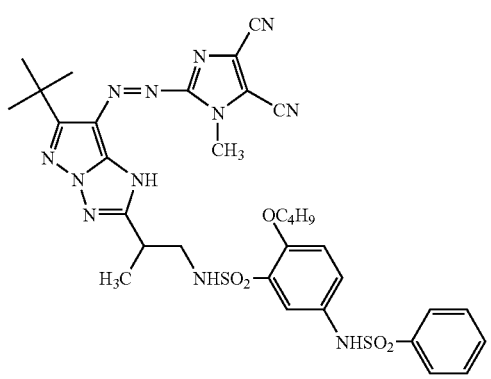
Y-144
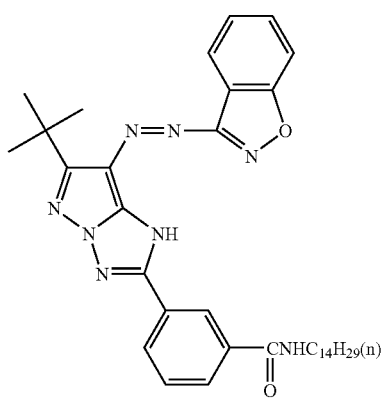
Y-145
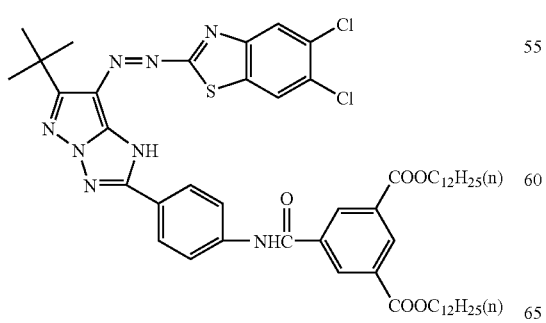
-continued
Y-146
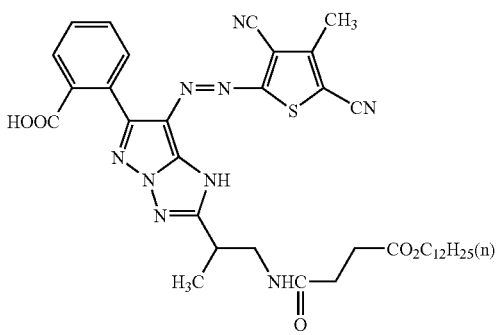
Y-147
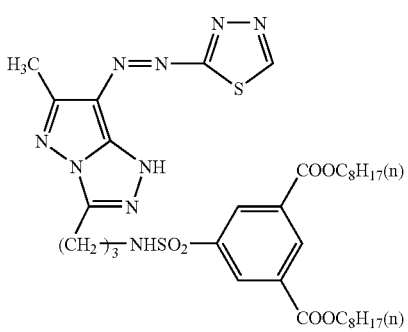
Y-148
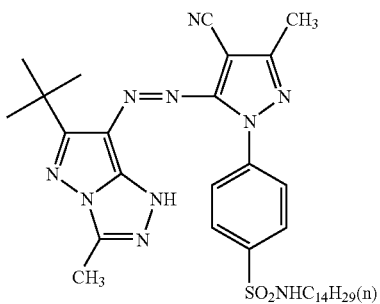
Y-149
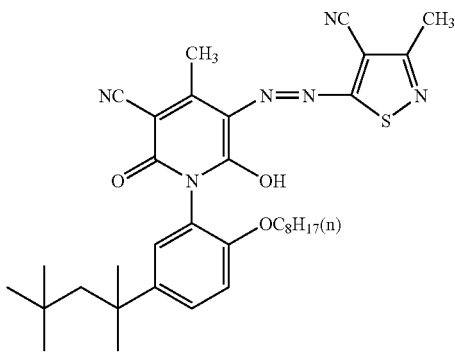
Y-150
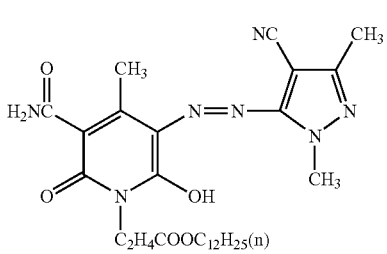

Y-151
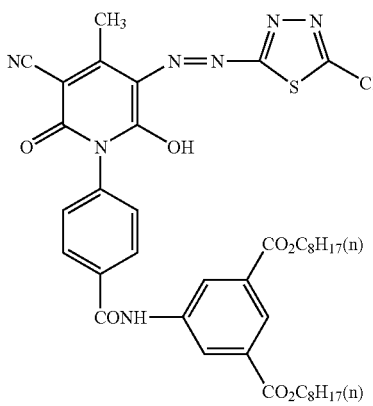

Y-152
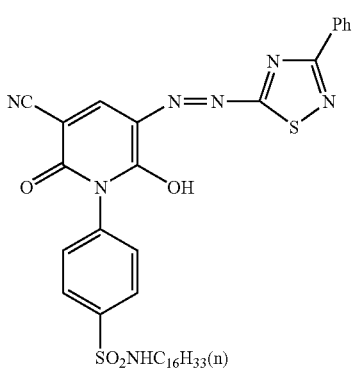

Y-153
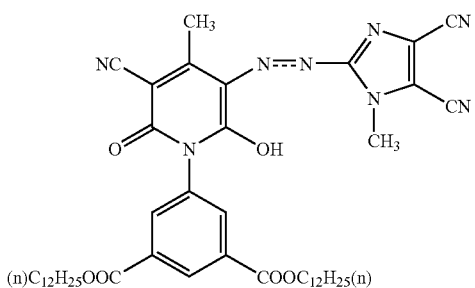

Y-154
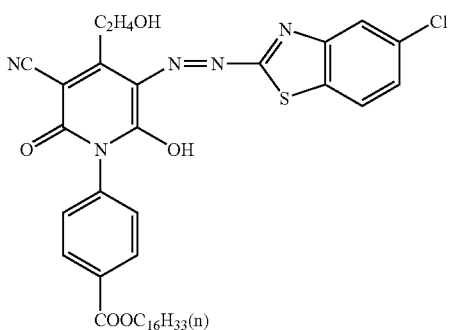

Y-155
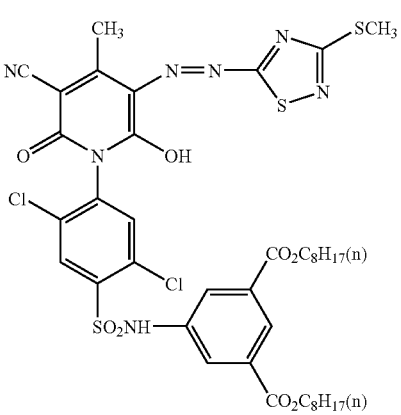

The dyes represented by formulae (Y-I), (Y-II), (Y-III) and (Y-IV) can be synthesized by a coupling reaction of a diazo component and a coupler component. The yield at the synthesis and λmax (in DMF) of each dye represented by formulae (Y-II), (Y-III) and (Y-IV) are shown in the Table below.

TABLE 31

| Dye | Yield (%) | $\lambda_{max}$ (nm) |
| --- | --- | --- |
| Y1-5 | 68 | 448.3 |
| Y1-6 | 70 | 460.2 |
| Y1-7 | 76 | 461.3 |
| Y1-8 | 82 | 458.1 |
| Y1-9 | 64 | 462.8 |
| Y1-10 | 59 | 449.0 |
| Y1-13 | 72 | 455.2 |
| Y1-15 | 73 | 456.3 |
| Y1-16 | 69 | 465.4 |
| Y2-2 | 88 | 443.3 |
| Y2-3 | 82 | 444.2 |
| Y2-4 | 78 | 450.9 |
| Y2-5 | 75 | 448.9 |
| Y2-10 | 76 | 452.7 |

In the ink set of the present invention, each coloring agent is preferably contained in an amount of 0.2 to 20 parts by mass per 100 parts by mass of each ink. In the present invention, when two or more different inks are used as the inks having the same color hue, these inks need not be constituted only by dyes having an oxidation potential specified in the present invention but in this case, the concentration of an ink having a low potential is preferably from 0.05 to 0.5 times the concentration of the ink having an oxidation potential specified in the present invention.

The ink set of the present invention preferably comprises at least a cyan ink, a magenta ink and a yellow ink. Also, in order to obtain a full color image or control the color tone, other coloring materials may be used together with the black dye (ab) to separately prepare, for example, black, cyan, magenta, yellow, red, green and blue inks and by combining these inks, an ink set suitable for the formation of a color image can be provided. At this time, various dyes (dyes and pigments) can be used as the coloring agent for use in the preparation of other inks which are combined with the inks of the present invention to constitute the ink set.

Examples of the dye which can be used in combination in the inkjet ink of the present invention include the followings.

Examples of the dye include, as the yellow dye, aryl- or heteryl-azo dyes having a phenol, a naphthol, an aniline, a pyrazolone, a pyridone or an open chain-type active methylene compound as the coupling component; azomethine dyes having an open chain-type active methylene compound as the coupling component; methine dyes such as benzylidene dye and monomethine oxonol dye; and quinone-base dyes such as naphthoquinone dye and anthraquinone dye. Other examples of the dye species include quinophthalone dye, nitro-nitroso dye, acridine dye and acridinone dye. These dyes may be a dye which provides a yellow color for the first time when a part of the chromophore is dissociated. In this case, the counter cation may be an inorganic cation such as alkali metal and ammonium, an organic cation such as pyridinium and quaternary ammonium salt, or a polymer cation having such a cation in a partial structure.

Examples of the dye include, as the magenta dye, aryl- or heteryl-azo dyes having a phenol, a naphthol or an aniline as the coupling component; azomethine dyes having a pyrazolone or a pyrazolotriazole as the coupling component; methine dyes such as arylidene dye, styryl dye, merocyanine dye and oxonol dye; carbonium dyes such as diphenylmethane dye, triphenylmethane dye and xanthene dye; quinone-base dyes such as naphthoquinone, anthraquinone and anthrapyridone; and condensed polycyclic dyes such as dioxazine dye. These dyes may be a dye which provides a magenta color for the first time when a part of the chromophore is dissociated. In this case, the counter cation may be an inorganic cation such as alkali metal and ammonium, an organic cation such as pyridinium and quaternary ammonium salt, or a polymer cation having such a cation in a partial structure.

Examples of the dye include, as the cyan dye, azomethine dyes such as indoaniline dye and indophenol dye; polymethine dyes such as cyanine dye, oxonol dye and merocyanine dye; carbonium dyes such as diphenylmethane dye, triphenylmethane dye and xanthene dye; phthalocyanine dyes; anthraquinone dyes; aryl- or heteryl-azo dyes having a phenol, a naphthol or an aniline as the coupling component; and indigo-thioindigo dyes. These dyes may be a dye which provides a cyan color for the first time when a part of the chromophore is dissociated. In this case, the counter cation may be an inorganic cation such as alkali metal and ammonium, an organic cation such as pyridinium and quaternary ammonium salt, or a polymer cation having such a cation in a partial structure.

In addition, a black dye (except for the black dye (ab)) such as polyazo dye, and a carbon black dispersion may also be used.

Also, a water-soluble dye such as direct dye, acid dye, food dye, basic dye and reactive dye may be used in combination. Preferred examples thereof include C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 21, 223, 224, 225, 226, 227, 232, 233, 240, 241, 242, 243 and 247; C.I. Direct Violet 7, 9, 47, 48, 51, 66, 90, 93, 94, 95, 98, 100 and 101; C.I. Direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161 and 163; C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289 and 291; C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173 and 199; C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396 and 397; C.I. Acid Violet 5, 34, 43, 47, 48, 90, 103 and 126; C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222 and 227; C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290 and 326; C.I. Acid Black 7, 24, 29, 48, 52:1 and 172; C.I. Reactive Red 3, 13, 17, 19, 21, 22, 23, 24, 29, 35, 37, 40, 41, 43, 45, 49 and 55; C.I. Reactive Violet 1, 3, 4, 5, 6, 7, 8, 9, 16, 17, 22, 23, 24, 26, 27, 33 and 34; C.I. Reactive Yellow 2, 3, 13, 14, 15, 17, 18, 23, 24, 25, 26, 27, 29, 35, 37, 41 and 42; C.I. Reactive Blue 2, 3, 5, 8, 10, 13, 14, 15, 17, 18, 19, 21, 25, 26, 27, 28, 29 and 38; C.I. Reactive Black 4, 5, 8, 14, 21, 23, 26, 31, 32 and 34; C.I. Basic Red 12, 13, 14, 15, 18, 22, 23, 24, 25, 27, 29, 35, 36, 38, 39, 45 and 46; C.I. Basic Violet 1, 2, 3, 7, 10, 15, 16, 20, 21, 25, 27, 28, 35, 37, 39, 40 and 48; C.I. Basic Yellow 1, 2, 4, 11, 13, 14, 15, 19, 21, 23, 24, 25, 28, 29, 32, 36, 39 and 40; C.I. Basic Blue 1, 3, 5, 7, 9, 22, 26, 41, 45, 46, 47, 54, 57, 60, 62, 65, 66, 69 and 71; and C.I. Basic Black 8.

A pigment may be also used in combination.

As the pigment which can be used in the ink of the present invention, commercially available pigments and known pigments described in various publications can be used. Examples of the publication include *Color Index*, compiled by The Society of Dyers and Colourists, *Kaitei Shin Han Ganryo Binran* (*Revised New Handbook of Pigments*), compiled by Nippon Ganryo Gijutsu Kyokai (1989), *Saishin Ganryo Oyo Gijutsu* (*Newest Pigment Application Technology*), CMC Shuppan (1986), *Insatsu Ink Gijutsu* (*Printing Ink Technique*), CMC Shuppan (1984), and W. Herbst and K. Hunger, *Industrial Organic Pigments*, VCH Verlagsgesellschaft (1993). Specific examples of the pigment includes organic pigments such as azo pigments (e.g., azo lake pigment, insoluble azo pigment, condensed azo pigment, chelate azo pigment), polycyclic pigments (e.g., phthalocyanine-base pigment, anthraquinone-base pigment, perylene-base or perynone-base pigment, indigo-base pigment, quinacridone-base pigment, dioxazine-base pigment, isoindolinone-base pigment, quinophthalone-base pigment, diketopyrrolopyrrole-base pigment), dyeing lake pigments (lake pigments of acid or basic dye) and azine pigments, and inorganic pigments such as C.I. Pigment Yellow 34, 37, 42 and 53 which are a yellow pigment, C.I. Pigment Red 101 and 108 which are a red-type pigment, C.I. Pigment Blue 27, 29 and 17:1 which are a blue-type pigment, C.I. Pigment Black 7 and magnetite which are a black-type pigment, and C.I. Pigment White 4, 6, 18 and 21 which are a white-type pigment.

The pigment having a color tone preferred for the formation of an image includes the followings. As the blue to cyan pigment, phthalocyanine pigments, anthraquinone-type indanthrone pigments (for example, C.I. Pigment Blue 60) and dyeing lake pigment-type triarylcarbonium pigments are preferred, and phthalocyanine pigments are most preferred (preferred examples thereof include copper phthalocyanine such as C.I. Pigment Blue 15:1, 15:2, 15:3, 15:4 and 15:6, monochloro or low chlorinated copper phthalocyanine, aluminum phthalocyanine such as pigments described in European Patent 860475, nonmetallic phthalocyanine such as C.I. Pigment Blue 16, and phthalocyanine with the center metal being Zn, Ni or Ti, and among these, C.I. Pigment Blue 15:3 and 15:4 and aluminum phthalocyanine are more preferred).

As the red to violet pigment, azo pigments (preferred examples thereof include C.I. Pigment Red 3, 5, 11, 22, 38, 48:1, 48:2, 48:3, 48:4, 49:1, 52:1, 53:1, 57:1, 63:2, 144, 146 and 184, and among these, C.I. Pigment Red 57:1, 146 and 184 are more preferred), quinacridone-base pigments (preferred examples thereof include C.I. Pigment Red 122, 192, 202, 207 and 209 and C.I. Pigment Violet 19 and 42, and among these, C.I. Pigment Red 122 is more preferred), dyeing lake pigment-type triarylcarbonium pigments (preferred examples thereof include xanthene-base C.I. Pigment Red 81:1 and C.I. Pigment Violet 1, 2, 3, 27 and 39), dioxazine-base pigments (for example, C.I. Pigment Violet 23 and 37), diketopyrrolopyrrole-base pigments (for example, C.I. Pigment Red 254), perylene pigments (for example, C.I. Pigment Violet 29), anthraquinone-base pigments (for example, C.I. Pigment Violet 5:1, 31 and 33) and thioindigo-base pigments (for example, C.I. Pigment Red 38 and 88) are preferred.

As the yellow pigment, azo pigments (preferred examples thereof include monoazo pigment-type C.I. Pigment Yellow 1, 3, 74 and 98, disazo pigment-type C.I. Pigment Yellow 12, 13, 14, 16, 17 and 83, synthetic azo-base C.I. Pigment Yellow 93, 94, 95, 128 and 155, and benzimidazolone-base C.I. Pigment Yellow 120, 151, 154, 156 and 180, and among these, those not using a benzidine-base compound as a raw material are more preferred), isoindoline-isoindolinone-base pigments (preferred examples thereof include C.I. Pigment Yellow 109, 110, 137 and 139), quinophthalone pigments (preferred examples thereof include C.I. Pigment Yellow 138) and flavanthrone pigments (for example, C.I. Pigment Yellow 24) are preferred.

As the black pigment, inorganic pigments (preferred examples thereof include carbon black and magnetite) and aniline black are preferred.

Other than these, an orange pigment (for example, C.I. Pigment Orange 13 and 16) and a green pigment (for example, C.I. Pigment Green 7) may be used.

The ink for use in the ink set of the present invention is described below except for the above-described coloring agent such as dye and pigment.

The surfactant which can be contained in the ink for use in the ink set of the present invention is described below.

In the present invention, a surfactant may be incorporated into the ink to control the liquid properties of ink, whereby excellent effects can be provided, such as enhancement of ejection stability of the ink, improvement of water resistance of the image and prevention of bleeding of the printed ink.

Examples of the surfactant include anionic surfactants such as sodium dodecylsulfate, sodium dodecyloxysulfonate and sodium alkylbenzenesulfonate, cationic surfactants such as cetylpyridinium chloride, trimethylcetylammonium chloride and tetrabutylammonium chloride, and nonionic surfactants such as polyoxyethylene nonylphenyl ether, polyoxyethylene naphthyl ether and polyoxyethylene octylphenyl ether. Among these, nonionic surfactants are preferred.

The surfactant content is from 0.001 to 15 wt %, preferably from 0.005 to 10 wt %, more preferably from 0.01 to 5 wt %, based on the ink.

The ink for use in the ink set of the present invention can be prepared by dissolving and/or dispersing the above-described dye and surfactant in an aqueous medium. The term "aqueous medium" as used in the present invention means water or a mixture of water and a slight amount of water-miscible organic solvent, where additives such as wetting agent, stabilizer and antiseptic are added, if desired.

In preparing the ink solution for use in the present invention, in the case of a water-soluble ink, the dye is preferably first dissolved in water and thereafter, various solvents and additives are added, dissolved and mixed to provide a uniform ink solution.

For dissolving the dye and the like, various methods such as stirring, ultrasonic irradiation and shaking can be used. Among these, stirring is preferred. In performing the stirring, various systems known in this field can be used, such as flow stirring and stirring utilizing the shearing force by means of a reversal agitator or a dissolver. Also, a stirring method utilizing the shearing force with the bottom surface of a container, such as magnetic stirrer, can be advantageously used.

Examples of the water-miscible organic solvent which can be used in the present invention include alcohols (e.g., methanol, ethanol, propanol, isopropanol, butanol, isobutanol, sec-butanol, tert-butanol, pentanol, hexanol, cyclohexanol, benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethyl-propylenediamine) and other polar solvents (e.g., formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone). These water-miscible organic solvents can be used in combination of two or more thereof.

In the case where the above-described dye is an oil-soluble dye, the ink solution can be prepared by dissolving the oil-soluble dye in a high boiling point organic solvent and emulsion-dispersing it in an aqueous medium.

The high boiling point organic solvent for use in the present invention has a boiling point of 150° C. or more, preferably 170° C. or more.

Examples thereof include phthalic acid esters (e.g., dibutyl phthalate, dioctyl phthalate, dicyclohexyl phthalate, di-2-ethylhexyl phthalate, decyl phthalate, bis(2,4-di-tert-amylphenyl) isophthalate, bis(1,1-diethylpropyl) phthalate), esters of phosphoric acid or phosphone (e.g., diphenyl phosphate, triphenyl phosphate, tricresyl phosphate, 2-ethylhexyldiphenyl phosphate, dioctylbutyl phosphate, tricyclohexyl phosphate, tri-2-ethylhexyl phosphate, tridodecyl phosphate, di-2-ethylhexylphenyl phosphate), benzoic acid esters (e.g., 2-ethylhexyl benzoate, 2,4-dichlorobenzoate, dodecyl benzoate, 2-ethylhexyl-p-hydroxybenzoate), amides (e.g., N,N-diethyldodecanamide, N,N-diethyllaurylamide), alcohols or phenols (e.g., isostearyl alcohol, 2,4-di-tert-amylphenol), aliphatic esters (e.g., dibutoxyethyl succinate, di-2-ethylhexyl succinate, 2-hexyldecyl tetradecanoate, tributyl citrate, diethyl azelate, isostearyl lactate, trioctyl citrate), aniline derivatives (e.g., N,N-dibutyl-2-butoxy-5-tert-octylaniline), chlorinated paraffins (e.g., paraffins having a chlorine content of 10 to 80%), trimesic acid esters (e.g., tributyl trimesate), dodecylbenzene, diisopropylnaphthalene, phenols (e.g., 2,4-di-tert-amylphenol, 4-dodecyloxyphenol, 4-dodecyloxycarbonylphenol, 4-(4-dodecyloxyphenylsulfonyl)phenol), carboxylic acids (e.g., 2-(2,4-di-tert-amylphenoxy)butyric acid, 2-ethoxyoctanedecanoic acid) and alkylphosphoric acids (e.g., di-(2-ethylhexyl)phosphoric acid, diphenylphosphoric acid). The high boiling point organic solvent can be used in an amount of, in terms of the mass ratio to the oil-soluble dye, from 0.01 to 3 times, preferably from 0.01 to 1.0 times. When a high boiling solvent is present, the dye and other nonvolatile components are less precipitated at the dispersion in the ink, as a result, the stability of ink is improved and good ejection stability is attained.

These high boiling point organic solvents may be used individually or as a mixture of several kinds [for example, tricresyl phosphate and dibutyl phthalate, trioctyl phosphate and di(2-ethylhexyl) sebacate, or dibutyl phthalate and poly (N-tert-butylacrylamide)].

Examples of the high boiling point organic solvent for use in the present invention, other than the above-described compounds, and/or the synthesis method of these high boiling point organic solvents are described, for example, in U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321 and 5,013,639, EP-A-276319, EP-A-286253, EP-A-289820, EP-A-309158, EP-A-309159, EP-A-309160, EP-A-509311, EP-A-510576, East German Patents 147009, 157147, 159573 and 225240A, British Patent 2091124A, JP-A-48-47335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-102454, JP-A-2-792, JP-A-2-4239, JP-A-2-43541, JP-A-4-29237, JP-A-4-30165, JP-A-4-232946 and JP-A-4-346338.

The high boiling point organic solvent is used in an amount of, in terms of the mass ratio to the oil-soluble dye, from 0.01 to 3.0 times, preferably from 0.01 to 1.0 times.

In the present invention, the oil-soluble dye or high boiling point organic solvent is used by emulsion-dispersing it in an aqueous medium. Depending on the case, a low boiling point organic solvent may also be used at the emulsion-dispersion in view of emulsifiability. The low boiling point organic solvent is an organic solvent having a boiling point of about 30 to 150° C. at atmospheric pressure. Preferred examples thereof include esters (e.g., ethyl acetate, butyl acetate, ethyl propionate, β-ethoxyethyl acetate, methylcellosolve acetate), alcohols (e.g., isopropyl alcohol, n-butyl alcohol, secondary butyl alcohol), ketones (e.g., methyl isobutyl ketone, methyl ethyl ketone, cyclohexanone), amides (e.g., dimethylformamide, N-methylpyrrolidone) and ethers (e.g., tetrahydrofuran, dioxane), however, the present invention is not limited thereto.

In the emulsion-dispersion, an oil phase obtained by dissolving the dye in a high boiling organic solvent or depending on the case, in a mixed solvent of a high boiling organic solvent and a low boiling organic solvent is dispersed in an aqueous phase mainly comprising water to form fine oil droplets of the oil phase. At this time, in either one or both of the aqueous phase and the oil phase, additives described later, such as surfactant, wetting agent, dye stabilizer, emulsification stabilizer, antiseptic and fungicide, can be added, if desired.

In the general emulsification method, an oil phase is added to an aqueous phase, however, a so-called phase inversion emulsification method of adding dropwise an aqueous phase in an oil phase can also be preferably used. The above-described emulsification method can be applied; also when the azo dye used in the present invention is water-soluble and the additives are oil-soluble.

In performing the emulsion-dispersion, various surfactants can be used. Preferred examples thereof include anionic surfactants such as fatty acid salt, alkylsulfuric ester salt, alkylbenzenesulfonate, alkylnaphthalenesulfonate, dialkylsulfosuccinate, alkylphosphoric ester salt, naphthalenesulfonic acid formalin condensate and polyoxyethylene alkylsulfuric ester salt, and nonionic surfactants such as polyoxyethylene alkyl ether, polyoxyethylene alkylallyl ether, polyoxyethylene fatty acid ester, sorbitan fatty acid ester, polyoxyethylene sorbitan fatty acid ester, polyoxyethylene alkylamine, glycerin fatty acid ester and oxyethylene oxypropylene block copolymer. Also, SURFYNOLS (produced by Air Products & Chemicals), which are an acetylene-base polyoxyethylene oxide surfactant, are preferably used. Furthermore, amine oxide-type amphoteric surfactants such as N,N-dimethyl-N-alkylamine oxide are preferred. In addition, surfactants described in JP-A-59-157636 (pages (37) to (38)) and *Research Disclosure*, No. 308119 (1989) can also be used.

For the purpose of stabilizing the dispersion immediately after the emulsification, a water-soluble polymer may be added in combination with the surfactant. Preferred examples of the water-soluble polymer include polyvinyl alcohol, polyvinylpyrrolidone, polyethylene oxide, polyacrylic acid, polyacrylamide and copolymers thereof. Other than these, natural water-soluble polymers such as polysaccharides, casein and gelatin are also preferably used. Furthermore, for the stabilization of the dye dispersion, a polymer which does not substantially dissolve in an aqueous medium, such as polyvinyl, polyurethane, polyester, polyamide, polyurea and polycarbonate obtained by the polymerization of acrylic acid esters, methacrylic acid esters, vinyl esters, acrylamides, methacrylamides, olefins, styrenes, vinyl ethers or acrylonitriles, can also be used in combination. This polymer preferably contains —$SO_3^-$ or —COO—. In the case of using this polymer which does not substantially dissolve in an aqueous medium, the polymer is preferably used in an amount of 20 wt % or less, more preferably 10 wt % or less, based on the high boiling point organic solvent.

In preparing an aqueous ink composition by dispersing the oil-soluble dye or high boiling point organic solvent according to emulsion-dispersion, control of the particle size is important. In order to elevate the color purity or density of an image formed by the inkjet recording, it is essential to reduce the average particle size. The average particle size is, in terms of the volume average particle size, preferably 1 μm or less, more preferably from 5 to 100 nm.

The volume average particle size and particle size distribution of the dispersed particles can be easily measured by a known method such as static light scattering method, dynamic light scattering method, centrifugal precipitation method and the method described in *Jikken Kagaku Koza* (*Lecture of Experimental Chemistry*), 4th ed., pp. 417-418. For example, the ink is diluted with distilled water to have a particle concentration of 0.1 to 1 wt %, then, the particle size can be easily measured by a commercially available volume average particle size measuring apparatus (for example, Microtrac UPA, manufactured by Nikkiso K.K.). The dynamic light scattering method utilizing the laser Doppler effect is particularly preferred because even a small particle size can be measured.

The volume average particle size is an average particle size weighted with the particle volume and is obtained by multiplying the diameter of individual particles in the gathering of particles with the volume of the particle and dividing the sum total of the obtained values by the total volume of the particles. The volume average particle size is described in Soichi Muroi, *Kobunshi Latex no Kagaku* (*Chemistry of Polymer Latex*), page 119, Kobunshi Kanko Kai.

Also, it is revealed that the presence of coarse particles greatly affects the printing performance. More specifically, the coarse particle clogs the nozzle of head or even if the nozzle is not clogged, forms a soil to bring about failure or slippage in the ejection of ink and this seriously affects the printing performance. In order to prevent these troubles, it is important to reduce the number of particles having a particle size of 5 μm or more to 10 or less and the number of particles having a particle size of 1 μm or more to 1,000 or less, in 1 μl of ink prepared.

For removing these coarse particles, a known method such as centrifugal separation or microfiltration can be used. This separation step may be performed immediately after the emulsion-dispersion or may be performed immediately before filling the ink in an ink cartridge after various additives such as wetting agent and surfactant are added to the emulsified dispersion.

A mechanically emulsifying apparatus is effective for reducing the average particle size and eliminating coarse particles.

As for the emulsifying apparatus, known apparatuses such as simple stirrer, impeller stirring system, in-line stirring system, mill system (e.g., colloid mill) and ultrasonic system can be used, however, a high-pressure homogenizer is particularly preferred.

The mechanism of the high-pressure homogenizer is described in detail in U.S. Pat. No. 4,533,254 and JP-A-6-47264. Examples of the commercially available apparatus include Gaulin Homogenizer (manufactured by A. P. V Gaulin Inc.), Microfluidizer (manufactured by Microfluidex Inc.) and Altimizer (produced by Sugino Machine).

The high-pressure homogenizer with a mechanism of pulverizing particles in an ultrahigh pressure jet stream recently described in U.S. Pat. No. 5,720,551 is particularly effective for the emulsion-dispersion of the present invention. Examples of the emulsifying apparatus using this ultrahigh pressure jet stream include DeBEE2000 (manufactured by BEE International Ltd.).

In performing the emulsification by a high-pressure emulsion-dispersing apparatus, the pressure is 50 MPa or more, preferably 60 MPa or more, more preferably 180 MPa or more.

A method of using two or more emulsifying apparatuses, for example, by performing the emulsification in a stirring emulsifier and then passing the emulsified product through a high-pressure homogenizer is particularly preferred. Also, a method of once performing the emulsion-dispersion by such an emulsifying apparatus and after adding additives such as wetting agent and surfactant, again passing the dispersion through a high-pressure homogenizer during the time of filling the ink into a cartridge is preferred.

In the case of containing a low boiling point organic solvent in addition to the high boiling point organic solvent, the low boiling point solvent is preferably removed in view of stability of the emulsified product, safety and hygiene. For removing the low boiling point solvent, various known methods can be used according to the kind of the solvent. Examples of the method include evaporation, vacuum evaporation and ultrafiltration. This removal of the low boiling point organic solvent is preferably performed as soon as possible immediately after the emulsification.

The preparation method of the inkjet ink is described in detail in JP-A-5-148436, JP-A-5-295312, JP-A-7-97541, JP-A-7-82515 and JP-A-7-118584 and the methods described in these patent publications can be utilized also in the preparation of ink for use in the inkjet ink set of the present invention.

In the inkjet recording ink for use in the ink set of the present invention, additives such as drying inhibitor for preventing clogging due to drying of ink at the ejection port, permeation accelerator for attaining more successful permeation of ink into paper, ultraviolet absorbent, antioxidant, viscosity adjusting agent, surface tension adjusting agent, dispersant, dispersion stabilizer, fungicide, rust inhibitor, pH adjusting agent, defoaming agent and chelating agent, can be appropriately selected and used in an appropriate amount.

The drying inhibitor is preferably a water-soluble organic solvent having a vapor pressure lower than water. Specific examples thereof include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivative, glycerin and trimethylolpropane; lower alkyl ethers of polyhydric alcohol, such as ethylene glycol monomethyl(or ethyl) ether, diethylene glycol monomethyl(or ethyl) ether and triethylene glycol monoethyl(or butyl) ether; heterocyclic rings such as 2-pyrrolidone, N-methyl-2-pyrrolidone, 1,3-dimethyl-2-imidazolidinone and N-ethylmorpholine; sulfur-containing compounds such as sulfolane, dimethylsulfoxide and 3-sulfolene; polyfunctional compounds such as diacetone alcohol and diethanolamine; and urea derivatives. Among these, polyhydric alcohols such as glycerin and diethylene glycol are preferred. These drying inhibitors may be used individually or in combination of two or more thereof. The drying inhibitor is preferably contained in an amount of 10 to 50 wt % in the ink.

Examples of the permeation accelerator which can be used include alcohols such as ethanol, isopropanol, butanol, di(tri)ethylene glycol monobutyl ether and 1,2-hexanediol, sodium laurylsulfate, sodium oleate and nonionic surfactants. A sufficiently high effect can be obtained by adding from 10 to 30 wt % of the permeation accelerator to the ink. The permeation accelerator is preferably used in an amount of causing no blurring of printed letter or no print through.

Examples of the ultraviolet absorbent which can be used for improving the preservability of image obtained by using the ink for the ink set of the present invention include benzotriazole-base compounds described in JP-A-58-185677, JP-A-61-190537, JP-A-2-782, JP-A-5-197075 and JP-A-9-34057, benzophenone-base compounds described in JP-A-46-2784, JP-A-5-194483 and U.S. Pat. No. 3,214,463, cinnamic acid-base compounds described in JP-B-48-30492 (the term "JP-B" as used herein means an "examined Japanese patent publication"), JP-B-56-21141 and JP-A-10-88106, triazine-base compounds described in JP-A-4-298503, JP-A-8-53427, JP-A-8-239368, JP-A-10-182621 and JP-T-8-501291 (the term "JP-T" as used herein means a "published Japanese translation of a PCT patent application"), compounds described in *Research Disclosure* No. 24239, and compounds of absorbing ultraviolet light and emitting fluorescent light, so-called fluorescent brightening agents, represented by stilbene-base compounds and benzoxazole-base compounds.

As the antioxidant which can be used for improving the preservability of image, various organic or metal complex-base fading inhibitors can be used. Examples of the organic fading inhibitor include hydroquinones, alkoxyphenols, dialkoxyphenols, phenols, anilines, amines, indanes, chromans, alkoxyanilines and heterocyclic rings. Examples of the metal complex include nickel complex and zinc complex. More specifically, compounds described in patents cited in *Research Disclosure*, Nos. 17643 (Items VII-I to VII-J), 15162, 18716 (page 650, left column), 36544 (page 527), 307105 (page 872) and 15162, and compounds included in formulae of representative compounds and in exemplary compounds described in JP-A-62-215272 (pages 127 to 137) can be used.

Examples of the fungicide for use in the ink include sodium dehydroacetate, sodium benzoate, sodium pyridinethione-1-oxide, ethyl p-hydroxybenzoate, 1,2-benzisothiazolin-3-one and salts thereof. The fungicide is preferably used in an amount of 0.02 to 5.00 wt % in the ink.

The fungicide is described in detail in *Bokin Bobai Zai Jiten* (*Dictionary of Microbicide and Fungicide*), compiled by Nippon Bokin Bobai Gakkai Jiten Henshu Iinkai.

Examples of the rust inhibitor include acidic sulfite, sodium thiosulfate, ammon thioglycolate, diisopropylammonium nitrite, pentaerythritol tetranitrate, dicyclohexylammonium nitrite and benzotriazole. The rust inhibitor is preferably used in an amount of 0.02 to 5.00 wt % in the ink.

The pH adjusting agent added to the ink for the ink set of the present invention can be suitably used for adjusting the pH and imparting dispersion stability. The pH of the ink is preferably adjusted to 4 to 11 at 25° C. If the pH is less than 4, the solubility of dye decreases to readily cause clogging of a nozzle, whereas if it exceeds 11, the water resistance is liable to deteriorate. Examples of the pH adjusting agent include basic compounds such as organic base and inorganic alkali, and acidic compounds such as organic acid and inorganic acid.

As the basic compound, inorganic compounds such as sodium hydroxide, potassium hydroxide, sodium carbonate, potassium carbonate, sodium hydrogencarbonate, potassium hydrogencarbonate, sodium acetate, potassium acetate, sodium phosphate and sodium monohydrogenphosphate, and organic bases such as aqueous ammonia, methylamine, ethylamine, diethylamine, triethylamine, ethanolamine, diethanolamine, triethanolamine, ethylenediamine, piperidine, diazabicyclooctane, diazabicycloundecene, pyridine, quinoline, picoline, lutidine and collidine, can also be used.

As the acidic compound, inorganic compounds such as hydrochloric acid, sulfuric acid, phosphoric acid, boric acid, sodium hydrogensulfate, potassium hydrogensulfate, potassium dihydrogenphosphate and sodium dihydrogenphosphate, and organic compounds such as acetic acid, tartaric acid, benzoic acid, trifluoroacetic acid, methanesulfonic acid, ethanesulfonic acid, benzenesulfonic acid, p-toluenesulfonic acid, saccharinic acid, phthalic acid, picolinic acid and quinolinic acid, can also be used.

Each constituent ink of the ink set preferably has a conductivity of 0.01 to 10 S/m, more preferably from 0.05 to 5 S/m.

The conductivity can be measured by an electrode method using a commercially available saturated potassium chloride.

The conductivity can be controlled mainly by the ion concentration in an aqueous solution. In the case where the salt concentration is high, desalting can be performed by using ultrafiltration membrane or the like. Also, in the case of controlling the conductivity by adding a salt or the like, the conductivity can be controlled by adding various organic or inorganic salts.

Examples of the inorganic salt which can be used include inorganic compounds such as potassium halide, sodium halide, sodium sulfate, potassium sulfate, sodium hydrogensulfate, potassium hydrogensulfate, sodium nitrate, potassium nitrate, sodium hydrogencarbonate, potassium hydrogencarbonate, sodium phosphate, sodium monohydrogenphosphate, boric acid, potassium dihydrogenphosphate and sodium dihydrogenphosphate. Also, organic compounds such as sodium acetate, potassium acetate, potassium tartrate, sodium tartrate, sodium benzoate, potassium benzoate, sodium p-toluenesulfonate, potassium saccharinate, potassium phthalate and sodium picolinate can be used.

The conductivity can also be controlled by selecting the components of the aqueous medium which is described later.

The ink of the present invention preferably has a viscosity at 25° C. of 1 to 20 mPa·s, more preferably from 2 to 15 mPa·s, still more preferably from 2 to 10 mPa·s. If the viscosity exceeds 30 mPa·s, the fixing rate of the recorded image decreases and the ejection performance also decreases, whereas if it is less than 1 mPa·s, the recorded image is blurred to decrease the grade.

The viscosity can be freely adjusted by the amount of the ink solvent added. Examples of the ink solvent include glycerin, diethylene glycol, triethanolamine, 2-pyrrolidone, diethylene glycol monobutyl ether and triethylene glycol monobutyl ether.

A viscosity adjusting agent may also be used. Examples of the viscosity adjusting agent include water-soluble polymers such as celluloses and polyvinyl alcohol, and nonionic surfactants. The viscosity adjusting agent is described in detail in *Nendo Chosei Gijutsu* (*Viscosity Adjusting Technology*), Chap. 9, Gijutsu Joho Kyokai (1999), and *Inkjet Printer Yo Chemicals* (98 *Zoho*)—*Zairyo no Kaihatsu Doko-.Tenbo Chosa-* (*Chemicals for Inkjet Printer (Enlarged Edition of* 98)—*Survey on Tendency. Prospect of Development of Materials-*), pp. 162-174, CMC (1997).

The method for measuring the viscosity of liquid is described in detail in JIS Z8803 but the viscosity can be simply and easily measured by a commercially available viscometer and examples of the rotational viscometer include B-type viscometer and E-type viscometer manufactured by Tokyo Keiki Co. In the present invention, the viscosity is measured at 25° C. by using a vibrating viscometer Model VM-100A-L manufactured by Yamaichi Denki. The unit of viscosity is pascal second (Pa·s) but usually, milli-pascal second (mPa·s) is used.

The surface tension of the ink for use in the present invention is, irrespective of dynamic surface tension or static surface tension, preferably from 20 to 50 mN/m, more preferably from 20 to 40 mN/m, at 25° C. If the surface tension exceeds 50 mN/m, ejection stability and printing quality are seriously deteriorated, for example, bleeding at color mixing or feathering is caused, whereas if the surface tension of the ink is less than 20 mN/m, printing failure may occur due to, for example, attachment of ink to the hard surface at the ejection.

For the purpose of adjusting the surface tension, a cationic, anionic or nonionic surfactant of various types can be added. The surfactant is preferably used in the range from 0.01 to 20 wt %, more preferably from 0.1 to 10 wt %, based on the inkjet ink. The surfactants can be used in combination of two or more thereof.

As the method for measuring the static surface tension, a capillary elevation method, a dropping method, a suspended ring method and the like are known. In the present invention, a vertical plate method is used as the method for measuring the static surface tension.

When a glass or platinum thin plate is vertically suspended while dipping a part of the plate in a liquid, a surface tension of the liquid acts downward along the length of contact between the liquid and the plate. This force is balanced by an upward force and thereby, the surface tension can be measured.

As the method for measuring the dynamic surface tension, a vibrating jet method, a meniscus dropping method, a maximum bubble pressure method and the like are known and these are described, for example, in *Shin Jikken Kagaku Koza, Kaimen to Colloid* (*New Lecture of Experimental Chemistry, Interface and Colloid*), Vol. 18, pp. 69-90, Maruzen (1977). Furthermore, a liquid film rupturing method described in JP-A-3-2064 is known. In the present invention, a differential bubble pressure method is used as the method for measuring the dynamic surface tension. The principle and method of this measurement are described below.

When a bubble is generated in a solution rendered uniform by stirring, a gas-liquid interface is newly produced and surfactant molecules in the solution gather to the water surface at a constant speed. When the bubble rate (bubble generation rate) is changed, as the generation rate decreases, a larger number of surfactant molecules gather to the bubble surface. Therefore, the maximum bubble pressure immediately before the bubble bursts becomes small and the maximum bubble pressure (surface tension) for the bubble rate can be detected. The dynamic surface tension is preferably measured by a method of generating a bubble in a solution by using large and small two probes, measuring the differential pressure between two probes in the maximum bubble pressure state, and calculating the dynamic surface tension.

In view of ejection stability of ink, quality of printed image, various fastnesses of image and reduction in blurring of image after printing or in stickiness on the printed surface, the content of the nonvolatile component in the ink for use in the present invention is preferably from 10 to 70 wt % based on the entire amount of the ink. In view of ejection stability of ink and reduction in blurring of image after printing, the content of the nonvolatile component is more preferably from 20 to 60 wt %.

The nonvolatile component as used herein means a liquid or solid component having a boiling point of 150° C. or more at 1 atm or a high molecular weight component. The nonvolatile component in the inkjet ink includes a dye and a high boiling point solvent and also includes a polymer latex, a surfactant, a dye stabilizer, a fungicide and a buffering agent which are added, if desired. Many of these nonvolatile components except for the dye stabilizer reduce the dispersion stability of ink and even after printing, remain on the inkjet image-receiving paper to inhibit the aggregation and in turn stabilization of dye on the image-receiving paper and worsen various fastnesses of the image area or blurring of the image under high humidity condition.

In the present invention, a high molecular weight compound may also be contained. The high molecular weight compound as used herein indicates all polymer compounds having a number average molecular weight of 5,000 or more contained in the ink. Examples of the polymer compound include a water-soluble polymer compound which substantially dissolves in an aqueous medium, a water-dispersible polymer compound such as polymer latex and polymer emulsion, and an alcohol-soluble polymer compound which dissolves in a polyhydric alcohol used as an auxiliary solvent, however, the high molecular weight compound as used in the present invention includes any polymer compound if it substantially dissolves or disperses uniformly in the ink solution.

Specific examples of the water-soluble polymer compound include water-soluble polymers such as polyvinyl alcohol, silanol-modified polyvinyl alcohol, carboxymethyl cellulose, hydroxyethyl cellulose, polyvinylpyrrolidone, polyalkylene oxide (e.g., polyethylene oxide, polypropylene oxide) and polyalkylene oxide derivatives; natural water-soluble polymers such as polysaccharides, starch, cationized starch, casein and gelatin; aqueous acrylic resins such as polyacrylic acid, polyacrylamide and copolymers thereof; aqueous alkyd resin; and water-soluble polymer compounds having a $—SO_3^-$ or $—COO^-$ group within the molecule and substantially dissolvable in an aqueous medium.

Specific examples of the polymer latex include a styrene-butadiene latex, a styrene-acryl latex and a polyurethane latex, and specific examples of the polymer emulsion include an acryl emulsion.

These water-soluble polymer compounds can be used individually or in combination of two or more thereof.

As described above, the water-soluble polymer compound is used as the viscosity adjusting agent so as to adjust the viscosity of ink to a viscosity region of giving good ejection property, however, if the amount of the water-soluble polymer compound added is large, the viscosity of ink increases to reduce the ejection stability of ink solution and after aging of ink, the nozzle is readily clogged by the precipitate.

The amount added of the polymer compound as the viscosity adjusting agent varies depending on the molecular weight of the compound added (as the molecular weight is higher, the amount added can be smaller), but the amount added is from 0 to 5 wt %, preferably from 0 to 3 wt %, more preferably from 0 to 1 wt %, based on the entire amount of ink.

In the present invention, apart from the above-described surfactants, a nonionic, cationic or anionic surfactant is used as the surface tension adjusting agent. Examples of the anionic surfactant include a fatty acid salt, an alkylsulfuric ester salt, an alkylbenzenesulfonate, an alkylnaphthalenesulfonate, a dialkylsulfosuccinate, an alkylphosphoric ester salt, a naphthalenesulfonic acid formalin condensate and a polyoxyethylenealkylsulfuric ester salt. Examples of the nonionic surfactant include a polyoxyethylene alkyl ether, a polyoxyethylene alkylallyl ether, a polyoxyethylene fatty acid ester, a sorbitan fatty acid ester, a polyoxyethylene sorbitan fatty acid ester, a polyoxyethylene alkylamine, a glycerin fatty acid ester and an oxyethylene oxypropylene block copolymer. Also, SURFYNOLS (produced by Air Products & Chemicals), which are an acetylene-base polyoxyethylene oxide surfactant, are preferably used. Furthermore, amine oxide-type amphoteric surfactants such as N,N-dimethyl-N-alkylamine oxide are preferred. In addition, surfactants described in JP-A-59-157636 (pages (37) to (38)) and *Research Disclosure*, No. 308119 (1989) can be used.

The surface tension of the ink of the present invention is, with or without use of such a surfactant, preferably from 20 to 60 mN/m, more preferably from 25 to 45 mN/m.

In the present invention, if desired, various cationic, anionic or nonionic surfactants described above may be used as a dispersant or a dispersion stabilizer, and fluorine- or silicone-base compounds or chelating agents represented by EDTA may be used as a defoaming agent.

The recording paper and recording film used in the inkjet recording to which the present invention is applied are described below. The support which can be used for the recording paper or film is produced, for example, from a chemical pulp such as LBKP and NBKP, a mechanical pulp such as GP, PGW, RMP, TMP, CTMP, CMP and CGP, or a waste paper pulp such as DIP, by mixing, if desired, conventionally known additives such as pigment, binder, sizing agent, fixing agent, cation agent and paper strength increasing agent, and then sheeting the mixture by using various devices such as Fourdrinier paper machine and cylinder paper machine. Other than these supports, synthetic paper or plastic film may be used. The thickness of the support is preferably from 10 to 250 μm and the basis weight is preferably from 10 to 250 g/m².

An image-receiving layer and a backcoat layer may be provided on the support as it is to produce an image-receiving material for the ink of the present invention, or after providing a size press or anchor coat layer by using starch, polyvinyl alcohol or the like, an image-receiving layer and a backcoat layer may be provided to produce an image-receiving material. The support may be further subjected to a flattening treatment by a calendering device such as machine calender, TG calender and soft calender.

The support is preferably paper or plastic film of which both surfaces are laminated with polyolefin (for example, polyethylene, polystyrene, polybutene or a copolymer thereof) or polyethylene terephthalate. In the polyolefin, a white pigment (for example, titanium oxide or zinc oxide) or a tinting dye (for example, cobalt blue, ultramarine or neodymium oxide) is preferably added.

The image-receiving layer provided on the support contains a porous material and an aqueous binder. Also, the image-receiving layer preferably contains a pigment and the pigment is preferably a white pigment. Examples of the white pigment include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate, and organic pigments such as styrene-base pigment, acryl-base pigment, urea resin and melamine resin. Among these, porous inorganic white pigments are preferred, and synthetic amorphous silica and the like having a large pore area are more preferred. The synthetic amorphous silica may be either a silicic acid anhydride obtained by a dry production method (gas phase method) or a silicic acid hydrate obtained by a wet production method.

Specific examples of the recording paper containing the pigment in the image-receiving layer include those disclosed in JP-A-10-81064, JP-A-10-119423, JP-A-10-157277, JP-A-10-217601, JP-A-11-348409, JP-A-2001-138621, JP-A-2000-43401, JP-A-2000-211235, JP-A-2000-309157, JP-A-2001-96897, JP-A-2001-138627, JP-A-11-91242, JP-A-8-2087, JP-A-8-2090, JP-A-8-2091, JP-A-8-2093, JP-A-8-174992, JP-A-11-192777 and JP-A-2001-301314.

Examples of the aqueous binder contained in the image-receiving layer include water-soluble polymers such as polyvinyl alcohol, silanol-modified polyvinyl alcohol, starch, cationized starch, casein, gelatin, carboxymethyl cellulose, hydroxyethyl cellulose, polyvinylpyrrolidone, polyalkylene oxide and polyalkylene oxide derivatives, and water-dispersible polymers such as styrene butadiene latex and acryl emulsion. These aqueous binders can be used individually or in combination of two or more thereof. Among these, polyvinyl alcohol and silanol-modified polyvinyl alcohol are preferred in the present invention in view of adhesion to the pigment and peeling resistance of the ink-receiving layer.

The image-receiving layer may contain a mordant, a water-proofing agent, a light. fastness enhancer, a gas resistance enhancer, a surfactant, a hardening agent and other additives in addition to the pigment and the aqueous binder.

The mordant added to the image-receiving layer is preferably immobilized and for this purpose, a polymer mordant is preferably used.

The polymer mordant is described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236 and U.S. Pat. Nos. 2,484,430, 2,548,564, 3,148,061, 3,309,690, 4,115,124, 4,124,386, 4,193,800, 4,273,853, 4,282,305 and 4,450,224. An image-receiving material containing the polymer mordant described in JP-A-1-161236 (pages 212 to 215) is particularly preferred. When the polymer mordant described in this patent publication is used, an image having excellent image quality can be obtained and at the same time, the light fastness of the image is improved.

The water-proofing agent is effective for obtaining a water-resistant image. The water-proofing agent is preferably a cationic resin. Examples of the cationic resin include polyamidopolyamine epichlorohydrin, polyethyleneimine, polyaminesulfone, poly-dimethyldiallylammonium chloride and cation polyacrylamide. The content of the cationic resin is preferably from 1 to 15 wt %, more preferably from 3 to 10 wt %, based on the entire solid content of the ink-receiving layer.

Examples of the light fastness enhancer and the gas resistance enhancer include phenol compounds, hindered phenol compounds, thioether compounds, thiourea compounds, thiocyanic acid compounds, amine compounds, hindered amine compounds, TEMPO compounds, hydrazine compounds, hydrazide compounds, amidine compounds, vinyl group-containing compounds, ester compounds, amide compounds, ether compounds, alcohol compounds, sulfinic acid compounds, saccharides, water-soluble reducing compounds, organic acids, inorganic acids, hydroxy group-containing organic acids, benzotriazole compounds, benzophenone compounds, triazine compounds, heterocyclic compounds, water-soluble metal salts, organic metal compounds and metal complexes.

Specific examples of these compounds include those described in JP-A-10-182621, JP-A-2001-260519, JP-A-2000-260519, JP-B-4-34953, JP-B-4-34513, JP-B-4-34512, JP-A-11-170686, JP-A-60-67190, JP-A-7-276808, JP-A-2000-94829, JP-T-8-512258 and JP-A-11-321090.

The surfactant functions as a coating aid, a releasability improver, a slipperiness improver or an antistatic agent. The surfactant is described in JP-A-62-173463 and JP-A-62-183457.

In place of the surfactant, an organic fluoro compound may be used. The organic fluoro compound is preferably hydrophobic. Examples of the organic fluoro compound include fluorine-containing surfactants, oily fluorine-base compounds (for example, fluorine oil) and solid fluorine compound resins (for example, ethylene tetrafluoride resin). The organic fluoro compound is described in JP-B-57-9053 (columns 8 to 17), JP-A-61-20994 and JP-A-62-135826.

As the hardening agent, for example, the materials described in JP-A-1-161236 (page 222), JP-A-9-263036, JP-A-10-119423 and JP-A-2001-310547 can be used.

Other examples of the additive added to the image-receiving layer include a pigment dispersant, a thickener, a defoaming agent, a dye, a fluorescent brightening agent, an antiseptic, a pH adjusting agent, a matting agent and a hardening agent. The ink-receiving layer may be composed of one layer or two layers.

In the recording paper or film, a backcoat layer may also be provided. Examples of the component which can be added to this layer include a white pigment, an aqueous binder and other components.

Examples of the white pigment contained in the backcoat layer include inorganic white pigments such as precipitated calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrolyzed halloysite, magnesium carbonate and magnesium hydroxide, and organic pigments such as styrene-base plastic pigment, acryl-base plastic pigment, polyethylene, microcapsule, urea resin and melamine resin.

Examples of the aqueous binder contained in the backcoat layer include water-soluble polymers such as styrene/maleate copolymer, styrene/acrylate copolymer, polyvinyl alcohol, silanol-modified polyvinyl alcohol, starch, cationized starch, casein, gelatin, carboxymethyl cellulose, hydroxyethyl cellulose and polyvinylpyrrolidone, and water-dispersible polymers such as styrene butadiene latex and acryl emulsion. Other examples of the component contained in the backcoat layer include a defoaming agent, a foam inhibitor, a dye, a fluorescent brightening agent, an antiseptic and a water-proofing agent.

In a constituent layer (including the back layer) of the inkjet recording paper or film, a polymer fine particle dispersion may be added. The polymer fine particle dispersion is used for the purpose of improving film properties, for example, stabilizing dimension and preventing curling, adhesion or film cracking. The polymer fine particle dispersion is described in JP-A-62-245258, JP-A-62-1316648 and JP-A-62-110066. When a polymer fine particle dispersion having a low glass transition temperature (40° C. or less) is added to a layer containing a mordant, the layer can be prevented from cracking or curling. The curling can be prevented also by adding a polymer fine particle dispersion having a high glass transition temperature to the back layer.

The ink set of the present invention is not limited in the inkjet recording system to which the ink set is applied, and can be used for a known system, for example, an electric charge controlling system of jetting out the ink by utilizing the electrostatic induction force, a drop-on-demand system (pressure pulse system) utilizing an oscillation pressure of a piezoelectric element, an acoustic inkjet system of converting electric signals into acoustic beams, irradiating the beams on the ink and jetting out the ink by utilizing the radiation pressure, and a thermal inkjet (bubble jet) system of heating the ink to form a bubble and utilizing the generated pressure.

The inkjet recording system includes a system of ejecting a large number of small-volume ink droplets of a so-called photo ink having a low concentration, a system of improving the image quality by using a plurality of inks having substantially the same color hue but differing in the concentration, and a system using a colorless transparent ink.

The inkjet recording ink of the present invention can also be used for uses other than the inkjet recording, such as a material for display image, an image-forming material for interior decoration and an image-forming material for outdoor decoration.

Examples of the material for display image include various materials such as poster, wall paper, ornamental goods (e.g., ornament, doll), handbill for commercial advertisement, wrapping paper, wrapping material, paper bag, vinyl bag, package material, billboard, image drawn on or attached to the side face of traffic (e.g., automobile, bus, electric car), and clothing with a logo. In the case of using the dye of the present invention as a material for forming a display image, the image includes not only a strict image but also all patterns by a dye, which can be acknowledged by a human, such as abstract design, letter and geometrical pattern.

Examples of the material for interior decoration include various materials such as wall paper, ornamental goods (e.g., ornament, doll), luminaire member, furniture member and design member of floor or ceiling. In the case of using the dye of the present invention as a material for forming an image, the image includes not only a strict image but also all patterns by a dye, which can be acknowledged by a human, such as abstract design, letter and geometrical pattern.

Examples of the material for outdoor decoration include various materials such as wall material, roofing material, billboard, gardening material, outdoor ornamental goods (e.g., ornament, doll) and outdoor luminaire member. In the case of using the dye of the present invention as a material for forming an image, the image includes not only a strict image but also all patterns by a dye, which can be acknowledged by a human, such as abstract design, letter and geometrical pattern.

In these uses, examples of the medium on which the pattern is formed include various materials such as paper, fiber, cloth (including non-woven fabric), plastic, metal and ceramic. Examples of the dyeing form include mordanting, printing and fixing of a dye in the form of a reactive dye having introduced thereinto a reactive group. Among these, preferred is dyeing by mordanting.

In the production of ink, sonic vibrations may be added, for example, in the step of dissolving additives such as dye.

The sonic vibration is added so as to prevent the ink from generation of bubbles due to a pressure applied in the recording head. More specifically, a sonic energy equal to or greater than the energy imposed in the recording head is previously applied in the process of producing the ink to eliminate the bubbles.

The sonic vibration is usually an ultrasonic wave having a frequency of 20 kHz or more, preferably 40 kHz or more, more preferably 50 kHz or more. The energy added to liquid by the sonic vibration is usually $2 \times 10^7$ J/m$^3$ or more, preferably $5 \times 10^7$ J/m$^3$ or more, more preferably $1 \times 10^8$ J/m$^3$ or more. The time period where the sonic vibration is applied is usually on the order from 10 minutes to one hour.

No matter when the step of adding sonic vibrations is performed, the effect can be attained as long as it is after the dye is charged into a medium. The effect is also provided even by adding sonic vibrations after the finished ink is once stored. However, the sonic vibration is preferably added at the time of dissolving and/or dispersing the dye in a medium, because the effect of removing bubbles is large and the dissolution and/or dispersion of dye in a medium is accelerated by the sonic vibration.

That is, the step of adding at least sonic vibrations can be performed during or after the step of dissolving and/or dispersing the dye in a medium. In other words, the step of adding at least sonic vibrations can be arbitrarily performed once or more after the preparation of ink until the ink is finished as a product.

As a practical mode, the step of dissolving and/or dispersing the dye in a medium preferably comprises a step of dissolving the dye in a partial medium out of the entire medium and a step of mixing the remaining medium. The sonic vibration is preferably added at least in either one of these steps, more preferably in the step of dissolving the dye in a partial medium out of the entire medium.

The step of mixing the remaining solvent may be a single step or a multiple step.

In producing the ink by the present invention, degassing under heating or reduced pressure is preferably used in combination, because the effect of eliminating bubbles in the ink is enhanced. The degassing step under heating or reduced pressure is preferably performed simultaneously with or after the step of mixing the remaining medium.

Examples of the sonic vibration-generating device for use in the step of adding sonic vibrations include known devices such as ultrasonic disperser.

In producing the ink of the present invention, the step of removing dusts as a solid content by filtration, which is performed after the preparation of ink solution, is important. This operation is performed by using a filtration filter and the filtration filter used here is a filter having an effective size of 1 μm or less, preferably from 0.05 to 0.3 μm, more preferably from 0.25 to 0.3 μm. As for the construction material of the filter, various materials can be used, however, in the case of an ink using a water-soluble dye, a filter produced for aqueous solvents is preferably used. In particular, a filter made of a polymer material, which less generates wastes, is preferred. The filtration may be performed by feeding and passing the solution through a filter and may be performed either under pressure or under reduced pressure.

After the filtration, air is often taken in into the solution. Bubbles ascribable to this air give rise to the disorder of image in the inkjet recording in many cases and therefore, the above-described bubble-eliminating step is preferably provided separately. For the elimination of bubbles, the solution after filtration may be allowed to stand or various methods such as ultrasonic defoaming or reduced-pressure defoaming using a commercially available device may be used. In the case of ultrasonic defoaming, the bubble-eliminating operation is preferably performed for 30 seconds to 2 hours, more preferably on the order from 5 minutes to one hour.

This operation is preferably performed in a space such as clean room or clean bench so as to prevent mingling of dusts at the operation. In the present invention, this operation is preferably performed in a space having a cleanness degree of class 1,000 or less. The "cleanness degree" as used herein indicates a value measured by a dust counter.

In the present invention, the hitting volume of ink on a recording material is from 0.1 to 100 pl, preferably from 0.5 to 50 pl, more preferably from 2 to 50 pl.

The present invention is not limited in the inkjet recording system and is used for a known system, for example, an electric charge controlling system of jetting out the ink by using the electrostatic induction force, a drop-on-demand system (pressure pulse system) utilizing an oscillation pressure of a piezoelectric element, an acoustic inkjet system of converting electric signals into acoustic beams, irradiating the beams on the ink and jetting out the ink by utilizing the radiation pressure, and a thermal inkjet (bubble jet) system of heating the ink to form a bubble and utilizing the generated pressure.

The inkjet recording system includes a system of ejecting a large number of small-volume ink droplets of a so-called photo ink having a low concentration, a system of improving the image quality by using a plurality of inks having substantially the same color hue but differing in the concentration, and a system using a colorless transparent ink. The hitting volume of ink is controlled mainly by the printer head.

For example, in the case of a thermal inkjet system, the hitting volume can be controlled by the structure of printer head. That is, the ink can be hit in a desired size by changing the ink chamber, heating section and nozzle size. Also, even in the thermal inkjet system, the ink can be hit in a plurality of sizes by providing a plurality of printer heads differing in the heating section or nozzle size.

In the case of a drop-on-demand system using a piezoelectric element, the hitting volume can be changed by the structure of printer head similarly to the thermal inkjet system, however, by controlling the waveform of driving signals for driving the piezoelectric element, the ink can be hit in a plurality of sizes with printer heads having the same structure and this is described later.

In the present invention, the ejection frequency on hitting the ink on a recording material is 1 KHz or more.

In order to record a high-quality image like a photograph, the hitting density must be 600 dpi (number of dots per inch) or more and with this hitting density, an image having high sharpness can be reproduced by a small ink droplet.

In hitting an ink by a head having a plurality of nozzles, the number of heads which can be driven at the same time is restricted, that is, from a few tens to about 200 in the case of a type where a recording paper and a head are moved in the directions orthogonal to each other, and a few hundreds even in the case of a type called line head where the head is fixed. This is because the driving electric power is limited or in order to avoid the effect of heat generated in the head on the image, a large number of head nozzles cannot be simultaneously driven.

By increasing the driving frequency, the recording speed can be increased.

The hitting frequency can be controlled, in the case of a thermal inkjet system, by controlling the frequency of head-driving signal for heating the head.

In the case of a piezoelectric system, the hitting frequency can be controlled by controlling the frequency of signal for driving the piezoelectric element.

The driving of piezoelectric head is described. The hitting size, hitting speed and hitting frequency are determined in a printer control section based on the signal of an image to be printed, and a signal for driving a printer head is prepared. The driving signal is supplied to the printer head. The hitting size, hitting speed and hitting frequency are controlled by the signal for driving the piezoelectric element. Here, the hitting size and hitting speed are determined by the shape and amplitude of the driving waveform, and the frequency is determined by the cycle period of signal.

When the hitting frequency is set to 10 KHz, the head is driven every 100 micro-seconds and one-line recording is completed in 400 micro-seconds. When the travelling speed of recording paper is set such that the recording paper moves 1/600 inch, namely, about 42 micron per 400 micro-seconds, the printing can be performed at a speed of one sheet per 1.2 seconds.

With respect to the constitution of printing apparatus or printer used in practicing the present invention, the mode disclosed, for example, in JP-A-11-170527 is suitably used. With respect to the ink cartridge, the mode disclosed, for example, in JP-A-5-229133 is suitably used. With respect to the suction and the constitution of cap or the like covering the printing head 28 at the suction, those disclosed, for example, in JP-A-7-276671 are suitably used. In the vicinity of head, a filter for eliminating bubbles, disclosed in JP-A-9-277552, is suitably provided.

Also, the surface of nozzle is suitably subjected to a water repellent treatment described in Japanese Patent Application No. 2001-016738. The present invention may be used for a printer connected to a computer or for an apparatus specialized for the printing of a photograph.

In the inkjet recording method of the present invention, the ink composition for inkjet recording is preferably hit on a recording material at an average hitting speed of 2 m/sec or more, more preferably 5 m/sec or more.

The hitting speed is controlled by controlling the shape and amplitude of the waveform for driving the head.

Furthermore, by using a plurality of driving waveforms and selecting appropriate waveforms, the ink composition can be hit in a plurality of sizes with the same printer head.

EXAMPLE

The present invention is described below by referring to Examples, however, the present invention is not limited thereto.

Ultrapure water (resistance: 18 MΩ or more) was added to the following components to make 1 liter and the resulting solutions each was stirred for 1 hour under heating at 30 to 40° C. and then filtered under reduced pressure through a microfilter having an average pore size of 0.25 μm. In this way, Ink Set 101 consisting of respective ink solutions of cyan (C), magenta (M), yellow (Y), light cyan (LC), light magenta (LM), dark yellow (DY) and black (Bk) was prepared.

TABLE 32

| (Constitution of Ink Set 101) | | | | | | | |
|---|---|---|---|---|---|---|---|
| | C | LC | M | LM | Y | DY | Bk |
| Dye | C-1 45 g | C-1 15 g | M-1 30 g | M-1 10 g | Y-1 30 g | Y-1 30 g C-1 3 g M-1 5 g | Bk-1 55 g Bk-2 15 g |
| BTZ | 3 g | 3 g | 3 g | 3 g | 3 g | 3 g | 3 g |
| UR | 12 g | 5 g | 10 g | 5 g | 10 g | 15 g | 17 g |
| DGB | — | — | — | — | 130 g | 125 g | 120 g |
| TGB | 150 g | 140 g | 120 g | 120 g | — | — | — |
| DEG | 100 g | 100 g | 90 g | 80 g | — | — | — |
| TEG | — | — | — | — | 110 g | 125 g | 100 g |
| GR | 120 g | 130 g | 130 g | 120 g | 125 g | 135 g | 125 g |
| PRD | 35 g | 35 g | — | — | — | — | 35 g |
| TEA | 10 g | 10 g | 10 g | 10 g | 10 g | 10 g | 10 g |
| PRX | 1 g | 1 g | 1 g | 1 g | 1 g | 1 g | 1 g |
| SW | 10 g | 10 g | 10 g | 10 g | 10 g | 10 g | 10 g |

The symbols in Table above indicates the following compounds.

| | |
|---|---|
| BTZ: | Benzotriazole |
| UR: | Urea |
| DGB: | Diethylene glycol monobutyl ether |
| TGB: | Triethylene glycol monobutyl ether |
| DEG: | Diethylene glycol |
| TEG: | Triethylene glycol |
| GR: | Glycerin |
| PRD: | 2-Pyrrolidone |
| TEA: | Triethanolamine (TEA) |
| PRX: | Proxel XL2(S), produced by Avecia |
| SW: | Surfynol STG |

The cyan, magenta, yellow and black dyes shown in Table 32 and in Table 33 later each has the following structure.

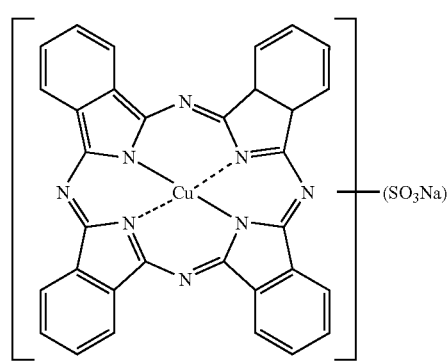

C-1

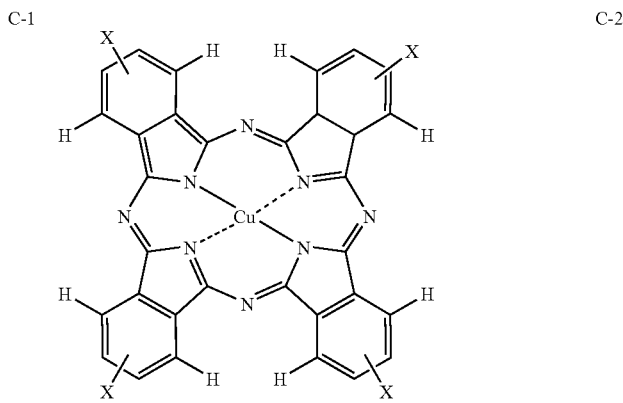

C-2

X = —SO$_2$(CH$_2$)$_3$SO$_3$Li

-continued
C-3
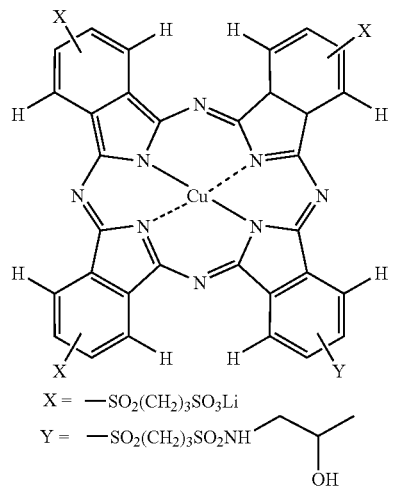
X = —SO$_2$(CH$_2$)$_3$SO$_3$Li
Y = —SO$_2$(CH$_2$)$_3$SO$_2$NH—CH(CH$_3$)CH$_2$OH
M-1
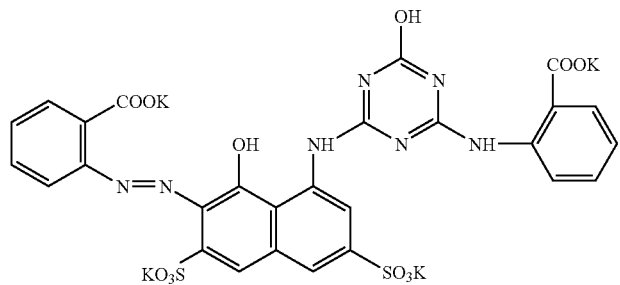
M-2
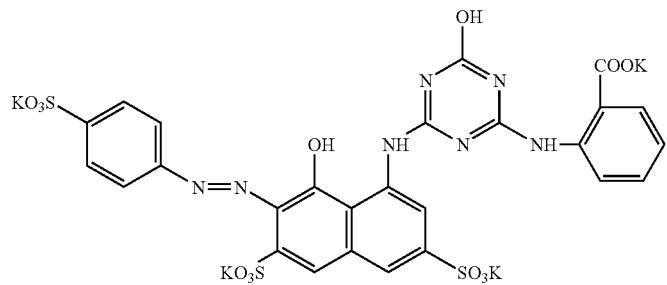
M-3
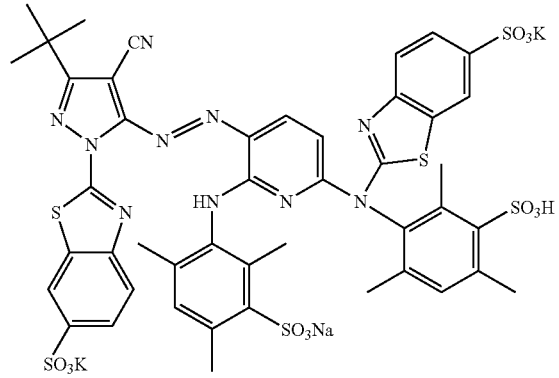
Y-1
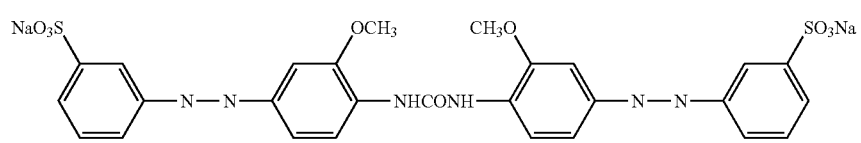

-continued
Y-2
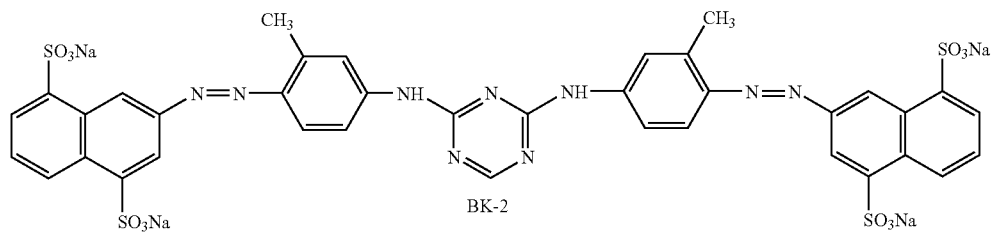
BK-2
Y-3
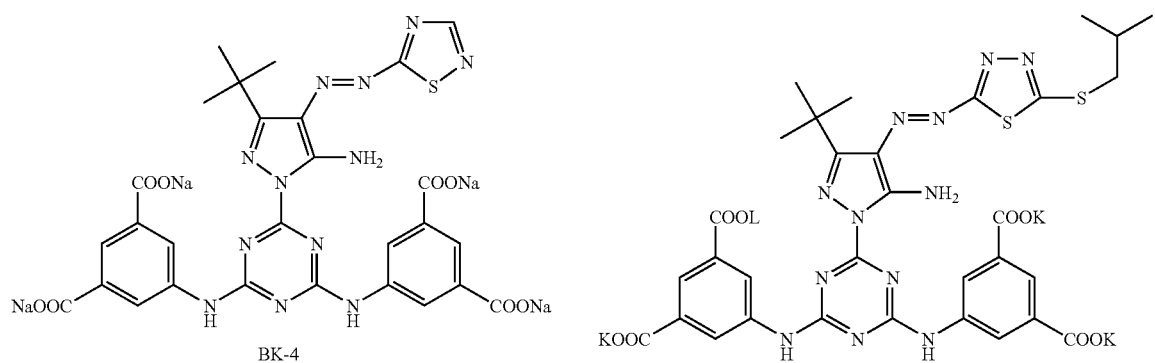
BK-4
Y-4
BK-1
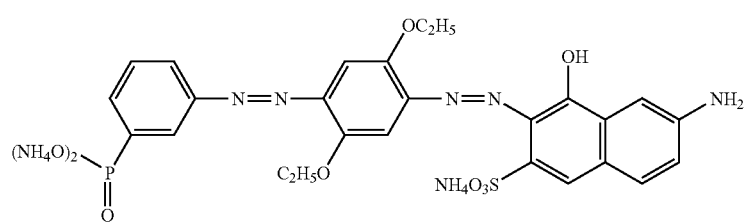
BK-3
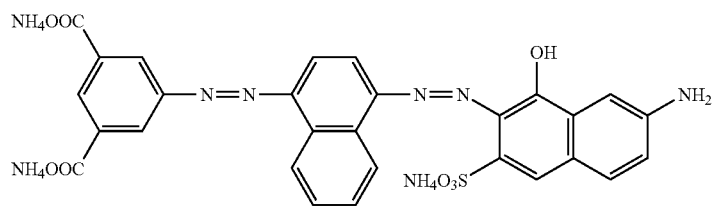
BK-5
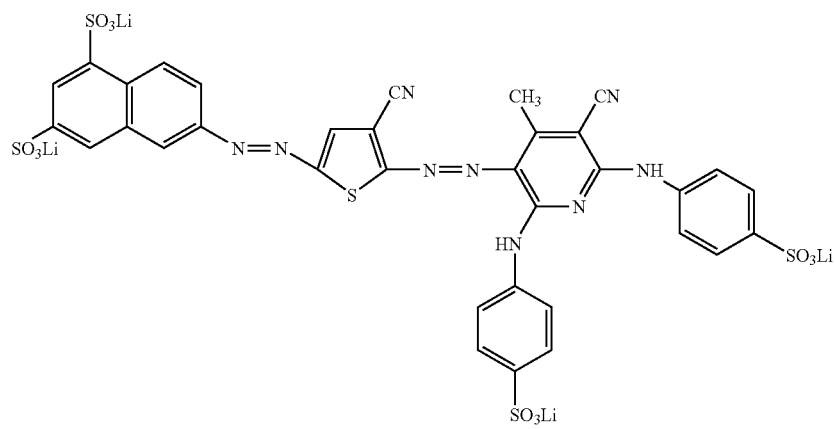

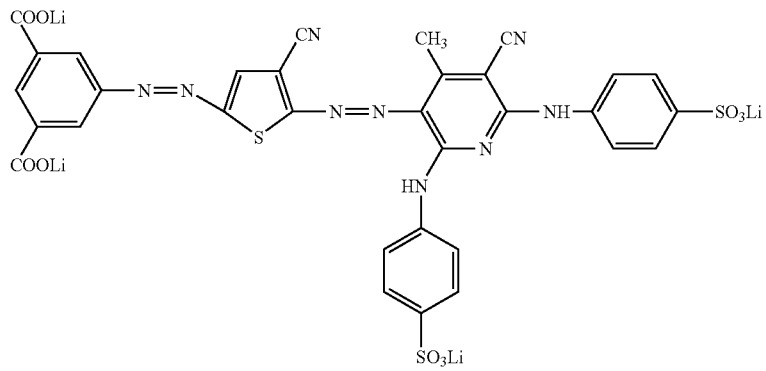

BK-6

Ink sets 102 to 112 were prepared each of which had strictly the same composition as that of ink set 101 except that the kinds of dye were changed without changing the total concentration of dyes as shown in Table 33. By way of precaution, the constituent dyes of the dark yellow (DY) ink in table 33 have the Y:C:M weight ratio of 30:3:5 for each ink set sample, the ratio of the long wavelength-absorbing dye to short wavelength-absorbing dye constituting the black (Bk) ink is 55:15 for each ink set sample, the dye ratio of the LC ink in ink set Sample No. 111, i.e., C-1:C-2 is 50:50, the dye ratio of the LM ink, i.e., M-2:M-3 is 70:30, and the dye ratio of the Y ink of ink set sample No. 112, i.e., Y-2:T-4 is 60:40 (all the ratios being represented by weight ratio.).

TABLE 33

| | C | LC | M | LM | Y | DY | Bk |
|---|---|---|---|---|---|---|---|
| 101 (Comparative Example) | C-1 | C-1 | M-1 | M-1 | Y-1 | Y-1<br>C-1<br>M-1 | Bk-1<br>Bk-2 |
| 102 (Comparative Example) | C-1 | C-1 | M-1 | M-2 | Y-1 | Y-1<br>C-1<br>M-2 | Bk-1<br>Bk-2 |
| 103 (Comparative Example) | C-1 | C-1 | M-2 | M-2 | Y-2 | Y-1<br>C-1<br>M-1 | Bk-1<br>Bk-2 |
| 104 (Comparative Example) | C-2 | C-2 | M-2 | M-2 | Y-1 | Y-1<br>C-1<br>M-1 | Bk-3<br>Bk-2 |
| 105 (Invention) | C-2 | C-2 | M-3 | M-3 | Y-3 | Y-3<br>C-2<br>M-3 | Bk-4<br>Bk-5 |
| 106 (Invention) | C-2 | C-2 | M-3 | M-3 | Y-4 | Y-3<br>C-2<br>M-3 | Bk-4<br>Bk-5 |
| 107 (Invention) | C-2 | C-2 | M-3 | M-3 | Y-3 | Y-4<br>C-2<br>M-3 | Bk-4<br>Bk-6 |
| 108 (Invention) | C-3 | C-3 | M-3 | M-3 | Y-3 | Y-3<br>C-2<br>M-3 | Bk-4<br>Bk-5 |
| 109 (Invention) | C-3 | C-3 | M-3 | M-3 | Y-4 | Y-3<br>C-2<br>M-3 | Bk-4<br>Bk-6 |
| 110 (Invention) | C-3 | C-3 | M-3 | M-3 | Y-3 | Y-4<br>C-2<br>M-3 | Bk-4<br>Bk-5 |
| 111 (Invention) | C-2 | C-1<br>C-2 | M-3 | M-2<br>M-3 | Y-3 | Y-3<br>C-2<br>M-3 | Bk-4<br>Bk-6 |
| 112 (Invention) | C-2 | C-3 | M-3 | M-3 | Y-2<br>Y-4 | Y-3<br>C-2<br>M-3 | Bk-4<br>Bk-5 |

<Oxidation potential>

The measured values of oxidation potential of dyes used are shown in Table 34. The oxidation potential was measured according to direct current polarography in N,N-dimethylformamide (concentration of compound: $1 \times 10^{-3}$ mol·dm$^{-3}$) containing 0.1 mol·dm$^{-3}$ of tetrapropylammonium perchlorate as the supporting electrolyte by using SCE (saturated calomel electrode) as the reference electrode, a graphite electrode as the working electrode and a platinum electrode as the counter electrode.

TABLE 34

| | Eox <1.0 V | Eox >1.0 V |
|---|---|---|
| Cyan | C-1 | C-2, C-3 |
| Magenta | M-1, M-2 | M-3 |
| Yellow | Y-1, Y-2 | Y-3, Y-4 |
| Black | Bk-1, Bk-2, Bk-3 | Bk-4, Bk-5, Bk-6 |

<Fading Rate Constant Ratio>

Stepwise image pattern samples of Y, M, C and Bk monochromes and gray (Y, M, C, DY, LM, LC and Bk inks of the ink set each in the same ejection amount) were determined on the fading rate constant ratio according to the method described above by using an ozone exposure tester described in the evaluation method 3) later. That is, a printed pattern was prepared by using the Y, M, C or Bk ink alone such that the reflection density obtained by measuring the density of the stepwise image pattern sample in the color density region by means of a Status A filter of X-Rite Densitometer became roughly 1.0±0.1. Separately, a printed pattern was prepared by using the Y, M, C, DY, LM, LC and Bk inks each in the same ejection amount such that the reflection density of the stepwise image pattern obtained by measuring the yellow, magenta and cyan densities in the mixed color image by means of respective Status A filters became roughly 1.0±0.1. The time/density curve of each image pattern in the ozone exposure tester was obtained, and the fading rate constant ratio of each of yellow, magenta, cyan and black inks was determined according to the above-described method. The fading rate constant ratios thus obtained are shown in Table 35.

Further, in order to make easy the comparison with the image fastness data, the sample was rated A when the yellow, magenta, cyan and black inks all had a fading rate constant ratio in the range from 0.7 to 1.3, rated B when one or two ink(s) did not have a fading rate constant ratio in the range from 0.7 to 1.3, and rated C when three or more inks did not have a fading rate constant ratio in the range from 0.7 to 1.3. These evaluation results are shown in Table 36 together with the image fastness data.

TABLE 35

| Sample | $k_1/k_2$ | | | Note |
| --- | --- | --- | --- | --- |
| | C | M | Y | |
| 101 | 0.80 | 0.62 | 1.55 | Comparative Example |
| 102 | 0.82 | 0.63 | 1.57 | Comparative Example |
| 103 | 0.78 | 0.62 | 1.43 | Comparative Example |
| 104 | 0.92 | 0.65 | 1.59 | Comparative Example |
| 105 | 0.97 | 0.87 | 1.03 | Invention |
| 106 | 0.95 | 0.89 | 0.92 | Invention |
| 107 | 1.03 | 0.92 | 1.12 | Invention |
| 108 | 0.92 | 0.94 | 1.13 | Invention |
| 109 | 0.89 | 0.93 | 0.92 | Invention |
| 110 | 1.10 | 0.93 | 1.12 | Invention |
| 111 | 0.95 | 0.80 | 1.03 | Invention |
| 112 | 0.95 | 0.89 | 1.17 | Invention |

Image Preservability (Also Referred to as Image Fastness)>

These inks were filled in ink cartridges of Inkjet Printer PM-950C manufactured by Seiko Epson Corp., and stepwise image patterns of monochrome and gray and a portrait image of a person were printed.

The image was printed on Inkjet Photo Gloss Paper "GASAI" produced by Fuji Photo Film Co., Ltd. used as the image-receiving sheet, and image quality, fading rate constant ratio of ink and image fastness were evaluated. The image quality was good for all the samples.

(Evaluation Tests)

As for the image preservability, the following evaluations were carried out by using the printed samples.

1) In the evaluation of light fastness, the reflection density in the printed part of the image after printing was measured a densitometer satisfying the standard condition for reflection density measuring system in conformity with the international standard ISO-5 (X-Rite 310, a registered trademark), the image was irradiated with xenon light (85,000 lux under the ID 65 condition in the international standard ISO 18909 (Method of testing color image stability) by means of a weather meter manufactured by Atlas Corp. for 7 days, and the reflection density at the printed area was again measured with X-rite 310. The sample was rated A when the reduction level of image as compared with the initial stage was in the allowable range, rated B when reduction in the density was small but the color balance was disrupted, and rated C when the density was clearly decreased and the image level was greatly reduced.

2) In the evaluation of heat fastness, the density was measured with X-Rite 310 before and after the sample was placed for 10 days under conditions of 80° C. and 70% RH, and the dye residual ratio was determined and evaluated. The evaluation of the dye residual ratio was performed at 3 points having a reflection density of 1.0, 1.5 and 2.0. The sample was rated A when the dye dye residual ratio was 90% or more at all densities, rated B when less than 90% at two points, rated C when less than 90% at all densities, and rated D when an apparent discoloration was observed.

3) In the evaluation of ozone resistance, the photo gloss paper having formed thereon an image was left standing for 7 days in a box set to an ozone gas concentration of 0.5 ppm and the image density before and after standing in the ozone gas atmosphere was measured by a reflection densitometer (X-Rite 310TR) and evaluated as the dye residual ratio. The dye residual ratio was measured at three areas having reflection densities of 1.0, 1.5 and 2.0. The ozone gas concentration in the box was set by using an ozone gas monitor (Model OZG-EM-01) manufactured by APPLICS.

The sample was rated on a scale of three stages, namely, rated A when the dye residual ratio was 80% or more at all densities, rated B when less than 80% at one or two point(s), and rated C when less than 70% at all densities.

The results thus obtained are shown in Table 36.

TABLE 36

| No. | Fading Rate Constant Ratio | Light Fastness | Heat Fastness | $O_3$ Fastness |
| --- | --- | --- | --- | --- |
| PM-950C (Bk) (Comparative Example) | B | B | B | C |
| 101 (Comparative Example) | C | C | B | C |
| 102 (Comparative Example) | C | C | B | C |
| 103 (Comparative Example) | C | C | B | C |
| 104 (Comparative Example) | C | B | B | B |
| 105 (Invention) | A | A | A | A |
| 106 (Invention) | A | A | A | A |
| 107 (Invention) | A | A | A | A |
| 108 (Invention) | A | A | A | A |
| 109 (Invention) | A | A | A | A |
| 110 (Invention) | A | A | A | A |
| 111 (Invention) | A | A | A | A |
| 112 (Invention) | A | A | A | A |

As seen from the results in the Table 36, while Samples 101 to 104 comprising an ink which does not contain any dye having an oxidation potential of 1.0 V (vs SCE) or more in the constituent inks exhibit B or C ratings for light fastness, oxidation resistance or aging storage stability, the ink sets in Samples 105 to 112 of the present invention where each of the constituent inks contains a dye having an oxidation potential of 1.0 V (vs SCE) or more surpassed Comparative Examples in all performances. Further, it is also evident from the results on ink set Samples 101 and 102 that, even if a dye with an oxidation potential less than 1.0 V (vs SCE) is involved in the constituent inks, the advantage of the present invention is exhibited so long as the oxidation potential of the main dye is 1.0 V (vs SCE) or more.

Still further, comparison of the fading rate constant ratios in Tables 35 or 36 with the individual image fastness evaluation data in Table 36 reveals that the fading rate constant ratios of 0.7 to 1.3 for all the constituent inks contributes much to the above-mentioned individual image fastness. In particular, when the fading rate constant ratio defined above is from 0.7 to 1.3, the effect of the present invention is remarkably exerted.

While the invention has been described in detail and with reference to specific examples thereof, it will be apparent to one skilled in the art that various changes and modifications can be made to these examples without departing from the spirit and scope of the invention.

What is claimed is:

1. An ink set comprising inks each obtained by containing a dye in an aqueous medium, wherein the ink set comprises a black ink containing a dye represented by formula (1) below, and said constituent inks all in the ink set are an ink containing at least one kind of dye having an oxidation potential more positive than 1.0 V (vs SCE):

A-N=N—B—N=N—C    (1)

wherein A, B and C each independently represents an aromatic group which may be substituted or a heterocyclic group which may be substituted, and A and C each is a monovalent group and B is a divalent group, provided that at least one of A, B and C is a heterocyclic group which may be substituted.

2. The ink set as claimed in claim 1, wherein said ink is an ink obtained by dissolving or dispersing at least one dye in an aqueous medium.

3. The ink set as claimed in claim 1, wherein the ratio k1/k2 of the accelerated fading rate constant (k1) of an image drawn by using said constituent ink alone to the accelerated fading rate constant (k2) of a mixed color image drawn by using all constituent inks constituting said ink set in equivalent amounts with the same density measurement light as in the measurement of said k1 is 0.7 to 1.3 in all constituent inks constituting the ink set.

4. The ink set as claimed in claim 1, wherein the at least one kind of dye having an oxidation potential more positive than 1.0 V (vs SCE) is a dye having at least one heterocyclic group.

5. The ink set as claimed in claim 1, wherein the at least one kind of dye having an oxidation potential more positive than 1.0 V (vs SCE) is a dye having at least one bond selected from the group consisting of —SO— or —SO₂-.

6. The ink set as claimed in claim 1, wherein the at least one kind of dye having an oxidation potential more positive than 1.0 V (vs SCE) is an azo dye or a phthalocyanine dye.

7. The ink set as claimed in any one of claims 1 to 6, wherein the ink set is used for an inkjet.

8. An inkjet recording method, comprising image-wise printing an ink in the ink set as claimed in claim 1 on a recording material.

9. The ink set as claimed in claim 1, wherein the dye represented by formula (1) is a dye represented by formula (2):

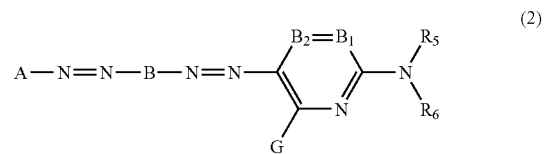

wherein A and B have the same meanings as in formula (1),

B₁ and B₂ each represents =CR₁- or —CR₂=or either one of B₁ and B₂ represents a nitrogen atom and the other represents =CR₁- or —CR₂=, G, R₁ and R₂ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an alkylamino group, an arylamino group and a heterocyclic amino group), an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, art arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and each group may be further substituted, R₅ and R₆ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and each group may further have a substituent, provided that R₅ and R₆ are not a hydrogen atom at the same time, and R₁ and R₅, or R₅ and R₆ may combine to form a 5- or 6-membered ring.

10. The ink set as claimed in claim 1, which at least comprises cyan ink, magenta ink, yellow ink and black ink.

* * * * *